INVENTORS
Alfred E. Comstock
Burdsal Gardner Wilcox
ATTORNEYS

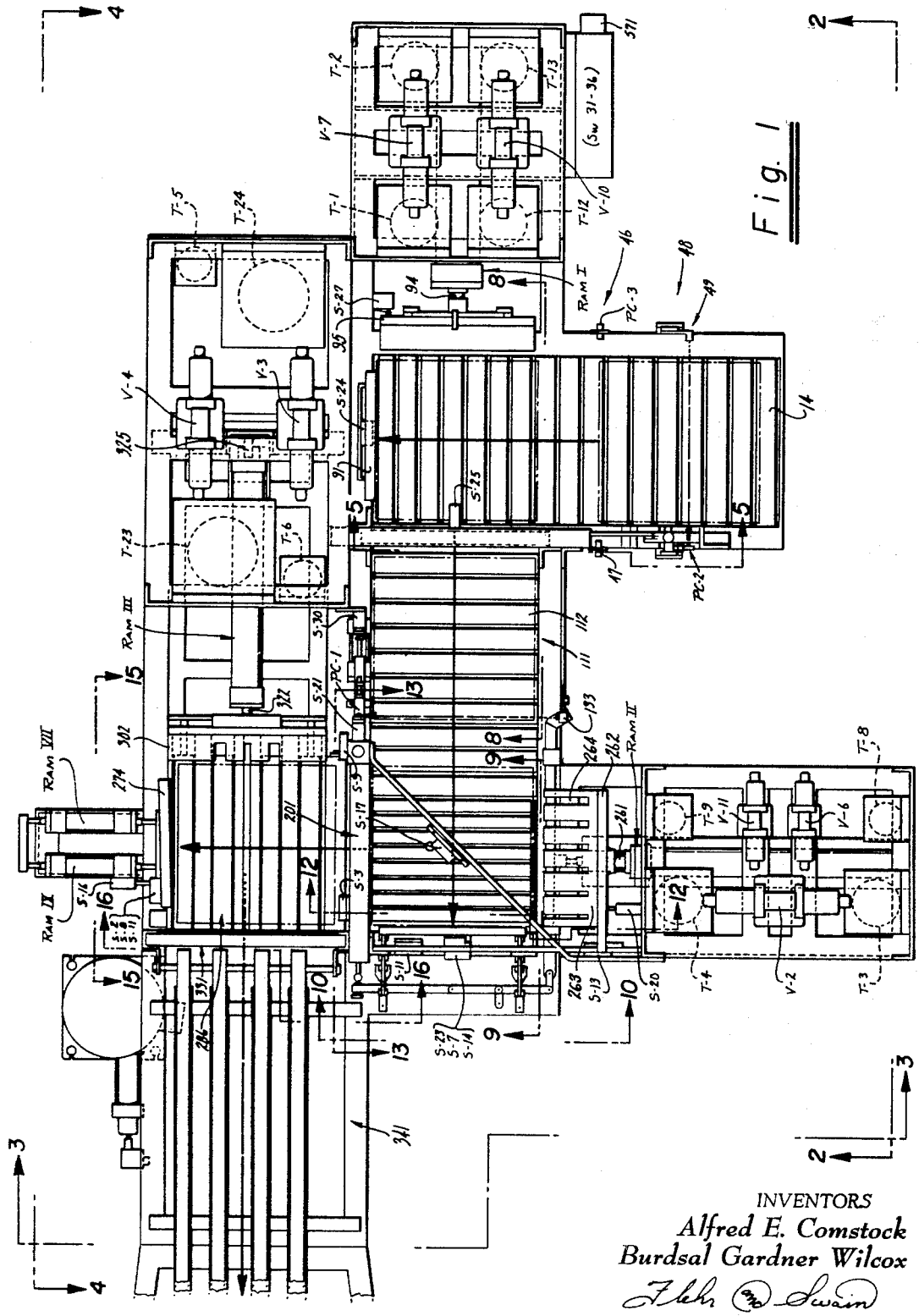

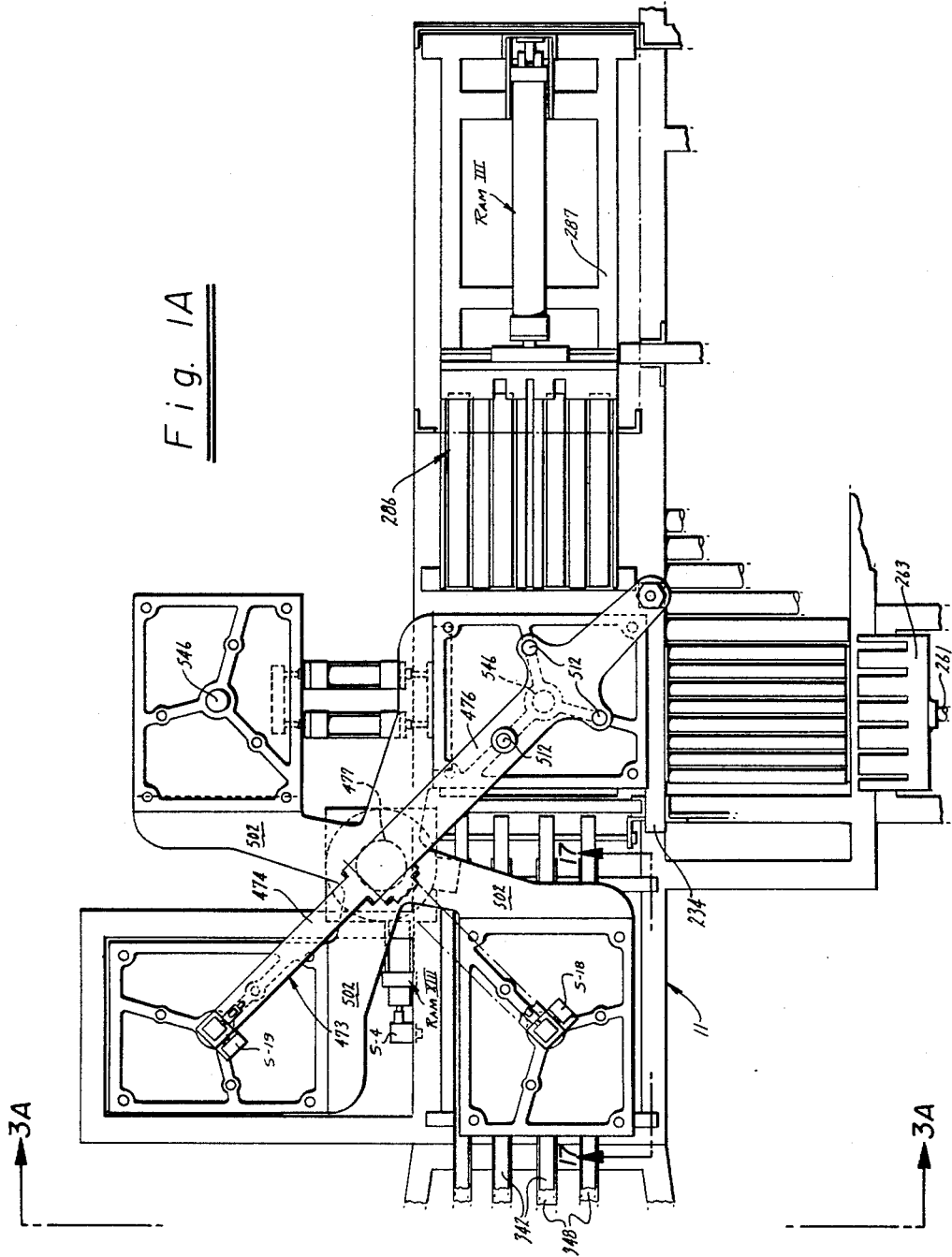

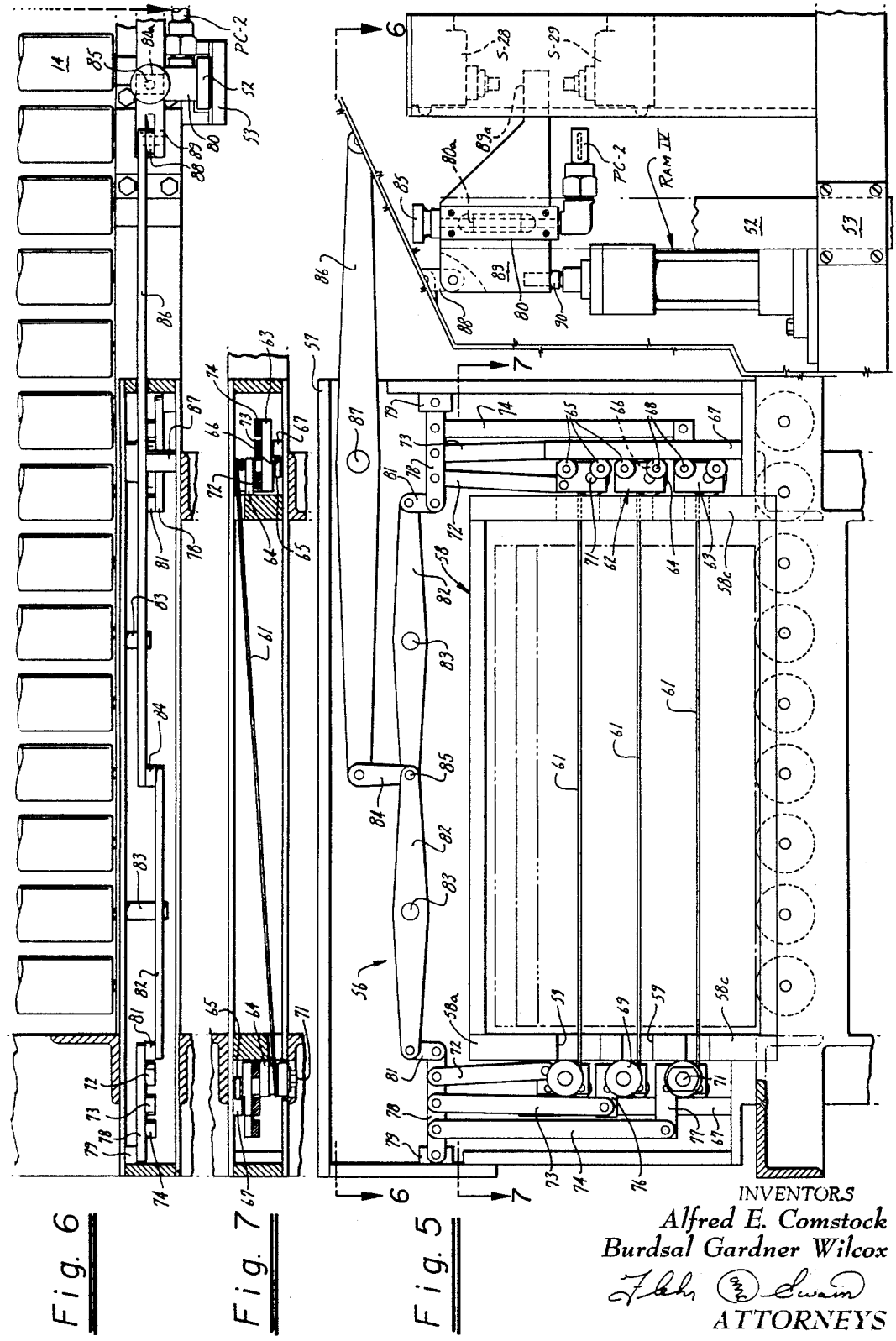

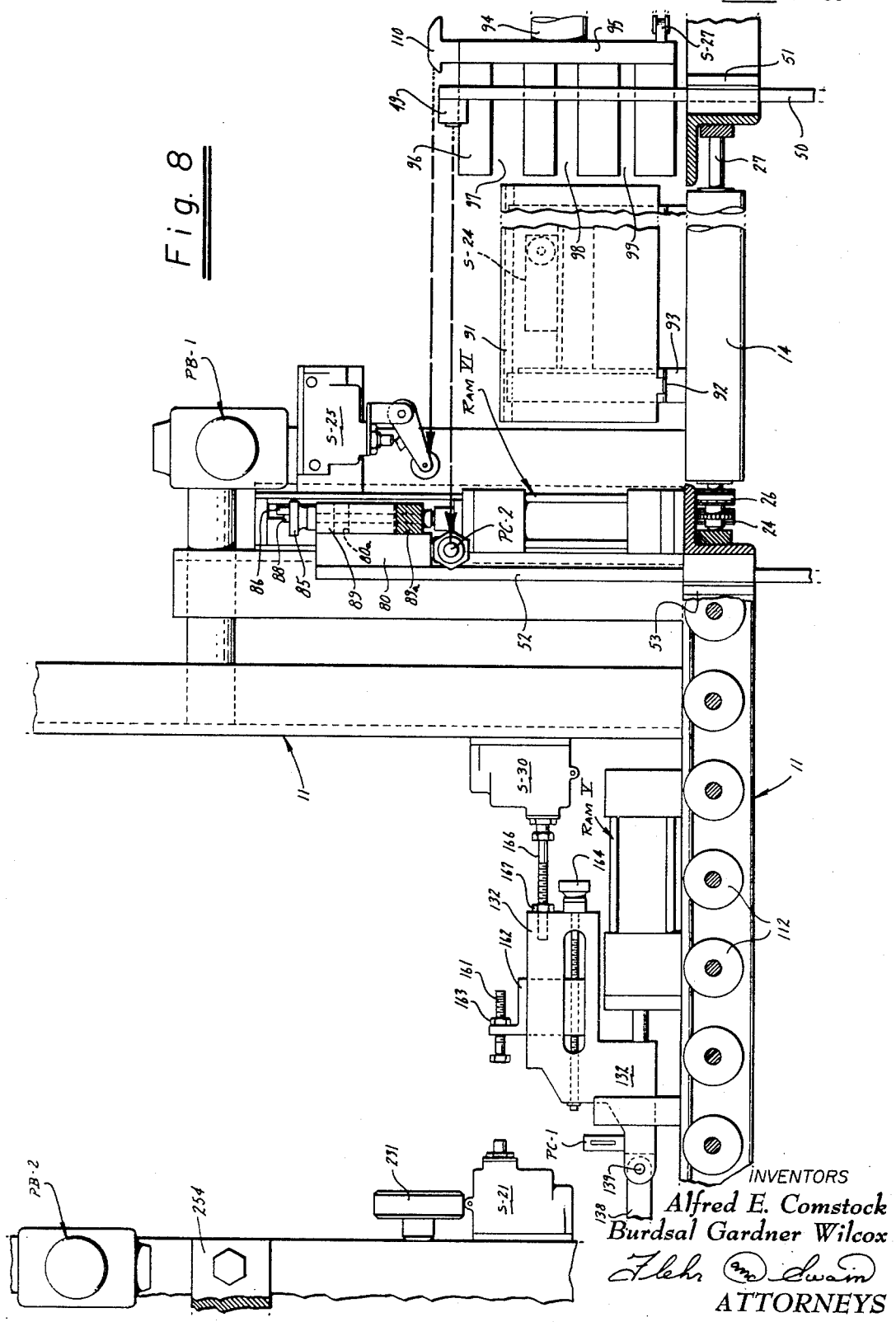

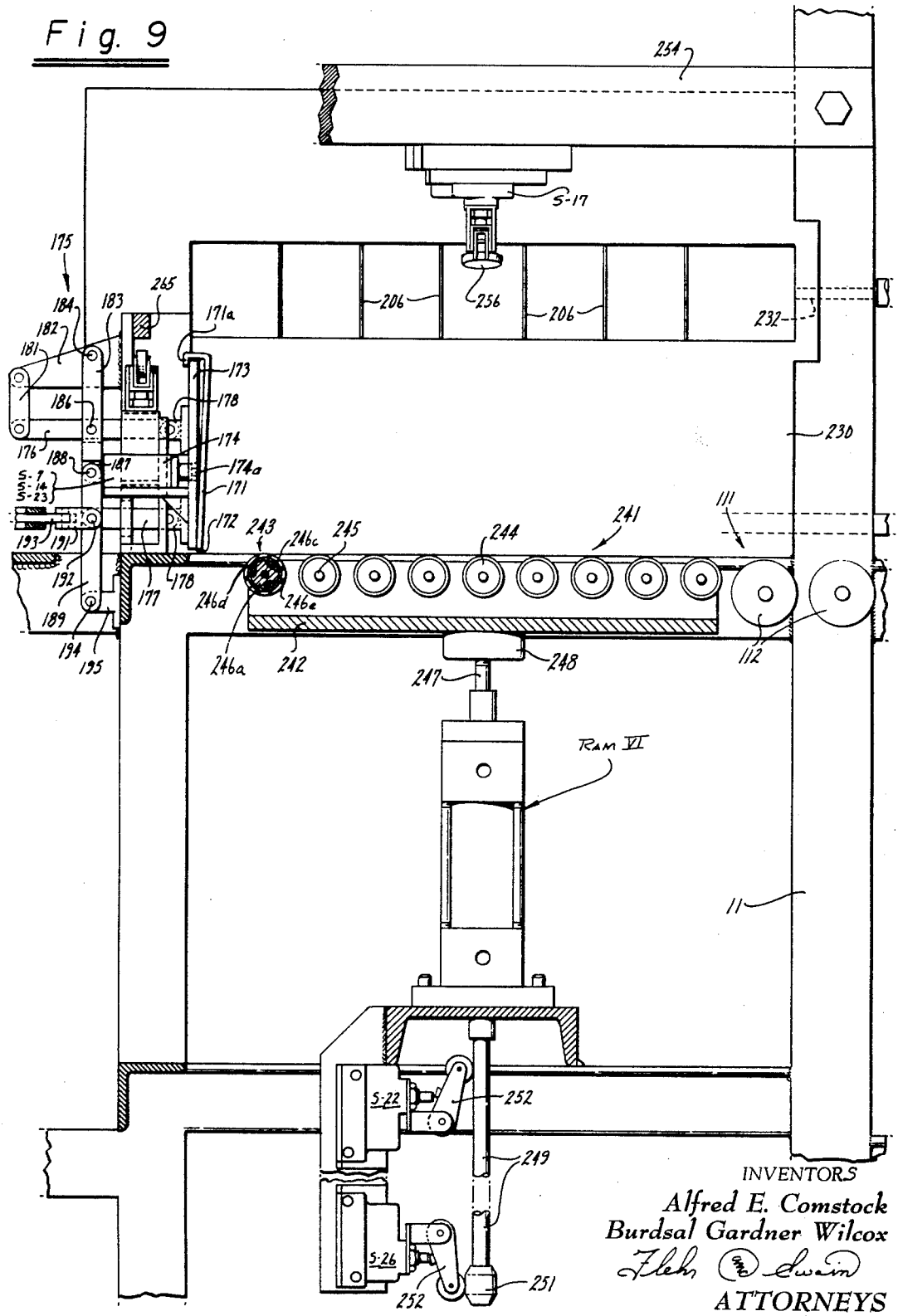

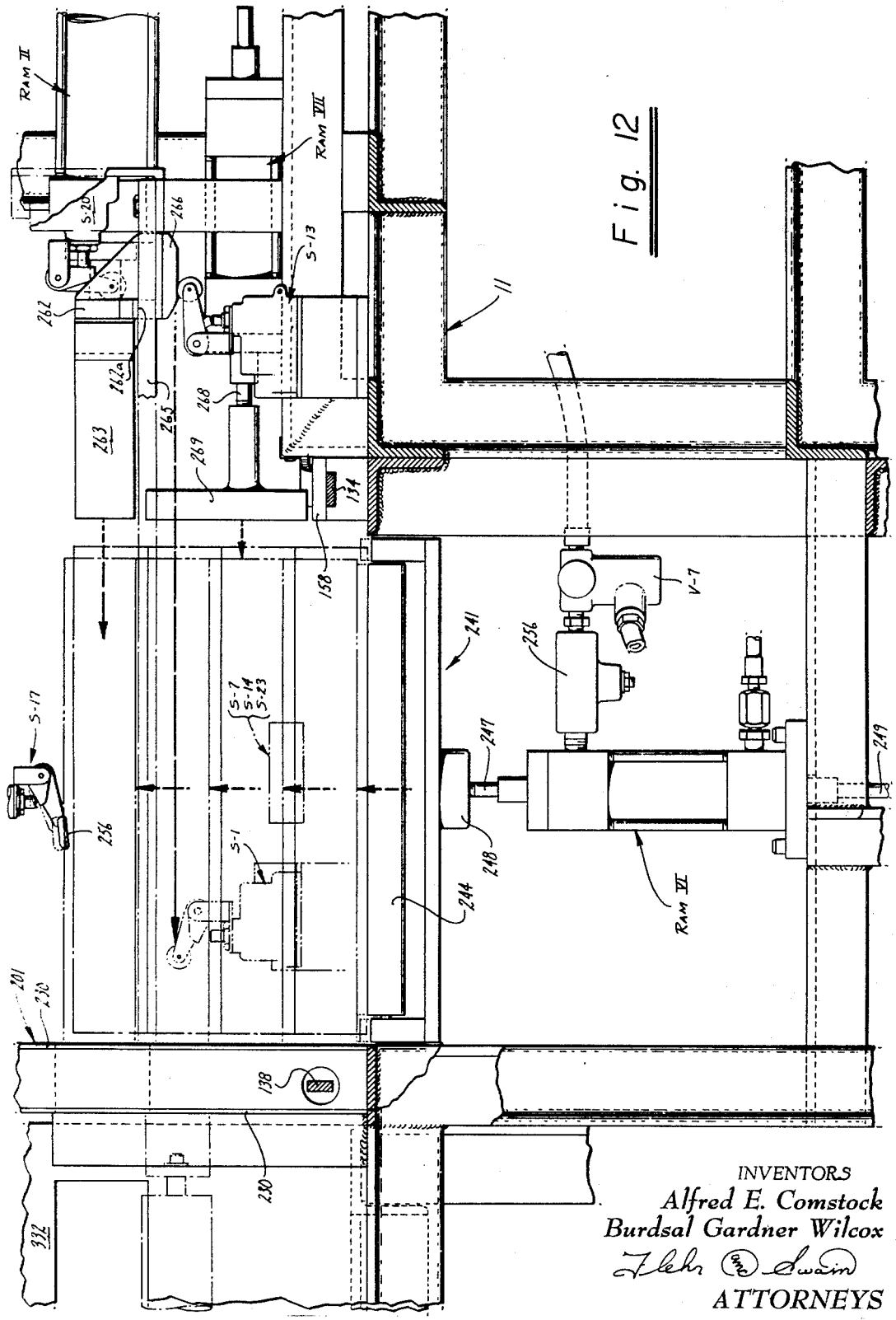

INVENTORS
Alfred E. Comstock
Burdsal Gardner Wilcox

ATTORNEYS

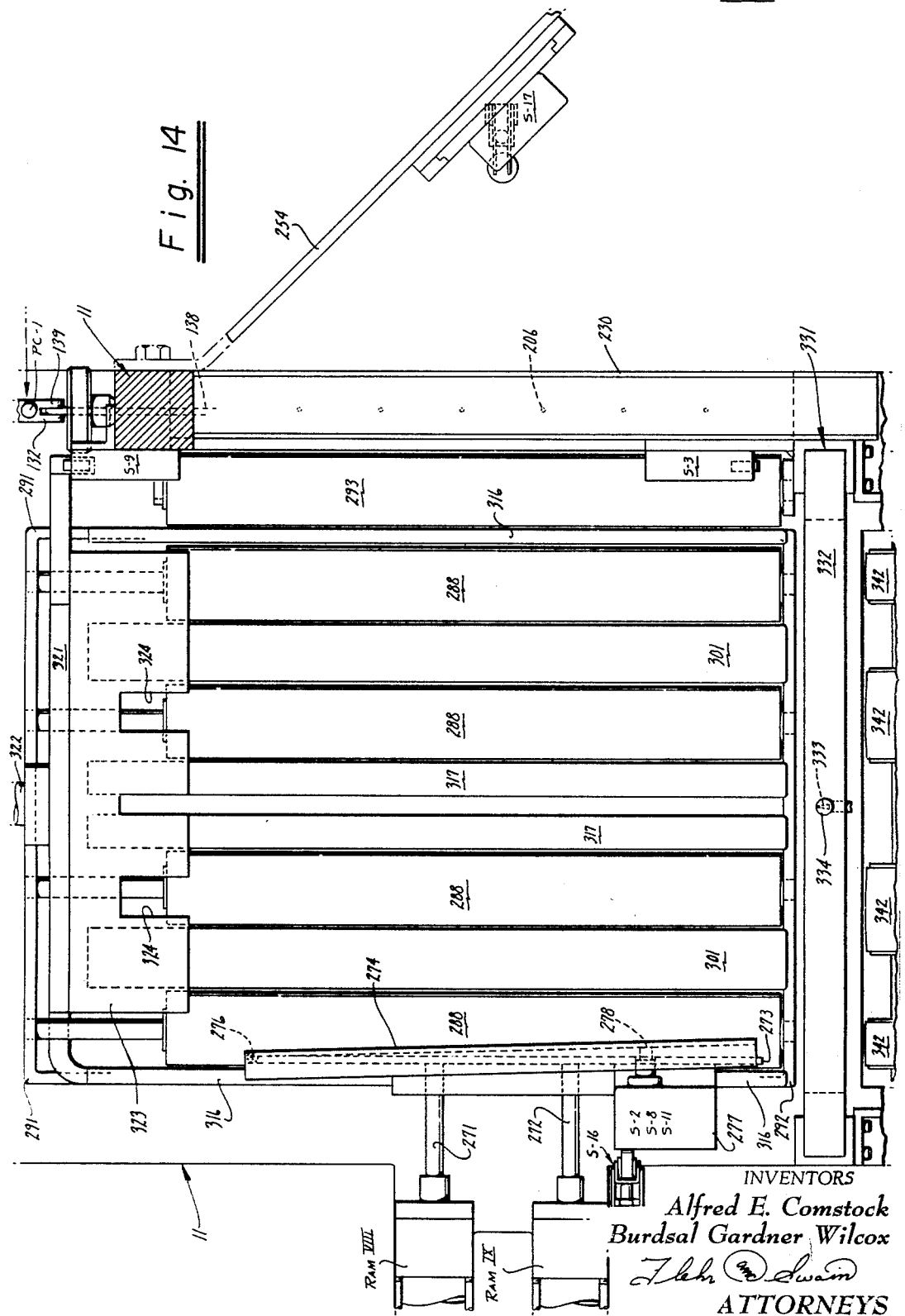

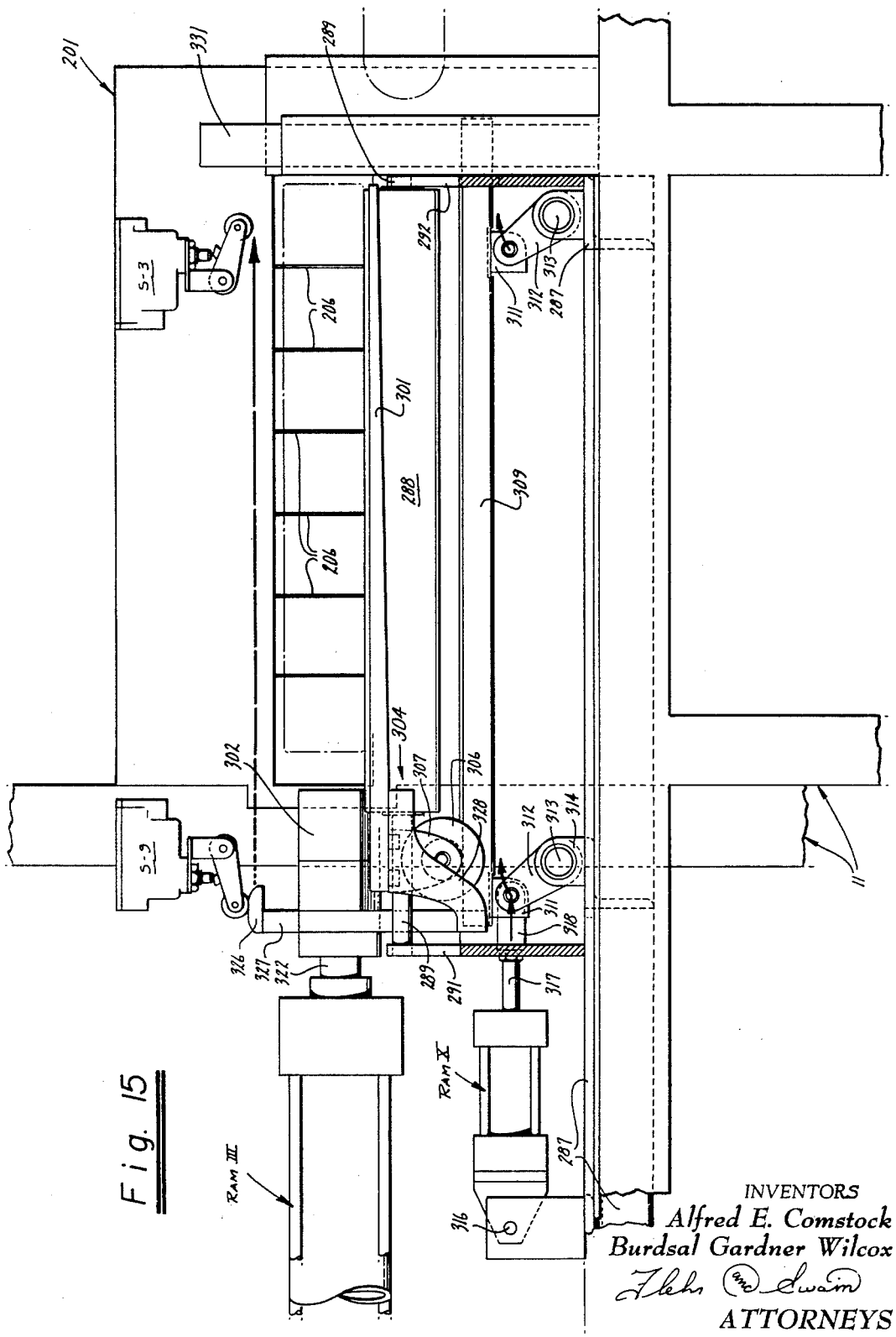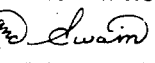

INVENTORS
Alfred E. Comstock
Burdsal Gardner Wilcox
ATTORNEYS

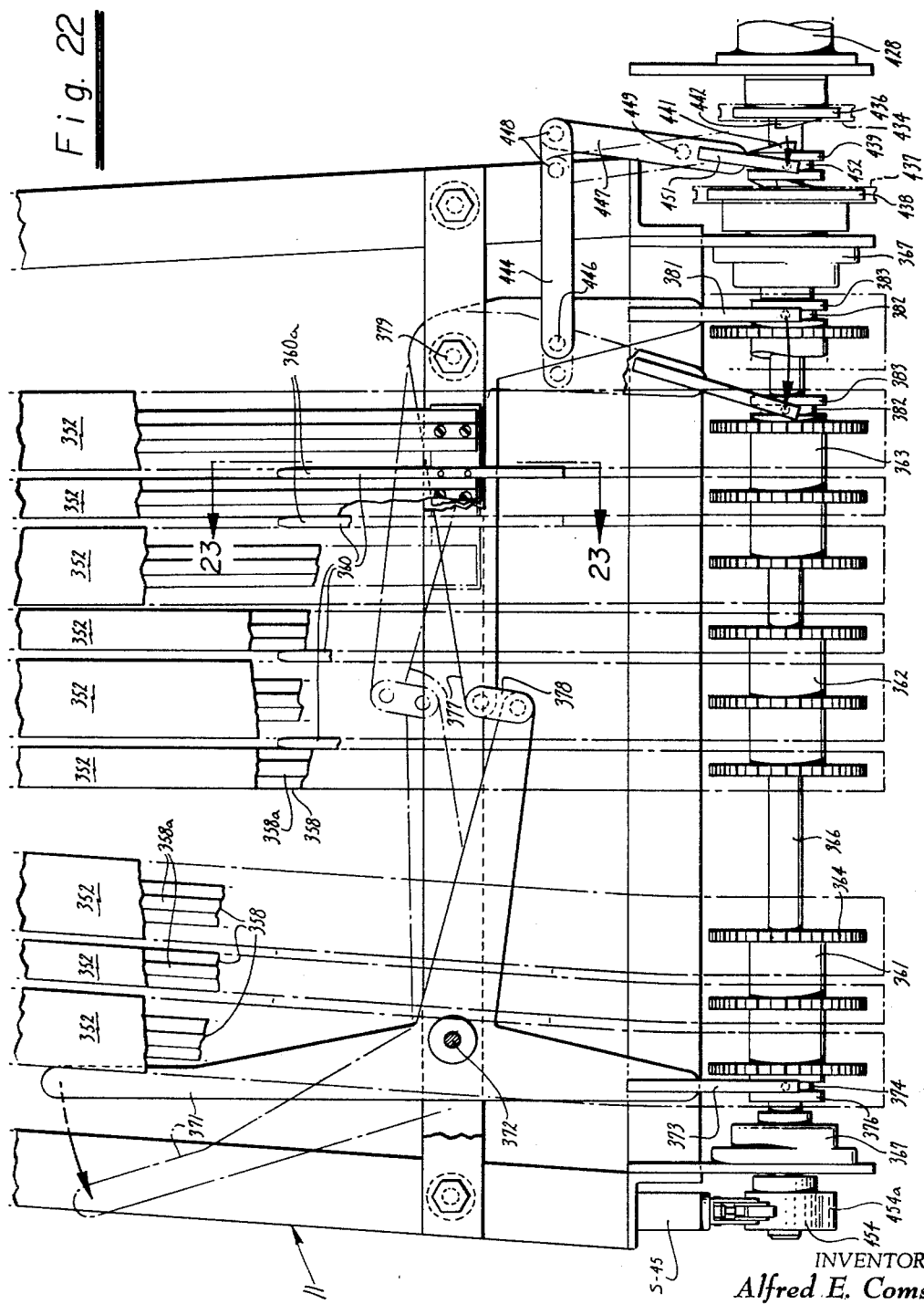

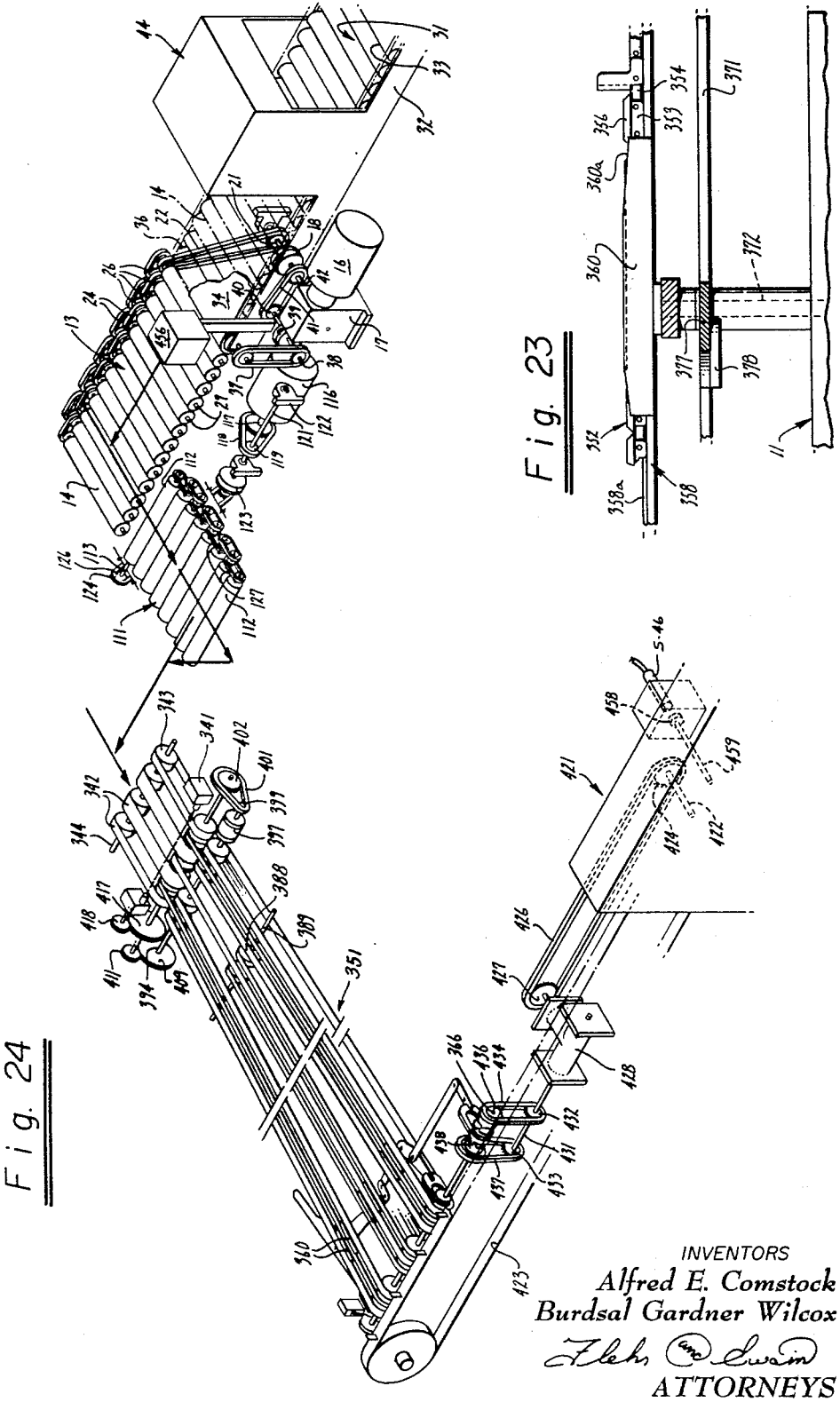

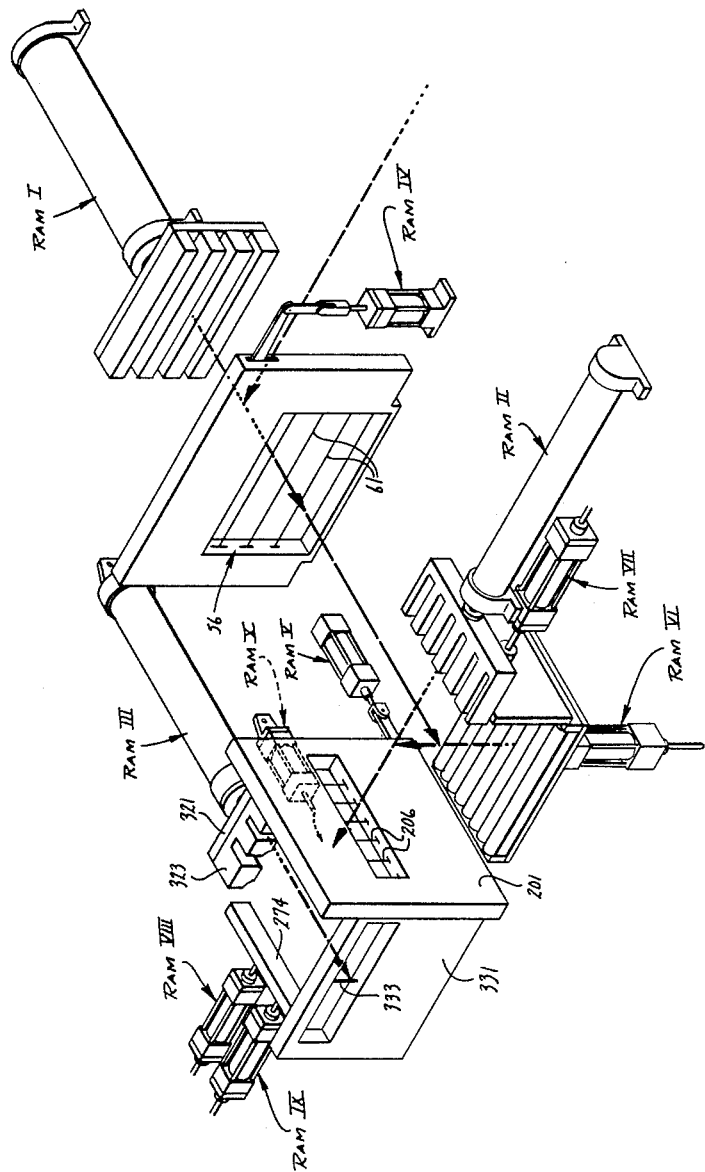

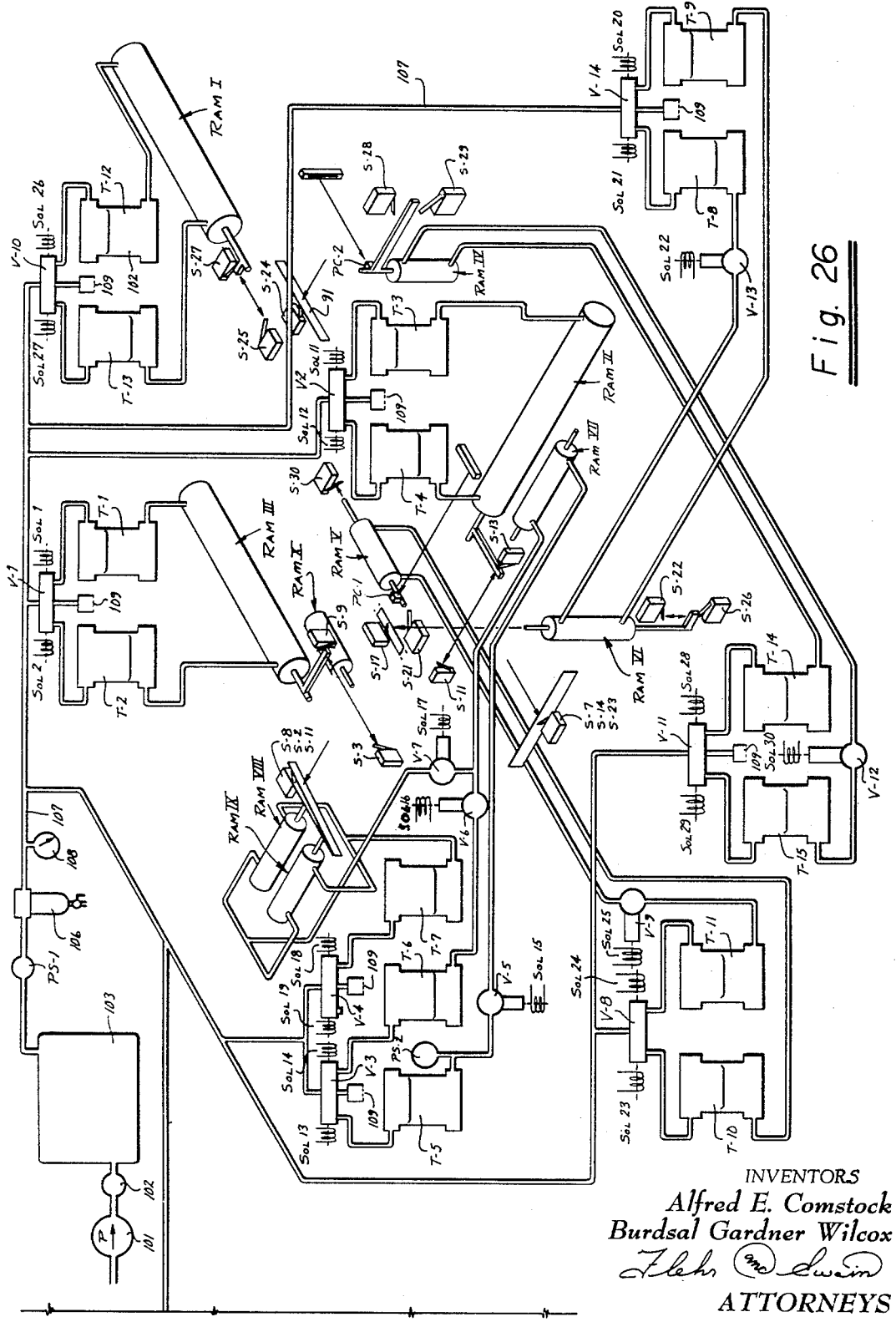

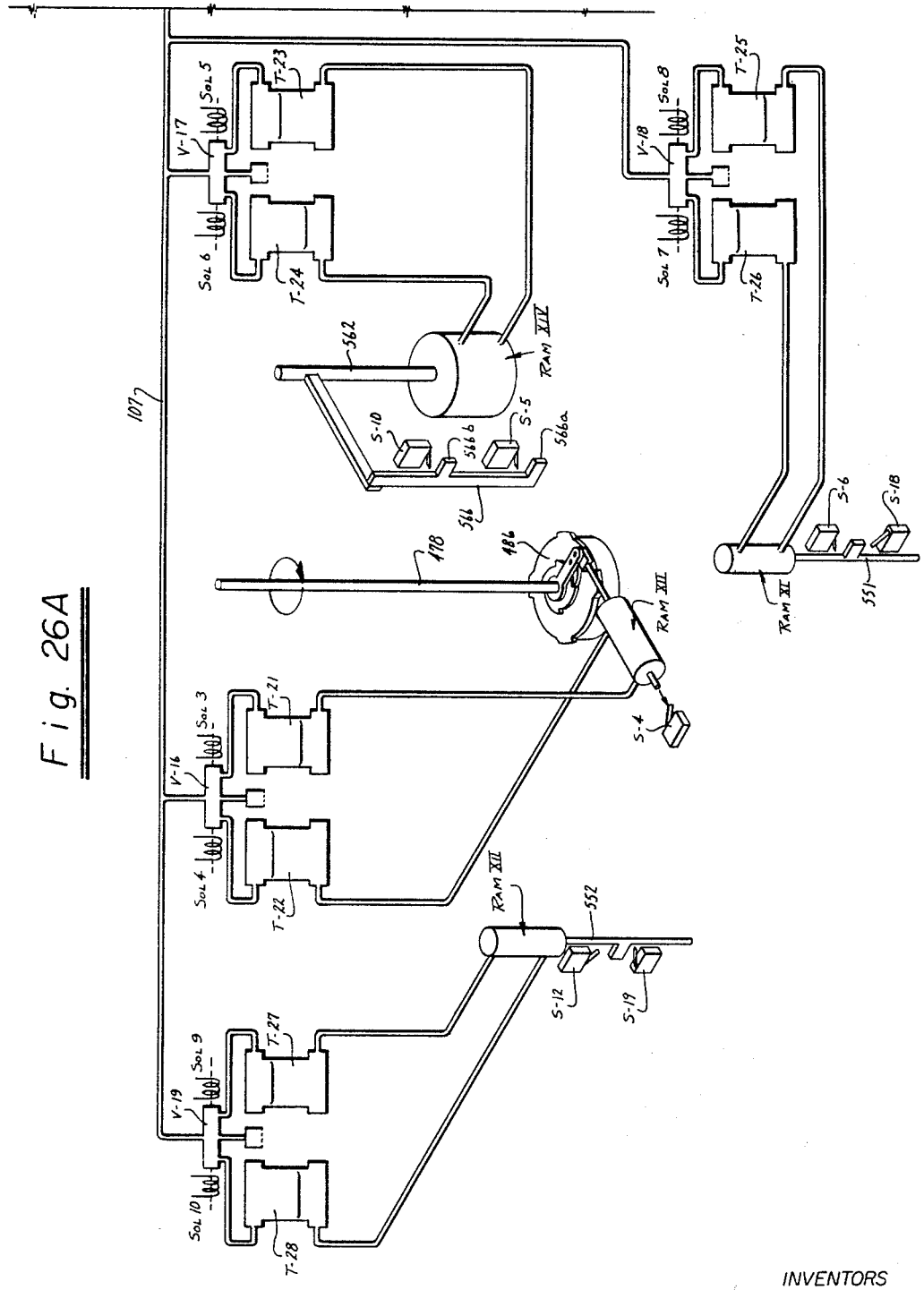

INVENTORS
Alfred E. Comstock
Burdsal Gardner Wilcox
ATTORNEYS

INVENTORS
Alfred E. Comstock
Burdsal Gardner Wilcox
ATTORNEYS

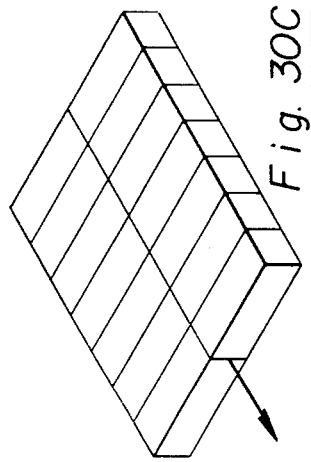
Fig. 30C
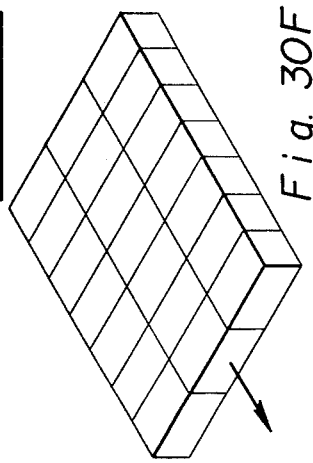
Fig. 30F
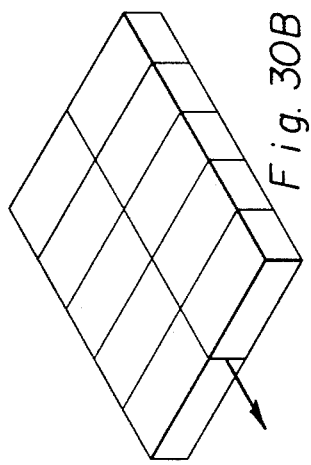
Fig. 30B
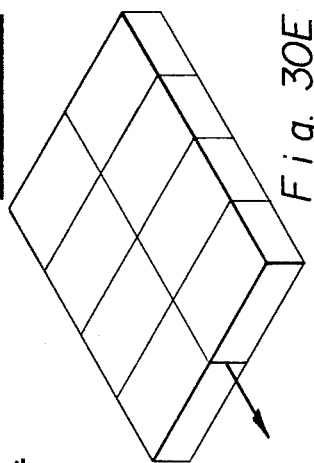
Fig. 30E
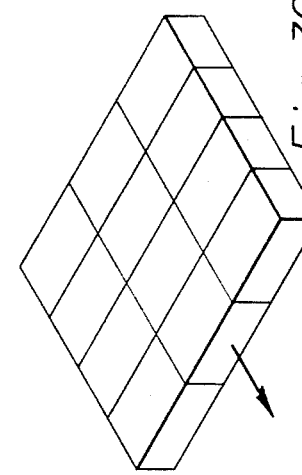
Fig. 30A
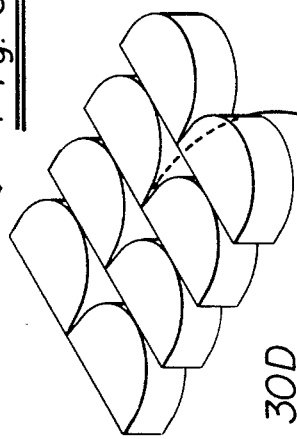
Fig. 30D
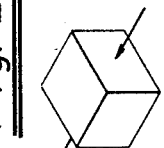
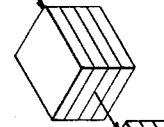
Fig. 29A
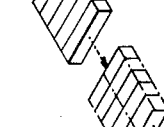
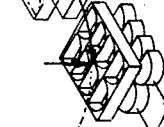
Fig. 29B
INVENTORS
Alfred E. Comstock
Burdsal Gardner Wilcox
ATTORNEYS

United States Patent Office 3,433,278
Patented Mar. 18, 1969

3,433,278
APPARATUS FOR CUTTING BLOCK-LIKE ARTICLES
Alfred E. Comstock, Belvedere, and Burdsal Gardner Wilcox, Oakland, Calif., assignors to Safeway Stores, Incorporated, Oakland, Calif., a corporation of Maryland
Filed Oct. 9, 1964, Ser. No. 402,746
U.S. Cl. 146—78          25 Claims
Int. Cl. B26d 1/44, 7/26; A01j 15/00

This invention relates to a method and apparatus for cutting and handling articles and more particularly to a method and apparatus for cutting large plastic blocks into smaller blocks and delivering the blocks to an automatic wrapping machine.

It has long been a practice in the packaging industry to seal perishable articles and particularly food products such as cheese, sliced meats and the like within a wrapping of impervious sheet material by the use of automatic packaging machines. However, at the present time, in order to feed such automatic packaging machines, it is necessary to use a great deal of hand labor in order to prepare the articles so that they can be handled by the wrapping machine. This is particularly true of cheese where it is necessary to cut large blocks of cheese primarily by a plurality of hand operations into small blocks and to then feed these small blocks to the automatic packaging machinery. There is, therefore, a need for a method and apparatus for the cutting and handling of articles which can be utilized for delivering articles to automatic wrapping machines.

In general, it is an object of the present invention to provide a method and apparatus for cutting and handling articles which can be utilized for supplying articles to an automatic wrapping machine.

Another object of the invention is to provide a method and apparatus of the above character which can be utilized with large blocks of various sizes.

Another object of the invention is to provide a method and apparatus of the above character in which the large blocks are cut into smaller blocks of various sizes.

Another object of the invention is to provide a method and apparatus of the above character in which waste is reduced to a minimum.

Another object of the invention is to provide a method and apparatus of the above character in which the size of the smaller blocks is adjusted in accordance with the size of the large blocks.

Another object of the invention is to provide a method and apparatus of the above character which can be utilized for producing either half-round or rectangular blocks.

Another object of the invention is to provide a method and apparatus of the above character which is completely automatic.

Another object of the invention is to provide a method and apparatus of the above character which is controlled by the automatic wrapping machine.

Another object of the invention is to provide a method and apparatus of the above character in which the large blocks are centered before cutting to minimize waste.

Another object of the invention is to provide a method and apparatus of the above character in which the height and length of the large blocks are measured to facilitate cutting of the blocks to minimize waste.

Another object of the invention is to provide a method and apparatus of the above character in which various combinations of cuts can be obtained.

Additional objects and features of the invention will appear from the following description in which the preferred embodiment is set forth in detail in conjunction with the accompanying drawings.

Referring to the drawings:

FIGURE 1 is a top plan view of apparatus for cutting and handling articles incorporating the present invention with a substantial portion of the apparatus utilized for die cutting removed.

FIGURE 1A is a view similar to FIGURE 1 with the die cutting apparatus in place.

FIGURE 5 is an enlarged cross-sectional view taken along the line 5—5 of FIGURE 1.

FIGURE 6 is an enlarged cross-sectional view taken along the line 6—6 of FIGURE 5.

FIGURE 7 is an enlarged cross-sectional view taken along the line 7—7 of FIGURE 5.

FIGURE 8 is an enlarged cross-sectional view taken along the line 8—8 of FIGURE 1.

FIGURE 9 is an enlarged cross-sectional view taken along the line 9—9 of FIGURE 1.

FIGURE 12 is an enlarged cross-sectional view taken along the line 12—12 of FIGURE 1.

FIGURE 14 is an enlarged cross-sectional view taken along the line 14—14 of FIGURE 3.

FIGURE 15 is an enlarged cross-sectional view taken along the line 15—15 of FIGURE 1.

FIGURE 22 is an enlarged top plan view of a portion of the delivery conveyor which is shown schematically in FIGURE 24.

FIGURE 23 is an enlarged cross-sectional view taken along the line 23—23 of FIGURE 22.

FIGURE 24 is an isometric diagram, partially schematic, showing the drive mechanism for the apparatus.

FIGURE 25 is an isometric view of major portions of the apparatus shown as being used for cutting large plastic blocks into smaller units.

FIGURE 26 is a schematic diagram of the piping for the apparatus when used for block cutting.

FIGURE 26A is a schematic fluid diagram of the apparatus when used for die cutting.

FIGURES 29A and 29B are schematic illustrations showing how a large block is cut into smaller units or blocks with the apparatus shown in FIGURES 1–27.

FIGURES 30A–30F show the number of combinations of cuts which can be obtained with the apparatus shown in FIGURES 1–27.

Figure 2:
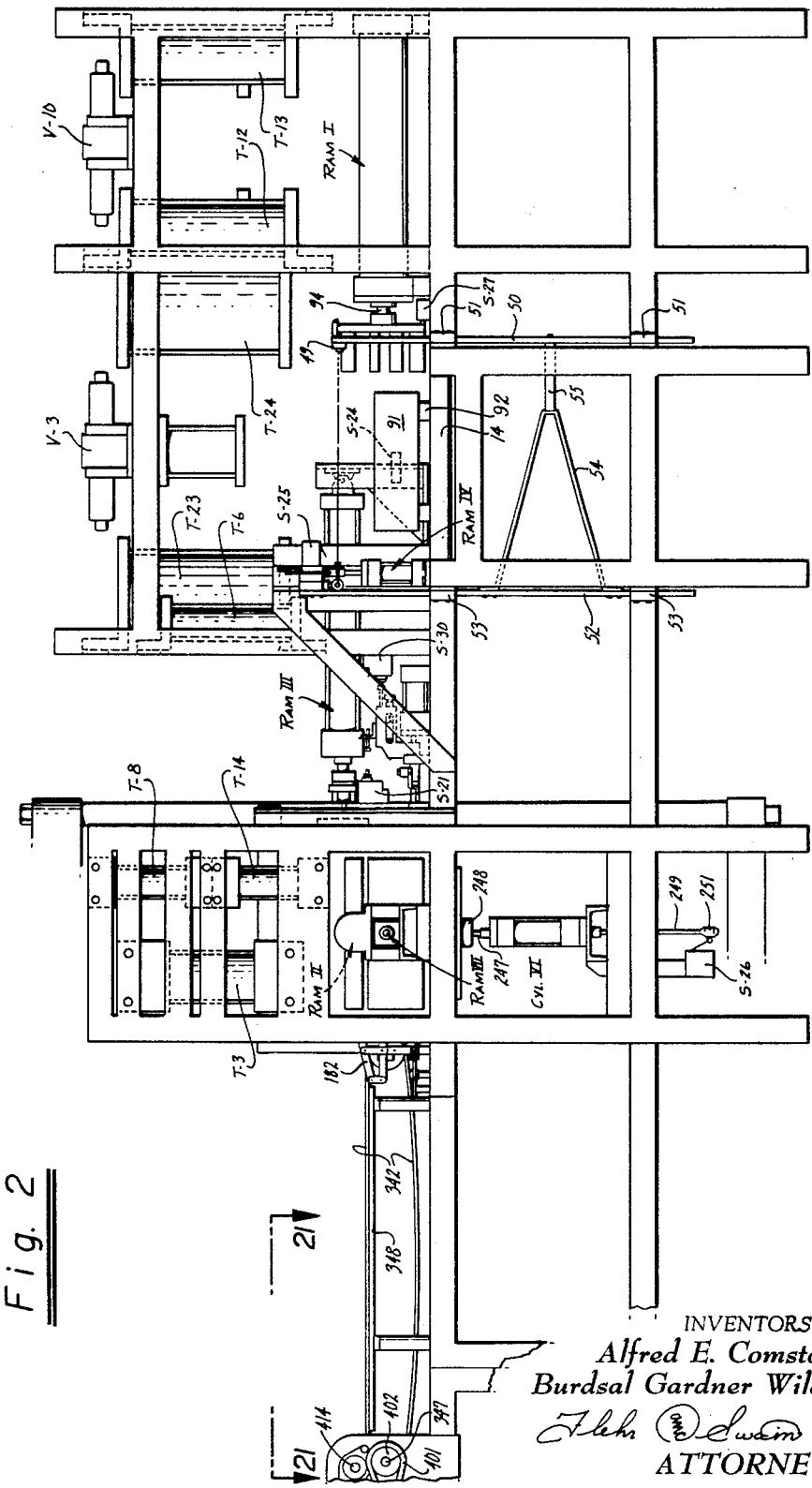
FIGURE 2 is a front elevational view of the apparatus shown in FIGURE 1 taken along lines 2—2 of FIGURE 1.

More in particular, as shown in the drawings, the apparatus for cutting and handling articles consists of a main frame 11 which is formed of a suitable material, such as stainless steel, which lends itself to steam cleaning. As shown in the drawings, the main frame 11 is formed of a plurality of structural steel members to form a support for the various parts of the apparatus. The apparatus includes three principal rams which are identified as ram I, ram II and ram III, which are mounted upon the main frame 11.

Ram I feed conveyor 13

A ram I feed conveyor 13 is also mounted on the frame 11 and consists of a plurality of equally spaced parallel rollers 14 which lie in a horizontal plane and are rotatably mounted in the main frame 11. Each of the rollers is positively and independently driven from a motor 16 (see FIGURE 24) through a speed reducer 17 and through an electrically operated clutch brake 18 of a conventional type such as one manufactured by the Warner Electric Company which includes brake and clutch solenoids SOL–35 and SOL–36 (see FIGURE 28B). The output shaft of the clutch brake 18 drives a sprocket 21 which drives a chain 22. The chain 22 drives one of the rollers 14 which drives the succeeding rollers 14 through a plurality of chains 24. The chains 24 are mounted upon pairs of sprockets 26 mounted upon shafts 27.

Bulk feed conveyor 31

A bulk feed conveyor 31 is provided for supplying the large blocks or articles to the ram I feed conveyor 13. The bulk feed conveyor 31 can be of any suitable type such as shown in FIGURE 24. As shown therein, it consists of a frame 32. A plurality of rollers 33 are rotatably mounted in the frame 32. A wide endless belt 34 is mounted on the rollers and is driven by a large roller or pulley 36. The roller 36 is driven from a chain 37 which is driven by a shaft 38. The shaft 38 is connected to a clutch brake unit 39 which is connected to a sprocket 40 driven by a chain 41. The chain 41 is driven by a sprocket 42 driven by the speed reducer 17.

A metal detector 44 is mounted over the bulk feed conveyor as shown in FIGURE 24. This metal detector can be of any suitable type such as one manufactured by RCA. The belt 34 and the portion of the conveyor 31 immediately adjacent to the metal detector 44 is all formed of non-metallic materials. This includes the frame 32, the rollers 33, the means for mounting the rollers and the belt 34. Such a construction is of the type well known to those skilled in the art and is required to make the metal detector 44 so that it can detect small undesirable metal objects in the articles being carried by the bulk conveyor.

Initial stop means 46

Means 46 is provided for arresting the travel of or initially stopping the travel of the articles on the ram I feed conveyor 13 and consists of suitable means such as a photoelectric cell identified as PC–3 which is mounted on the main frame 11 on one side of the conveyor 13 and a source of light 47 mounted on the other side of the conveyor 13 on the main frame 11. As hereinafter explained, when the article carried by the conveyor 13 interrupts the beam of light from lamp 47 to the photoelectric cell PC–3, a signal is supplied to stop the conveyor 13.

Height measuring means 48

Height measuring means 48 is provided on the ram I feed conveyor 13 for measuring the height of an article which has been carried to a position in which it interrupts the beam from the lamp 47. This means consists of a lamp (not shown) mounted within a rectangular housing 49 which is mounted upon a support member 50 slidably mounted for vertical movement in brackets 51 secured to the main frame 11. As can be seen in FIGURE 2, the housing 49 is mounted on one side of the conveyor 13. Photosensitive means in the form of a photocell PC–2 is mounted on the other side of the conveyor 13 and movable with a support member 52 slidably mounted for vertical movement in brackets 53 secured to the main frame 11 as hereinafter described. The support member 52 is connected to the piston of a cylinder IV as hereinafter described so that it moves with the piston. Means is provided for interconnecting the support members 50 and 52 so they move in unison as cylinder IV is operated and consists of a V-shaped member 54 secured to the support member 52 and a post 55 which is connected to the V-shaped member 54 and the support member 50.

Horizontal cutting means 56

Horizontal cutting means 56, which forms a first cutting means, is mounted on the framework 11 in front of ram I and is adjusted by the height measuring means 48. The horizontal cutting means consists of an outer rectangular frame 57 and an inner rectangular frame 58, which are mounted upon the main frame 11 in front of the ram I. Spaced horizontal holes 59 are provided in the opposite vertical members 58a of the inner frame 58. Spaced parallel horizontal cutting elements in the form of wires 61 extend across the inner frame 58 and through the openings 59 and have their ends secured to small carriages 62 which are adapted to travel vertically on the inner frame 58. The carriages 62 include means for tensioning the wires 61 so that they will be very taut.

Each of the carriages 62 consists of a block 63. A roller 64 is rotatably mounted on the block and engages the vertical members 58a of the inner frame 58. Each of the carriages also includes a pair of small rollers 65 mounted on the other side of the block 63 and which travel in vertical grooves 66 provided in vertical bars 67 mounted upon the outer frame 57. Means is provided in each of the carriages for securing one end of the wire thereto as shown in FIGURES 5 and 7. On the carriages 62 provided on the right-hand side as viewed in FIGURE 5, the wire 61 is secured to a pin 68 mounted upon the block 63. On the left-hand side, the wire is connected to a roll 69. This roll 69 is adapted to be rotated to a position so that the wire is taut and then secured in the desired angular position on the block 63 by a bolt 71. It will be noted that although the wires 61 extend horizontally in a longitudinal direction across the inner frame 58, the wires 61 are inclined at an angle in a lateral direction with respect to the inner frame 58 by connecting one end of the wire 61 near the front portion of the inner frame and the other end of the wire near the rear portion of the inner frame to facilitate cutting of the blocks as hereinafter described.

Means is provided for adjusting the carriages 62 and the wires 61 carried thereby vertically of the frame 58 in response to movement of the ram IV and consists of a plurality of arms 72, 73 and 74 provided on each side of the inner frame 58 and secured to the three carriages 62 provided on each side of the inner frame 58. The lower end of the arm 72 is pivotally connected directly to the uppermost carriage 62 as viewed in FIGURE 5, whereas the lower ends of the arms 73 and 74 are pivotally connected to additional arms 76 and 77 secured to the other two carriages 62. The upper ends of the arms 72, 73 and 74 are pivotally connected at spaced positions on arms 78. One end of each of the arms 78 is pivotally connected to a block 79 mounted on the outer frame 57. The other end of each of the arms 78 is pivotally connected to a link 81. The other end of the link 81 is pivotally connected to one end of an arm 82. The arm 82 is pivotally mounted on a pin 83 fixed to the outer frame 57. The other ends of the arms 82 are pivotally interconnected and are also connected to a link 84 by a pin 85. The other end of the link 84 is pivotally connected to a long arm 86 which is pivotally mounted on a pin 87 mounted on the outer frame 57. The other end of the arm 86 is pivotally connected to one end of a link 88 and the other end of the link 88 is pivotally connected to a plate 89 provided on the piston rod 90 of the cylinder IV. The support member 52 is secured to a block 80 adjustably mounted for vertical movement in the plate 89 by a screw 85 threaded into an ear 80a provided on the block. The photocell PC-2 is mounted on the block 80. The plate 89 is provided with an elongate portion 89a which is adapted to operate switches S-28 and S-29 as hereinafter described.

From the arrangement shown in FIGURE 5, it can be seen that as the plunger 90 of cylinder IV is raised, the inner end of the arm 86 will be pushed downwardly to push downwardly the inner ends of the arms 82. This will cause raising of the outer ends of the arms 82 about the pivots 83 which will cause the raising of the outer ends of the arms 78. Raising of the arms 78 will cause the arms 72, 73 and 74 and the associated carriages 62 secured thereto to also be raised. However, it will be noted that since the arms 72, 73 and 74 are secured at spaced points along the arms 78 that the carriages 62 secured thereto will be moved a distance proportional to the distance at which the arms 72, 73 and 74 are connected to each of the arms 78 measured from the point at which the arm 78 is connected to the link 81. Thus, the uppermost carriage 62 in FIGURE 5 will be moved the greatest distance, whereas the lowermost carriage will be moved the least distance. Such an arrangement is particularly desirable for cutting as hereinafter described to eliminate waste.

*Ram I*

As hereinafter explained, after the article has been stopped by the photosensitive switch PC-3 and its height measured by the switch PC-2 and the horizontal cutting means 56 adjusted accordingly, means is actuated to again cause the ram I feed conveyor to be operated to advance the article thereon until it engages a stop plate 91 (FIGURES 1 and 2) which is hingedly mounted on posts 92 (FIGURE 2) provided on the main frame 11. A microswitch S-24 is mounted on the frame 11 behind the stop plate 91 and is operated by the stop plate 91 when the article engages the stop plate to stop movement of the ram I feed conveyor 13 as hereinafter described. The stop plate 91 is positioned so that the article, when it is stopped, is properly positioned in front of the horizontal cutting means 56.

Means is provided for advancing the article after it has engaged the stop plate 91 to advance the same in a direction at right angles to the direction of advance by the conveyor 13 through the horizontal cutting means 56 and consists of a large ram, identified as ram I, which is mounted on the main frame 11 as shown particularly in FIGURE 2. The ram I is provided with a plunger 94. A pusher plate 95 (see FIGURE 1) is mounted on the plunger 94 and extends in a vertical plane. A plurality of spaced horizontal plates or bars 96 of a suitable material such as plastic are mounted upon the pusher plate 95 to provide three spaces 97, 98 and 99 which are arranged to receive the cutting wires 61 of the horizontal cutting means 56. The spaces 97, 98 and 99 are provided so that the wires 61 can enter therebetween and so that the ram I can advance the front ends of the bars 96 past the wires so that the article being cut can be advanced completely through the cutting wires 61 without difficulty. The space 98 is wider than the space 99 to accommodate the greater range of vertical adjustment for the intermediate wire 61, whereas the upper space 97 is still wider to accommodate the still possible greater vertical adjustment of the upper cutting wire 61.

The ram I, as well as rams II and III, can be of any suitable type such as a double acting hydraulic cylinder manufactured by the S-P Manufacturing Corp. of Cleveland, Ohio. Suitable means is provided for operating ram I and consists of a pump 101 (see FIGURE 26) which supplies compressed air through a valve 102 to a tank 103. Air from the tank 103 passes through a pressure switch PS-1 through a filter 106 to piping 107. A gauge 108 is provided for measuring the pressure of the air supplied to the piping 107. The piping 107 is connected through a valve V-10 to the upper portions of two tanks T-12 and T-13. As shown, the tanks T-12 and T-13 are partially filled with a suitable fluid such as hydraulic fluid. The valve V-10 is provided with solenoids SOL-26 and SOL-27 which control the flow of air through the piping 107 to the tanks T-12 and T-13. The valve V-10 or other similar valves used herein can be any suitable type such as ones manufactured by Numatics, Inc. of Highland, Mich.

When it is desired to advance the plunger 94 of ram I, it is merely necessary to cause air to be introduced into the top of the tank T-12 to cause hydraulic fluid to be forced therefrom into ram I to advance the plunger. Hydraulic fluid will then flow from the ram I into the tank T-13 and air will be exhausted through the exhaust port 109 provided on the valve V-10. Conversely, when it is desired to return the ram I, solenoid SOL-27 is operated to cause air to be supplied to the tank T-13 to cause the hydraulic fluid to be supplied to the other side of the plunger 94 to cause it to be returned.

Switches S-25 and S-27 are provided for energizing the solenoids SOL-26 and SOL-27 as hereinafter described. The switch S-25 causes return of ram I and is mounted upon the outer frame 57 of the horizontal cutting means 56 as shown in FIGURES 1 and 2. The switch S-25 is adapted to be operated by an actuating member 110 carried by the pusher plate 95. Switch S-27 is mounted on the frame 11 and is engaged by the back plate 95 to indicate that ram I has returned to its home position (see FIGURES 2 and 8). A panic button PB-1 is mounted on the frame 11 near the region of travel of ram I (see FIGURE 8) to cause emergency return of ram I.

*Elevator feed conveyor 111*

With the arrangement hereinbefore described, it can be seen that the article or block is cut into four separate superposed slices or slabs by the horizontal cutting means 56. These four slabs are advanced as a unit by the ram I onto an elevator feed conveyor 111. The elevator feed conveyor 111 is mounted in the main frame 11 and is disposed at right angles to the ram I feed conveyor 13. It is also constructed in a similar manner and consists of rollers 112 mounted on shafts 113 which are rotatably mounted in the main frame. Means is provided for positively driving each of the rollers 112 and consists of a gear motor 116 (see FIGURE 24) which drives a sprocket 117. The sprocket 117 drives a chain 118 which drives a sprocket 119 affixed to a shaft 121 rotatably mounted in pillow blocks 122 which are mounted upon the main frame 11. The shaft 121 is connected to a brake clutch mechanism 123 which drives a chain 124 which drives the first roller 112. The brake clutch mechanism 123 includes solenoids SOL-31 and SOL-32. Pairs of sprockets 126 are mounted on the shafts 113 and are driven by chains 127 to drive the rollers 112 in much the same way as the rollers 14 are driven in the conveyor 13.

*Length sensing means 131*

Figure 11:
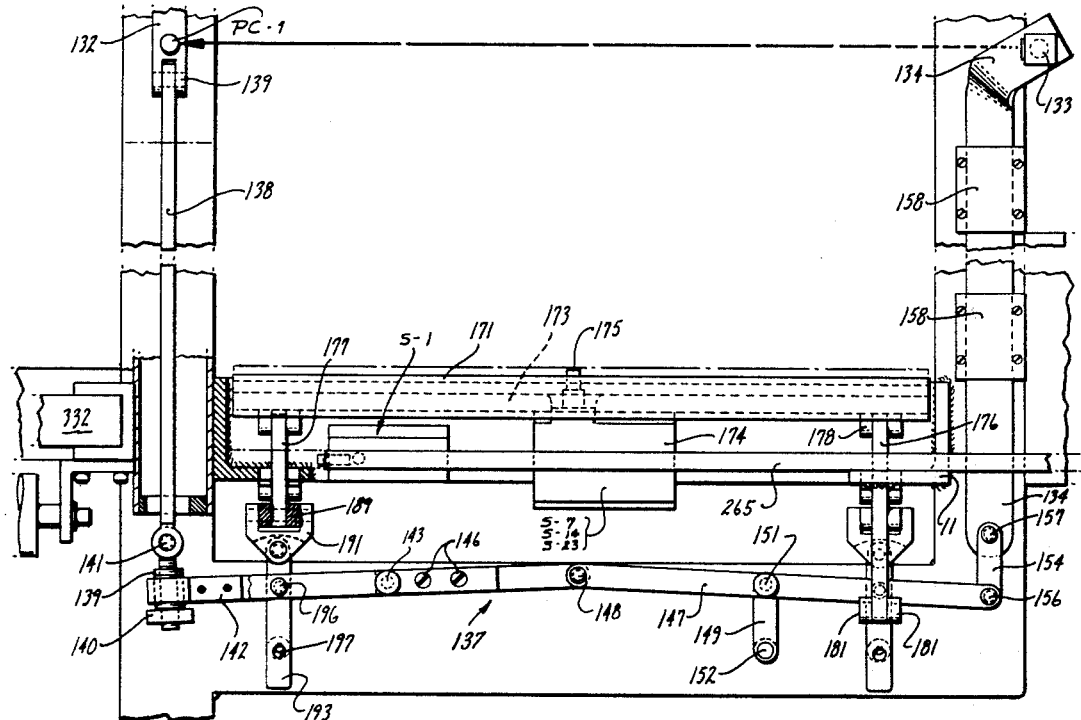
FIGURE 11 is an enlarged cross-sectional view taken along the line 11—11 of FIGURE 10.

As hereinafter explained, the block or article which has been cut is advanced by the conveyor 111. However, it should be pointed out that before the block or article is advanced, its length is sensed by length sensing means 131. This length sensing means consists of photosensitive sensing means identified as PC–1 (see FIGURES 11 and 14) which is mounted upon a support member 132. The photosensitive means PC–1 is adapted to receive light from a light source 133 mounted on a support member 134. Means is provided for shifting the position of the photosensitive means PC–1 until the article or block which has been advanced to the horizontal cutting means interrupts the passage of light to the photosensitive means PC–1. This means consists of a hydraulic actuator identified as ram V mounted on the main frame (see FIGURES 1 and 5). Ram V is provided with a plunger 136 upon which the support member 132 is mounted.

Figure 10:
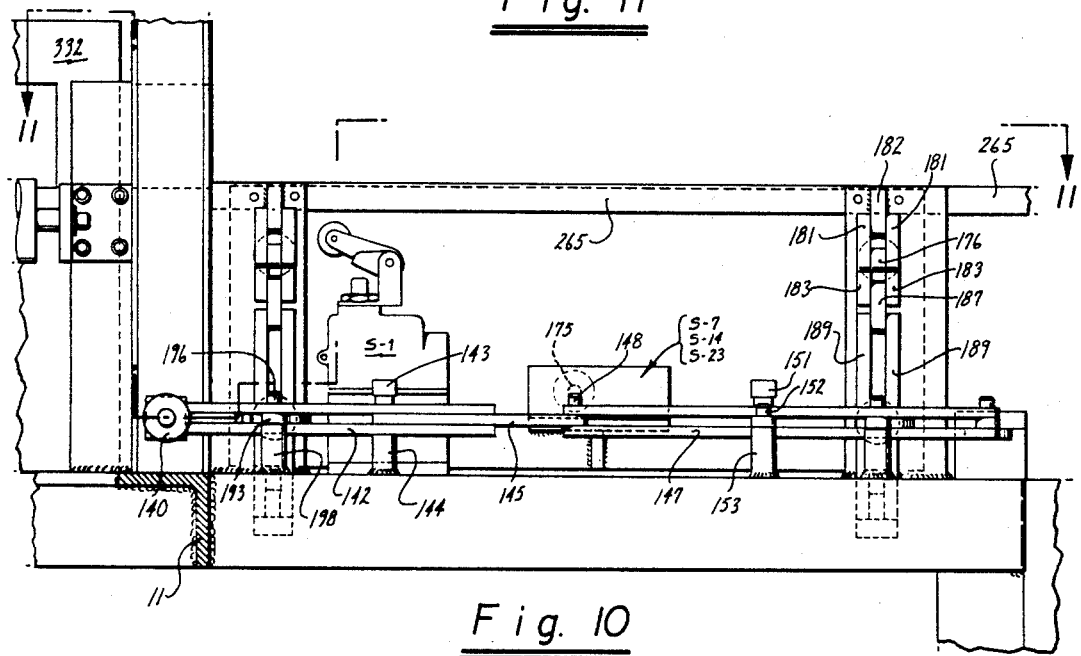
FIGURE 10 is an enlarged cross-sectional view looking along the line 10—10 of FIGURE 1.

A linkage 137 (see FIGURES 8, 10 and 11) is provided for connecting the photocell PC–1 and the lamp 133 so that they move in unison as ram V is operated. This linkage 137 consists of an arm 138 which is pivotally connected by a pin 135 to the support member 132. The arm 138 is pivotally connected to a threaded member 139 at 141. The threaded member 139 is threaded into one end of a pair of arms 142 and is locked in an adjusted position by a knob 140. The pair of arms 142 are pivotally mounted on a fixed pin 143 mounted in a post 144 carried by the frame 11. An extension arm 145 is secured between the arms 142 by suitable means such as screws 146. The end of extension arm 145 is pivotally connected between a pair of arms 147 by a pin 148. A link 149 is pivotally connected to the arms 147 intermediate the ends of the same by pin 151. The other end of the link 149 is pivotally connected to a fixed pivot pin 152 mounted in a post 153 carried by the frame 11. Another link 154 is pivotally connected between the ends of the arms 147 by a pin 156. The other end of the link 154 is pivotally connected to the support member 134 by a pin 157. The support member 134 is slidably mounted upon the framework for horizontal movement in brackets 158 mounted upon the frame 11.

With this arrangement, it can be seen that as the ram V is operated, the photocell PC–1 and the lamp 133 will be moved in unison longitudinally of the elevator feed conveyor to sense the length of the block placed on the elevator feed conveyor as hereinafter described. A switch S–21 is mounted on the frame 11 and is adapted to cause the cylinder V to return to its home position as hereinafter described. The switch S–21 is adapted to be operated by a cap screw 161 (FIGURE 8) mounted in a block 162. The cap screw 161 is held in the desired adjusted position by a lock nut 163. The block 162 is slidably mounted in the support member 132 and is adjustably positioned therein by a threaded screw 164 which is rotatably mounted in the support member 132. A switch S–30 which serves as a back limit switch as hereinafter described is mounted on the main frame 11. This switch is adapted to be operated by a cap screw 166 which is threaded into the support member 132 and locked in the desired adjusted position by lock nut 167.

After the length of the block has been measured as hereinafter described, the block is advanced by the elevator feed conveyor 111 until it engages a stop plate 171 (FIGURE 9). The stop plate 171 is hingedly mounted on its lower extremity at 172 on a movable support plate 173 and is prevented from falling forward by a lip 171a which engages the upper portion of the support plate 173. A switch housing 174 containing switches S–7, S–14 and S–23 is mounted upon the support plate 173 and is provided with an operating button 174a adapted to be operated by the stop plate 171 when the stop plate 171 is engaged by the block advanced by the elevator feed conveyor 111.

*Centering means 175*

In certain applications of the apparatus as hereinafter described, it is desirable to position the stop plate 171 so that the block is centered for cutting operations of the type hereinafter described. Such centering means 175 (see FIGURES 9–11) is actuated by the length sensing means 131 and consists of upper and lower links 176 and 177 which are pivotally connected between ears 178 provided on opposite sides of the movable support plate 173. The upper links 176 are pivotally connected to links 181. The links 181 are also pivotally connected to an arm 182 which is affixed to the main frame 11. A pair of arms 183 are pivotally mounted on the arm 182 by a pin 184. The arms are also pivotally connected to the upper arms 176 by pins 186. Extensions 187 are rigidly secured between the arms 183 and are pivotally connected at 188 to a pair of arms 189. The arms 189 are pivotally connected to the lower links 177 and between a yoke 191 at 192. The yoke 191 is pivotally connected to an arm 193. The lower portions of the arms 189 are pivotally connected by pins 194 to lugs 195 secured to the frame 11.

The arms 193 are adapted to be secured to the arms 142 and 147 by suitable means such as pins 196 so that the support plate 173 is moved with the arms 142 and 147. Alternatively, the arms 142 can be held in a fixed position by removing the pins 196 and placing them in holes 197 in the arms 193 and into posts 198 mounted on the frame 11.

When the support plate 173 is connected to the arms 142 and 147 by the pins 196, the support plate is moved longitudinally of the elevator feed conveyor 111 along with the photocell PC–1 and the lamp 133 of the length sensing means 131. This linkage provided is such so that the stop plate 171 is always maintained in a substantially vertical position and is not canted in one direction or another by a block which may engage the same. This is true because the support plate 173 is supported at all of its four corners and any loading on one of the corners will be distributed over the entire support plate by the linkage provided. As hereinafter described, by connecting the linkage for the support plate 173 to the length sensing means, the support plate 173 is positioned so that the stop plate will be engaged by the block of cheese at a point which will center the block of cheese regardless of the size of the block of cheese so that it will be properly positioned for future cutting operations as hereinafter described.

Suitable means such as hereinbefore described is provided for operating cylinder V and consists of fluid supplied from the piping 107 to a valve V–8 which is controlled by solenoids SOL–23 and SOL–24. The valve V–8 is connected to tanks T–10 and T–11. A stop valve V–9 controlled by a solenoid SOL–25 is provided for stopping the flow of fluid when the photoelectric sensing means PC–1 senses the leading edge of the block on the conveyor 111 as hereinafter described.

Similar means is provided for controlling cylinder IV hereinbefore described and consists of a valve V–11 which is connected to the piping 107 and which is controlled by solenoids SOL–28 and SOL–29. Fluid is supplied from the valve 11 to tanks T–14 and T–15 to cause fluid to flow therefrom. A stop valve V–12 is provided for stopping the flow of fluid when the photosensitive means in the form of switch PC–2 senses the top of the block.

*Vertical cutting means 201*

The length sensing means 131 is also utilized for adjusting additional or vertical cutting means 201 (FIGURES 1 and 9) when the vertical cutting means is used. The vertical cutting means consists of an outer rectangular frame 202 and an inner rectangular frame 203. The inner frame 203 is provided with vertically aligned, horizontally spaced openings 204 through which cutting wires 206 extend. The ends of the cutting wires 206 are secured to carriages 207 which are very similar to the carriages 62 hereinbefore described in connection with the horizontal cutting means 56. Thus, each of the carriages 207 is provided with a large roller 208 and a pair of small rollers 209 mounted upon a block 211. The large rollers ride upon the outer surface of the inner frame 203, whereas the small rollers 209 ride in grooves 212 provided in horizontal members 213 secured to the inner frame 203. The ends of the cutting wires 206 are secured to rolls or barrels 214 to retain the desired tension on the wires.

Means is provided for adjusting the positions of the carriages 207 to thereby adjust the positions of the vertical cutting wires 206 within the inner frame 203 and consists of a plurality of upper arms 216 which are pivotally connected to an arm 217 and a plurality of lower arms 218 which are pivotally connected to the arm 138 forming a part of the length sensing means 131. One end of each of the arms 216 and 218 is connected to a lever arm 221 which is pivotally mounted on a pin 222 secured to the outer frame 202. The other ends of the arms 216 are pivotally connected to the inner frame 203 by pins 223. The upper carriages 207 are pivotally connected to the arms 216 at different points depending upon their position along the inner frame 203 so that as the upper end of the arm 221 is shifted to the right as viewed in FIGURE 13, the ones nearest the right-hand edge will be shifted the least, whereas the one farthest removed will be shifted the greatest amount. This is readily accomplished as can be seen from FIGURE 13 by merely pivotally connecting each succeeding carriage at a higher point on the associated arm 216. Thus, for three of the carriages, extensions 224 are provided which are pivotally connected to the arms 216 by links 226. For others, links 226 alone are provided and for one, the arm 216 is pivotally connected directly to the associated carriage 207.

Figure 13:
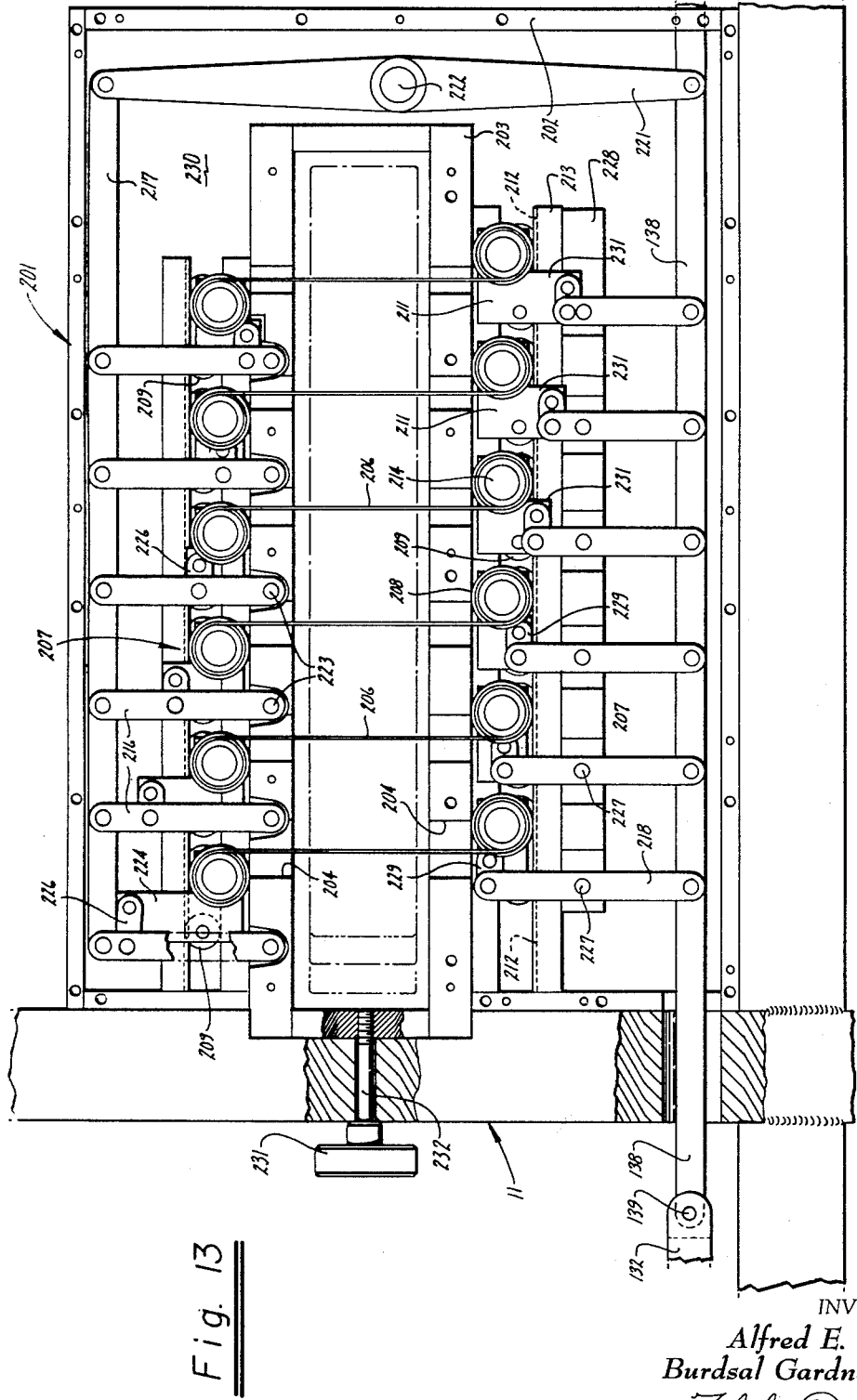
FIGURE 13 is an enlarged cross-sectional view taken along the line 13—13 of FIGURE 1.

Intermediate portions of the lower arms 218 are pivotally connected by pins 227 to a member 228 secured to the lower member 213 in FIGURE 13. The arms 218 are various lengths and have their ends pivotally connected to the lower carriages 207 by links 229. For certain carriages, extensions 231 are provided on the blocks 211 which are pivotally connected to the links as can be seen from FIGURE 13.

From the arrangement shown in FIGURE 13, it can be seen that the associated upper and lower carriages carrying the same wire 206 will be moved in unison by the linkage hereinbefore described and that the spaced parallel cutting elements or wires 206 will be moved a distance which is proportional to the distance they are from the right as viewed in FIGURE 13. It is for this reason that the openings 204 from the left become progressively smaller. Thus, it can be seen that the carriages 207 will be positioned in accordance with the length of the article sensed to thereby divide the length of the article to be cut into equal increments to reduce waste during the cutting operation to a minimum as hereinafter described. Cover plates 230 serve to cover the principal moving parts of the vertical cutting means.

Means is provided so that the vertical cutting means 201 can be removed when desired. This means consists of a knob 231 which carries the threaded rod 232 extending through the main frame 11 and threaded into the inner frame 203 to releaseably hold the vertical cutting means 138 in position on the main frame 11.

When vertical cutting means is not required as, for example, in the die cutting operations as hereinafter described, the vertical cutting means 201 can be removed by removing the threaded rod 232. In its place there can be substituted a rectangular frame 234 (FIGURE 1A) which can be secured to the main frame by threading the rod 232 into it. This frame 234 is provided with an upper surface which is at the same level as the upper surface of the lower portion of the inner frame 203.

*Elevator assembly 241*

Figure 16:
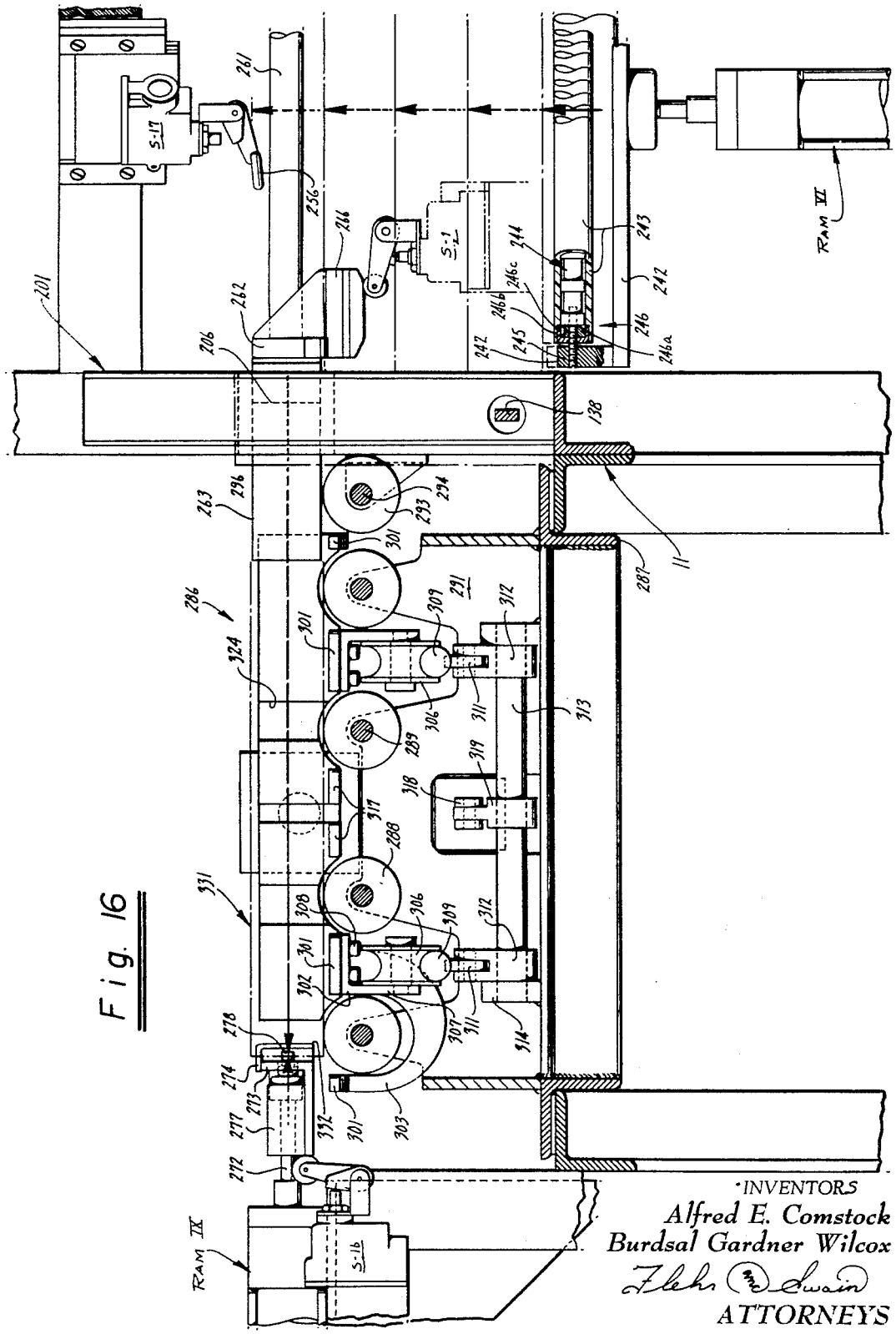
FIGURE 16 is an enlarged cross-sectional view taken along the line 16—16 of FIGURE 1.

At the time that the block is advanced into engagement with the stop plate 171 by the elevator feed conveyor 111, the block is also advanced onto an elevator assembly 241. This elevator assembly 241 (see FIGURE 9) consists of a rectangular U-shaped framework 242 which serves as a platform. A plurality of sleeve-like Delrin rollers 243 are rotatably mounted on shafts 244. The shafts 244 are carried by pins 245 rotatably mounted in the framework 242. One-way clutches 246 (see FIGURE 16) of a conventional type mounted such as manufactured by Helander Products, Inc. of Clinton, Conn. are on the pins 245 and as shown in FIGURE 9 consist of cam plates 246a affixed to the pins 245 and the shafts 244. A knurled cap 246b is mounted in the end of each Delrin sleeve 243. Means is provided to only permit rotation of caps 246b relative to the cam plate 246a in one direction and consists of rollers 246c mounted in slots 246d in the cam plate 246a and yieldably urged in one direction by springs 246e. The one-way clutches 246 permit rotation of the sleeve-like rollers 244 in one direction only, that is, in a direction in which the block can be moved thereon into engagement with the stop plate 171. Thus, when a block engages the stop plate 171, it cannot bounce or roll backwardly because of the one-way clutches provided on the rollers 243. For this reason, the block will be maintained in a precise position on the framework 243 of the elevator assembly 241 as soon as the stop plate 171 is engaged to operate the associated switches S–7, S–14 and S–23.

The framework 242 is normally positioned at an elevation so that the upper surface of the rollers 243 lie in the same place as the upper surfaces of the rollers 112 of the elevator feed conveyor 111. The framework 242 is supported in this position by elevator cylinder VI supported upon the main frame 11. The cylinder VI is provided with a plunger 247 which is affixed to a boss 248 mounted on the lower portion of the framework 242. As can be seen from FIGURE 9, the cylinder VI is mounted so that its plunger 247 moves in a vertical direction so that as the plunger 247 is raised and lowered, the platform-like framework 242 is raised and lowered. The plunger 247 is provided with an extension 249 which carries an operating arm 252 of switches S–22 and S–26 as the cylinder VI is operated to raise and lower the platform 242.

Another switch S–17 is associated with the elevator assembly 241 and is mounted upon a strap 254 carried by the framework 11. The switch S–17 is provided with an operating foot 256 which is adapted to be engaged by the top of the block on the elevator as it is raised by the elevator assembly 241 for a purpose hereinafter described.

Means is provided for operating elevator ram VI similar to that hereinbefore described for the other cylinders and rams and consists of fluid supplied from the piping 107 to a valve V–14 which is controlled by solenoids SOL–20 and SOL–21. The valve V–14 is connected to tanks T–8 and T–9. A stop valve V–13 is connected to the tank T–8 and is provided for controlling the flow of fluid from the ram VI. A flow control valve 256 is also provided, which is not shown in the schematic diagram in FIGURE 26.

*Ram II*

As hereinbefore pointed out, the block, before it is advanced onto the elevator assembly 241, has been cut in a horizontal direction to provide a plurality of superposed slices which form the block. Means is provided for advancing the slices one by one through the vertical cutting means 201 and consists of ram II which is mounted on the main frame 11 (see FIGURE 12). The ram II is provided with a plunger 261. A plate 262 is mounted on the plunger 261. A block plate 263 of suitable material such as plastic is secured to the plate 262 and is provided with a plurality of spaced, parallel, vertically extending slots 264 (see FIGURE 1) which are spaced so that they are adapted to receive the vertical cutting wires or elements 206. The block 263 is formed in this manner so that it can push off the top slice from the block through the vertical cutting wires to cut the block vertically into a plurality of smaller elongate blocks. Since the block 263 is provided with slots, the block can extend through the wires 206 and can push the top slice completely through the wires so that it is in front of the ram III.

The plate 262 is provided with a way 262a (FIGURE 12) on one side which receives a bar 265 and serves to guide the block 263 in its movement. A switch operating member 266 is carried by the plate 262 and which is adapted to operate switches S–1 and S–13 (FIGURE 12) mounted on the main frame. Another switch S–20 is mounted on the frame 11 (FIGURE 12) and is operated on return of ram II.

*Centering means 267 in front of ram III*

Figure 3:
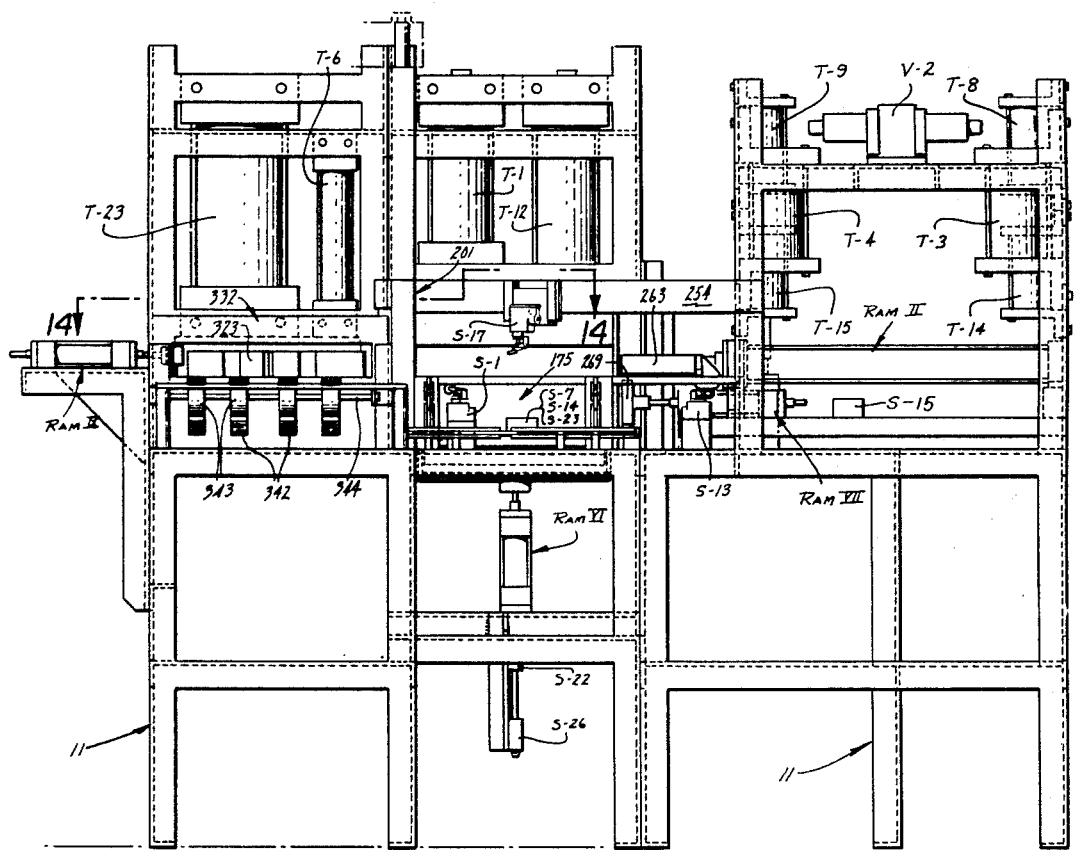
FIGURE 3 is a side elevational view of the apparatus shown in FIGURE 1 looking along the line 3—3 of FIGURE 1.

At the same time that ram II is operated, centering means 267 may be placed in operation as hereinafter described to center the blocks which are advanced by ram II in front of ram III. This centering means consists of a push cylinder VII which underlies the ram II and which is provided with a plunger 268. A sensing plate 269 is mounted on the plunger 268 and is adapted to be advanced by the ram VII into engagement with the block to hold the block up against the plate 230 of the vertical cutting means 201 for the purpose of centering the blocks which have been cut by the vertical cutting means 201 in front of the ram III, as hereinafter described. A switch S–15 is mounted on the frame 11 (FIGURE 3) and is operated when the push cylinder VII returns.

Means is provided for operating ram II and consists of compressed air which is supplied through piping 107 through a valve V–2 which is controlled by solenoids SOL–11 and SOL–12. The valve V–2 is connected to tanks T–3 and T–4 which are connected to opposite ends of the ram II. Similar means is provided for operating the push cylinder VII and consists of fluid which is supplied by the piping 107 to a valve V–3 which is controlled by solenoids SOL–13 and SOL–14. The valve V–3 is connected to tanks T–5 and T–6 which are connected to opposite ends of the cylinder VII. A pressure switch PS–2 is connected to the line from tank T–5. A valve V–5 controlled by solenoid SOL–15 is mounted in the line from tank T–5, and a valve V–6 controlled by solenoid SOL–16 is mounted in the line to tank T–6. As hereinafter described, when the pressure builds up behind the push cylinder VI after the sensing plate 269 has engaged the block, the pressure switch PS–2 is operated to prevent flow of additional fluid to advance the cylinder VII. The fluid which is discharged as the ram VII is advanced to stop cylinders VIII and IX. As hereinafter explained, since the stop cylinders VIII and IX are of the same size as the cylinder VIII, the fluid supplied to the stop cylinders VIII and IX from cylinder VII will cause the cylinders VIII and IX to be only advanced one-half the distance that the cylinder VII is advanced to thereby provide centering of the elongate blocks before the ram III.

The cylinders VIII and IX are connected to tank T–7. The flow from tank T–7 is controlled by valve V–4 which is controlled by solenoids SOL–18 and SOL–19. The cylinders VIII and IX are provided with plungers 271 and 272 on which is mounted a support plate 273. A stop plate 274 is mounted on the support plate 273 for hinged movement about a point 276. A switch housing 277 is mounted upon the support plate 273 and has mounted therein the switches S–2, S–8 and S–11 (see FIGURE 14) which are operated by the operating pin 278 which extends through the support plate 273 and is adapted to be engaged by the stop plate 274 when the stop plate is engaged by blocks advanced by the ram II. Another switch S–16 (FIGURE 14) is mounted on the frame 11 and is operated by the housing 277 when the stop cylinder VIII and IX return to their home positions.

*Ram III conveyor assembly 286*

As the blocks are advanced into engagement with the stop plate 274, the blocks are also advanced onto a ram III conveyor assembly 286 which is positioned ahead of the ram III. The ram III conveyor assembly consists of a framework 287 (see FIGURE 15) mounted within the main framework 11 so that it can be shifted to an out-of-the-way position as hereinafter described. A plurality of parallel spaced rollers 288 are mounted upon shafts 289 which are rotatably mounted upon the framework 287 by suitable means such as end plates 291 and 292. As can be seen from FIGURE 15, the rollers 288 lie in a horizontal plane and are arranged so they rotate in the direction of travel of the blocks as they are advanced by the ram II into engagement with the stop plate 274. An additional roller 293 mounted upon a shaft 294 rotatably mounted in brackets 296 carried by the frame 11 is provided for bridging the space between the vertical cutting means 201 and the rollers 288 forming a part of the ram III conveyor assembly 286.

The ram III conveyor assembly 286 also includes means for raising the blocks off of the rollers 288 at the time they are to be advanced by the ram III which consists of a plurality of spaced parallel fork-like blades 301 which are disposed between the spaced rollers 288 and which, in a normal position, lie in a horizontal plane which is below the horizontal plane in which the top surfaces of the rollers 288 lie. The blades 301 are directly secured to a block 302 formed of a suitable material such as plastic with the exception of one blade which is secured to the block 302 by a curved member 303. A pair of carriages 304 is secured to the block 302. Each carriage is provided with a grooved wheel 306 rotatably mounted in an L-shaped bracket 307 secured to the block 302 by suitable means such as screws 308. The wheels 306 are adapted to travel upon a pair of rods 309. Downwardly depending ears 311 are secured to the ends of the rods 309 and are pivotally connected to lugs 312 which are secured to a shaft 313. The shaft 313 is rotatably mounted in pillow blocks 314 mounted on the framework 287.

Means is provided for rotating the shaft 313 and consists of a ram X which is pivotally connected to the frame 287 at point 316 and which has a plunger 317 with a clevis 318 mounted on the outer end. The clevis 318 is pivotally connected to a lug 319 which is keyed to the shaft 313. It can be seen that the lugs 312 are normally in an inclined position so that the fork-like blades 301 are at elevations which are slightly below the upper surfaces provided by the rollers 288. When the plunger 317 is advanced, the lugs 312 are moved toward a vertical position to raise the rods 309 and the carriages which travel thereon so that the upper surfaces of the fork-like blades 301 are positioned or lifted above the rollers 288 to lift the blocks out of engagement with the rollers.

The block 302 is carried by the plunger 322 of ram III. The block 302 is provided with a plurality of spaced vertical recesses 324 to accommodate the cutting elements of the supplemental vertical cutting elements hereinafter described. Ram III is pivoted at 325 to the main frame 11 (see FIGURE 1).

A switch operating member 326 is carried upon a support member 327 mounted on bracket 328 secured to the block 302 and is adapted to operate two switches S–9 and S–3 mounted upon the main frame 11 as shown particularly in FIGURE 15.

Suitable means is provided for operating ram III and cylinder X and, as shown in FIGURE 26, a fluid is supplied from line 107 through valve V–1 which is controlled by solenoids SOL–1 and SOL–2. The valves are connected to tanks T–1 and T–2 which are connected to opposite ends of the ram III. The tanks T–1 and T–2 are also connected to opposite ends of the cylinder X.

*Supplemental vertical cutting means 331*

Supplemental vertical cutting means 331 is provided on the frame 11 for cutting the elongate blocks or parts as they are advanced by the ram III. This additional vertical cutting means consists of a framework 332 in which one or more parallel spaced vertical cutting elements 333 are mounted. The cutting element 333 shown in FIGURE 14 is formed of a rod 334 mounted in the framework 332. The rod 334 has been machined to provide the elongate cutting member 333, which is wedge shaped in cross-section, with a sharp edge facing toward ram III. This wedge-shaped configuration spreads the blocks apart so that they will not adhere to each other after they have been cut. The supplemental vertical cutting means 331 is readily interchangeable with other supplemental vertical cutting means in which the spacing between the cutting wires is different to thereby make it possible to cut the elongate blocks of various numbers of separate parts.

Thus, it can be seen that as the fork-like blades 301 are raised, they are also advanced by the ram III to advance the slices which have been cut into elongate blocks or parts by the first vertical cutting means 201 as a unit through the second or supplemental vertical cutting means 331 to cut the elongate parts into smaller parts and to advance the slice in a direction which is at right angles to the direction in which the slice was advanced through the first vertical cutting means. As pointed out previously, the block 332 advanced by the ram III is provided with recesses 324 so that the slice can be completely advanced through the vertical cutting means 331. They are deposited upon a first delivery conveyor 341, and the ram III and cylinder I return to home positions as hereinafter described.

*Delivery conveyors 341 and 351*

The first delivery conveyor 341 consists of a plurality of nine chain belts 342 formed of a suitable material such as stainless steel covered with Delrin which are carried on Delrin pulleys 343 mounted on a shaft 344 rotatably mounted in the frame 11. The belts are also carried by pulleys 346 rotatably mounted upon another shaft 347 rotatably mounted in the frame 11. As can be seen particularly from FIGURE 24, the belts 342 travel in spaced parallel paths and are spaced apart so that the blades 301 can be lowered between the same to deposit the cut parts or blocks carried by the blades onto the belts 342. Relatively shallow channel members 348 are mounted upon the frame 11 and are adapted to receive the belts 342 and to guide the same.

Figure 21:
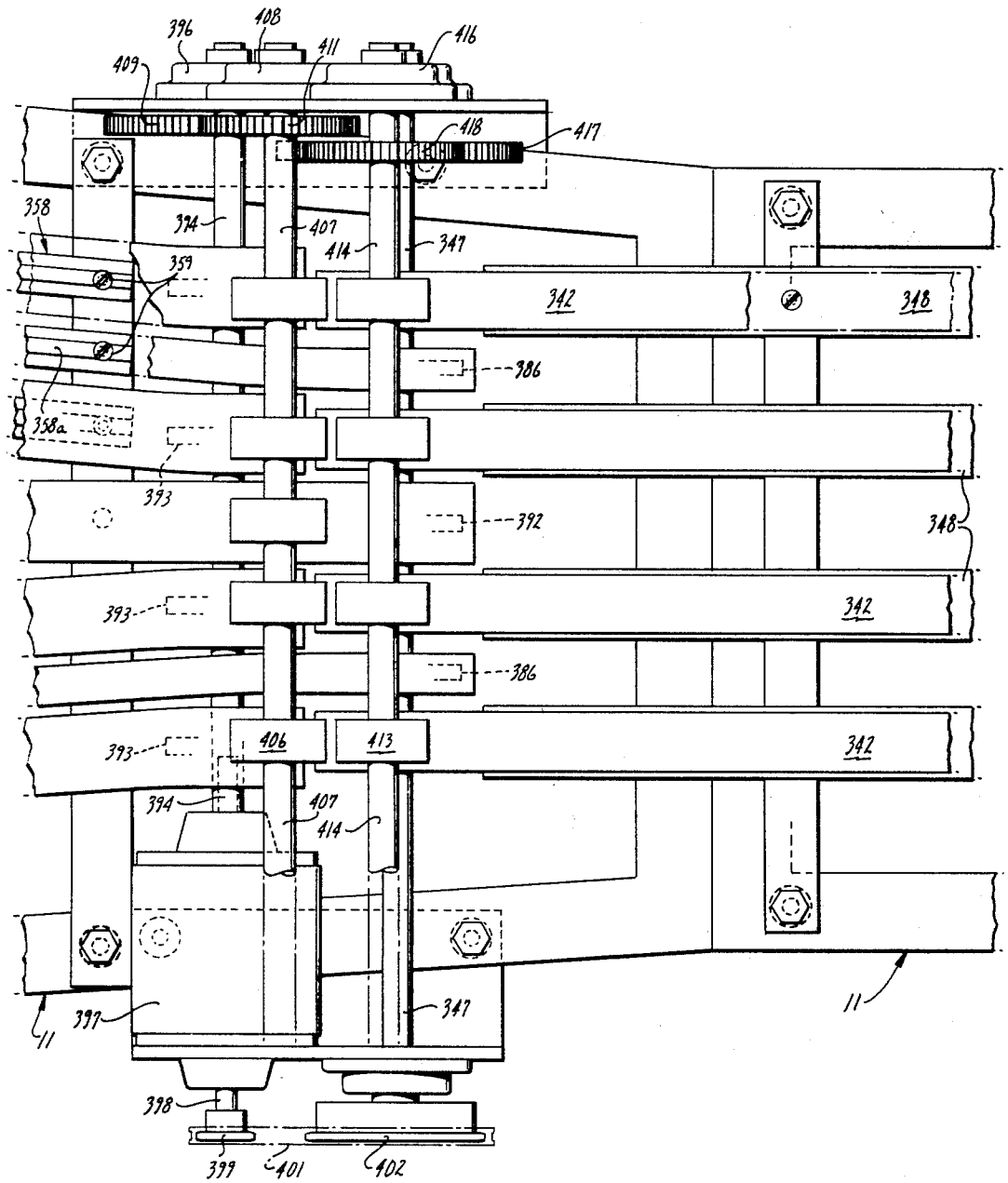
FIGURE 21 is an enlarged top plan view looking along the line 21—21 of FIGURE 2.
Figure 25A:
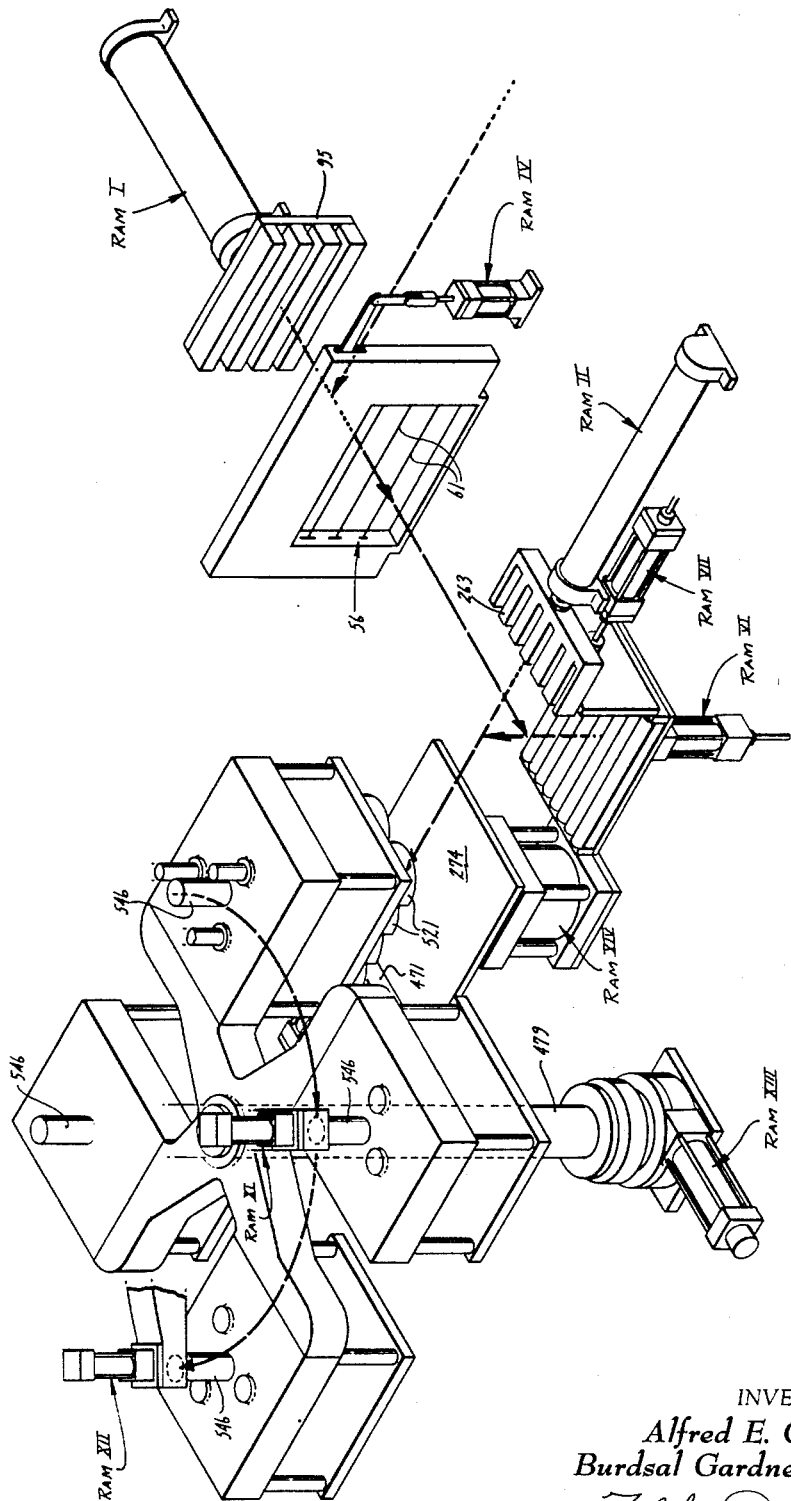
FIGURE 25A is an isometric view schematically illustrating major portions of the apparatus when utilized for a die cutting operation.
Figure 27A:
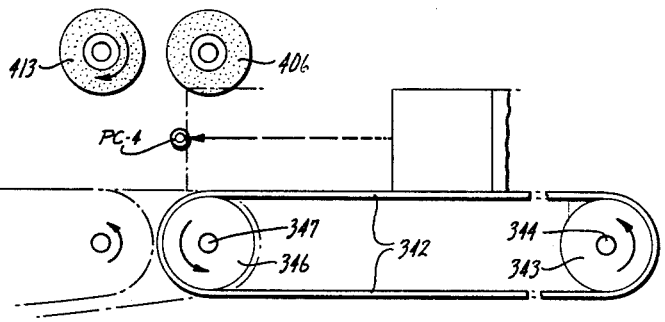
FIGURES 27A–27G are schematic views showing advance of small blocks by delivery conveyors to the wrapping machine.

A second or additional delivery conveyor 351 is adapted to receive the parts from the delivery conveyor 341 and consists of a plurality of chain belts 352. The chain belts 352 are of a conventional construction and consist of a plurality of links 353 (see FIGURE 27F) which are pivotally interconnected by smaller links 354. Carrying plates or tops 356 of a suitable material such as Delrin are mounted on the links 353. At certain spaced intervals, the chain belts 352 are provided with upstanding lugs 357 which are adapted to positively advance the product thereon in a timed relationship as hereinafter described. As is also well known to those skilled in the art, the chain belts 352 are provided with grooves (not shown) which are seated on raised portions 358a formed on bars 358 extending substantially longitudinally of the additional delivery conveyor 351. As shown in FIGURE 21, the rear ends of the bars 358 are pivotally connected to the frame 11 by suitable means such as screws 359. The other ends of the bars are secured to channel members 360 which rest upon the framework 11 and are guided by the chain belts 352 as they are adjusted laterally as hereinafter described. As can be seen in FIGURE 23, the upper sides of the channel members 360 extend above the tops 356 of the chain belt. The channel members are formed with upwardly and forwardly inclined portions 360a.

The forward ends of the chain belts 352 travel over three separate sprocket wheel assemblies 361, 362 and 363, each of which is provided with three sprockets 364 and over which the chain belts 352 travel. The sprocket wheel assemblies 361, 362 and 363 are mounted on a shaft 366 in such a manner that the spacing between the chain belts 352 can be adjusted. Thus, the sprocket wheel assembly 362 is fixed to the shaft, whereas the sprocket wheel assemblies 361 and 363 are keyed to the shaft 366 for movement axially of the shaft. The shaft 366 is rotatably mounted upon the main frame 11 by bearings 367 mounted upon the frame 11.

Means is provided for shifting the sprocket assemblies 361 and 363 on the shaft 366 and consists of a hand lever 371 which is pivotally mounted upon the frame 11 at 372. The lever 371 is provided with an extension 373 which seats in a groove 374 formed in a collar 376. The hand lever 372 is pivotally connected to another lever 377 by a link 378. The lever 371 is pivoted on the frame 11 at 379. The lever arm is provided with an extension 381 which is adapted to travel in a groove 382 provided in a collar 383 secured to the sprocket wheel assembly 363. It can be seen that as the hand lever 371 is operated between the solid line position and the broken line position shown in FIGURE 22 that the outer sprocket wheel assemblies 361 and 363 are shifted axially of the shaft 366 with respect to the center sprocket wheel assembly 362. In this manner, it is possible to adjust the additional or second delivery conveyor 351 so that it can either carry two parts or blocks abreast or three parts or blocks abreast.

It will be noted from FIGURE 22 that of the three chain belts 352 carried by the sprocket 361, the center chain belt is narrower than the other two. The same is true of the belts 352 carried by the sprocket wheel assembly 361. The center chain belts 352 carried by the sprocket wheel assemblies 361 and 363 are mounted upon sprockets 386 which are rotatably mounted upon the shaft 357.

The chain belts 352 provided on the center sprocket wheel assembly 362 consist of one wide belt and two outer narrower belts. The two narrower belts are mounted upon sprockets 388 secured to a shaft 389 rotatably mounted in pillow blocks (not shown) mounted upon the main frame 11 (see FIGURE 24). The wider belt carried by the sprocket wheel assembly 362 is rotatably mounted upon a sprocket 392 rotatably mounted upon the shaft 347 (FIGURE 21). The wider chain belts 352 carried by the outer sprocket wheel assemblies 361 and 363 are rotatably mounted upon sprockets 393 which are mounted upon a shaft 394. One end of the shaft 394 is mounted in a bearing 396 secured to the main frame 11 and the other end of the shaft 394 is mounted in a clutch-brake unit 397 of a conventional type which is mounted on the main frame. The clutch-brake unit 397 includes a clutch solenoid SOL-36 and a brake solenoid SOL-37. The clutch-brake unit 397 is provided with an output shaft 398 upon which is mounted a sprocket 399 which drives a chain 401. The chain 401 drives sprocket 402 of a substantially larger diameter which is mounted on the shaft 347 and drives the shaft 347 of the first delivery conveyor 341.

The additional delivery conveyor 351 is provided with supplemental article or block driving means at its infeed end which consists of a plurality of rollers 406 formed of a suitable material such as sponge rubber which are mounted on a shaft 407. The shaft 407 is rotatably mounted upon the main frame 11 by bearings 408. The rollers 406 frictionally engage the shaft 407 so that they can be readily shifted axially of the shaft to any position desired.

Means is provided for driving the shaft 407 from the additional delivery conveyor 351 and consists of a spur gear 409 which is secured to the shaft 394 and which drives a smaller spur gear 411 affixed to the shaft 407. Thus, it can be seen that as the shaft 394 is rotated, the shaft 407 will be rotated.

The delivery conveyor 341 also includes additional drive means at its outfeed end which consists of a plurality of rollers 413 formed of a suitable material such as sponge rubber which are spaced on a shaft 414. The rollers 413 like the rollers 406 can be readily shifted axially of the shaft 414 to the desired positions. The shaft 414 is rotatably mounted upon the framework 11 by bearings 416. Means is provided for driving the shaft 414 from the shaft 347 of the delivery conveyor 341 and consists of a spur gear 417 which is affixed to the shaft 347 which drives a smaller spur gear 418 affixed to the shaft 414. Thus, it can be seen that as the shaft 347 is rotated, the shaft 414 will be rotated.

Means is provided for driving the additional delivery conveyor 351 from the wrapping machine with which the apparatus is to be used. By way of example, one wrapping machine represented schematically at 421 can be of a type manufactured by the Hudson Sharp Plant of FMC Corporation which is provided with a shaft 422 which operates in a timed relationship with respect to the travel of the conveyor 423 to which the articles to be wrapped are to be delivered. A sprocket 424 is mounted on this continuously rotating shaft 422 and drives a chain 426. The chain 426 drives a sprocket 427 of an angle gear 428 which is mounted on the framework 11. The angle gear can be of any suitable type such as a Model R-333 manufactured by Airborne Accessories Corp. of Hillside, N.J. The angle gear drives a shaft 431 upon which two sprocket wheels 432 and 433 are affixed. The sprocket wheel 432 drives a chain 434 and the chain 434 drives a sprocket 436 which is rotatably mounted upon the shaft 366. The sprocket wheel 433 drives a chain 437 which drives a sprocket wheel 438 rotatably mounted on the shaft 366. A collar 439 is keyed to the shaft 366 but is movable axially of the shaft 366 so that jaws 441 carried thereby can engage either the jaws 442 carried by the sprockets 436 and 438 so that the shaft 366 can be driven by either the sprocket wheel 436 or by the sprocket wheel 438. The tooth ratio between the sprockets 432 and 436 is such that there is a 1:1 ratio in the drive, whereas the tooth ratio between the sprockets 433 and 438 is such that the ratio is 1½:1. It can be seen that the collar 439 and the sprockets 436 and 438 form a jaw clutch which is utilized for driving the shaft 366 at two different speeds. This dual speed arrangement is utilized for a purpose hereinafter described.

Means is provided for shifting the collar 439 to engage either the sprocket 436 or the sprocket 438 and consists of a link 444 which is pivotally connected to the lever arm 377 at 446. The link 446 is also pivotally connected to an arm 447 at 448. The arm 447 is pivotally mounted on the main frame 11 at 449 and carries an extension 451 which is adapted to engage a groove 452 provided in the collar 439. From this arrangement, it can be seen that when the hand lever 371 is operated to move the outer sprocket wheel assemblies 361 and 363 into closer proximity with the sprocket wheel assembly 362 that at the same time the collar 439 is moved into engagement with the sprocket 438 so that the shaft 366 will be driven at a faster speed. Conversely, when the lever arm is moved to the solid line position as shown in FIGURE 22, the outer sprocket wheel assemblies 361 and 363 are moved apart from the sprocket wheel assembly 362, and at the same time, the collar 439 is moved into engagement with the sprocket wheel 436 to cause the shaft 366 to rotate at a slower speed.

A cam wheel 454 is mounted on the shaft 366 and is driven with the shaft. The cam wheel 454 is provided with a single lobe 454a which is adapted to operate a switch S-45 for controlling the brake-clutch unit 397 as hereinafter described.

A pulse accumulator 456 (FIGURE 1) is provided which electronically accumulates the pulses which are produced by a magnetic switch S-46 and produces a switch closure after every eight, ten, fourteen or twenty-one articles are delivered to the wrapping machine depending upon which number is selected on the pulse accumulator. The pulse accumulator can be of any suitable type such as one manufactured by Tensor Manufacturing Company of Monterey, Calif.

The magnetic switch S-46 can also be of any suitable type such as one manufactured by Tensor Manufacturing Company. The switch S-46 is operated by a small permanent bar magnet 458 mounted on the end of a shaft 459 of the wrapping machine 421. The shaft 459 makes one rotation for each article wrapped by the wrapping machine so that a pulse is supplied to the pulse accumulator 456 for each article wrapped.

*Description of additional components used for die cutting*

As hereinafter explained, the method and apparatus for cutting and handling articles herein described, in addition to being used for cutting large blocks into smaller rectangular consumer-sized blocks, can also be utilized for cutting large blocks into consumer-sized blocks having a particular configuration by utilizing die cutting means.

When the apparatus is to be used for die cutting, the entire ram III conveyor assembly 286 with ram III and its associated parts mounted on the framework 287 is moved to the rear to an out-of-the-way position as shown in FIGURE 1A. As hereinbefore explained, a frame 234 is positioned on the frame 11 in place of the vertical cutting means 201 and the framework 332 forming the supplemental vertical cutting means 331 is removed. A Teflon covered platform 471 (see FIGURE 4) is disposed in the main frame in the position generally occupied by the ram III conveyor assembly 286. This product platform is adapted to be raised and lowered as hereinafter described. A die cutting mechanism 472 is mounted on the framework 11 and operates in conjunction with the product platform 471 as hereinafter described.

*Die cutting assembly 472*

The die cutting assembly 472 consists of a large cross-shaped member 473 which is provided with three arms 474 of the same length and an arm 476 which is slightly longer. The cross-shaped member 473 is supported upon a cylindrical hollow post 477 which is supported in a sleeve 478 rotatably mounted in a housing 479 secured to the main frame 11. The sleeve 478 is connected to a connector assembly 483 which is connected to the spindle (not shown) of an indexing table 486 of a suitable type such as one manufactured by Air Hydraulics, Inc. of Jackson, Mich.

The indexing table 486 is mounted upon the main frame 11 which includes a cross brace 487. A tensioning rod 488 extends through the post 477 and through the indexing table 486. A plate 491 is mounted on the rod 488 above the cross-shaped member 473. A nut 492 is threaded on the rod 488 and engages the plate 491. A nut 493 is threaded on the other end of the rod 488 and engages the cross brace 487. Another tensioning rod 496 is mounted in the main frame 11 and extends through the longer arm 476 of the cross-shaped member 473 and also through the brace 487. Nuts 497 and 498 are threaded on opposite ends of the rod 496. From the construction hereinbefore described, it can be seen that the tensioning rods 488 and 496 tie the framework 11, the cross-shaped member 473, the post 477, the table 486 and the brace 487 into a rigid rectangular framework 499 which is particularly adapted to withstand the relatively large stresses which are built up in the die cutting mechanism 472 during the die cutting operation.

The die cutting mechanism 472 also includes an additional cross-shaped member 501 which is provided with four arms 502. The cross-shaped member 501 is secured to the sleeve 478 so that it is rotated by the indexing table 486 as the indexing table 486 is operated as hereinafter described. The arms 502 are disposed in a horizontal plane and extend radially from the sleeve 478 and are spaced 90° from each other.

Figure 17:
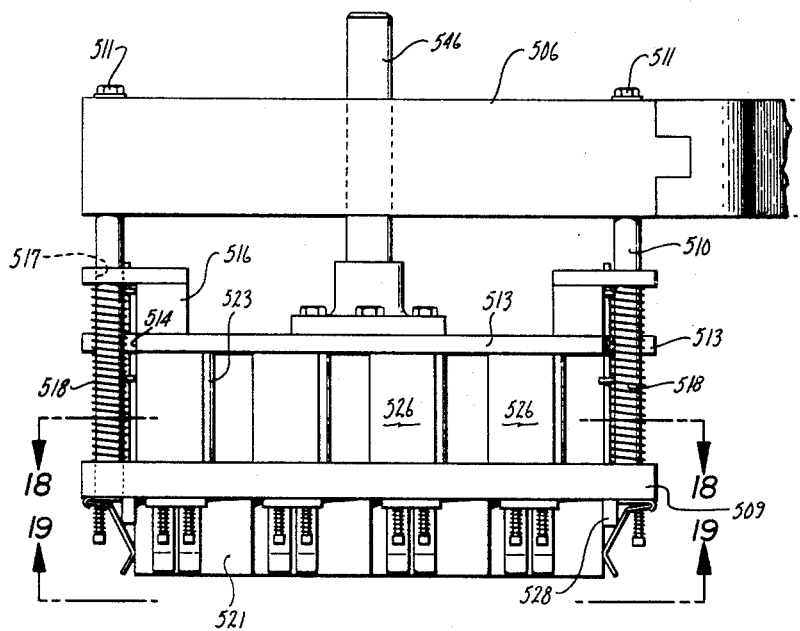
FIGURE 17 is a cross-sectional view taken along the line 17—17 of FIGURE 1A.

A die cutting assembly 504 is mounted on each of the arms 502. Each die cutting assembly 504 consists of an upper rectangular framework 506. Suitable means is provided for securing the framework 506 to the arm 502 and consists of a tongue and groove connection 507 and a rod 508 which is threaded into the framework 506 and a nut 508a which is threaded on the rod and engages the arm 502. Each die cutting assembly 504 also includes a lower rectangular plate 509 (FIGURE 17). The lower ends of vertical rods 510 are rigidly secured to the lower plate 509 and extend upwardly through the rectangular framework 506 and are secured thereto by suitable means such as cap screws 511. Support posts 512 are mounted on the cross-shaped member 473 for supporting the die cutting assemblies 504 during a die cutting operation as hereinafter described.

Figure 18:
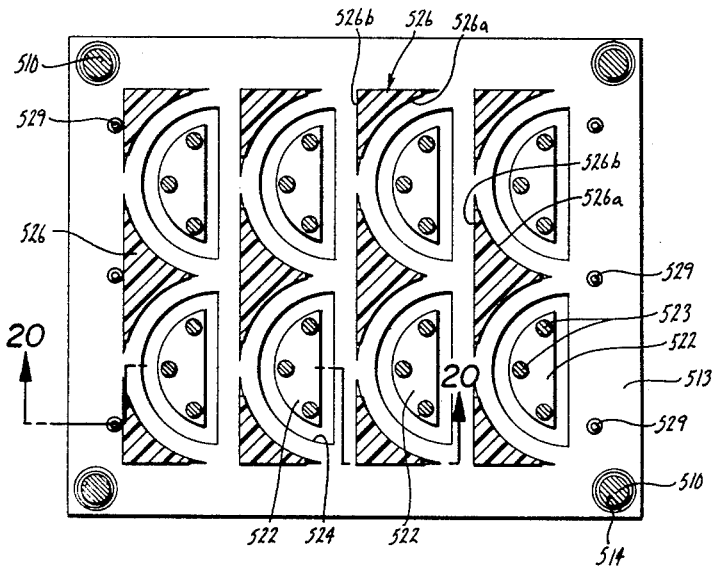
FIGURE 18 is an enlarged cross-sectional view taken along the line 18—18 of FIGURE 17.

The die cutting assembly 504 also includes an upper plate 513 which is disposed above the lower plate 509 and below the framework 506. The upper plate 513 is provided with holes 514 to accommodate the rods 510 as shown in FIGURE 18. L-shaped brackets 516 are secured to the upper plate 513 and are also provided with holes 517 to accommodate the rods 510.

Figure 19:
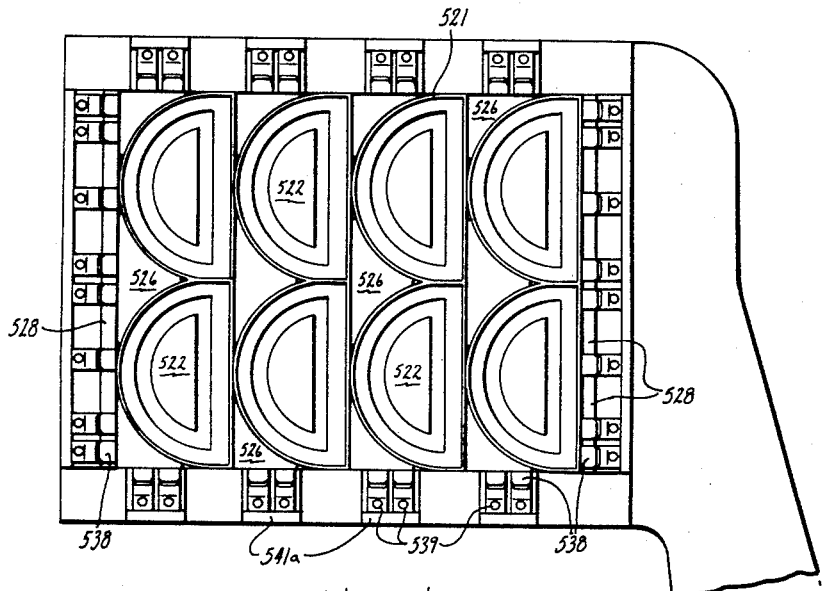
FIGURE 19 is an enlarged view looking along the line 19—19 of FIGURE 17.

Means is provided for yieldably supporting the upper plate 513 above the lower plate 509 and consists of springs 518 which are axially disposed on the rods 510. The springs 518 extend through the holes 514 and the upper plate 513 and have their lower ends engaging the lower plate 509 and their upper ends engaging the brackets 516. A plurality of die cutting members 521 are mounted on the lower plate 509 and can have any desired configuration. For example, as shown in FIGURE 19, the die cutting members 521 are generally semicircular in cross-section to make it possible to cut semicircular blocks of cheese from slices as hereinafter described to provide a configuration which is normally associated with Longhorn cheese. In the arrangement shown in FIGURE 19, eight such dies have been provided arranged in two rows of four each.

Figure 20:
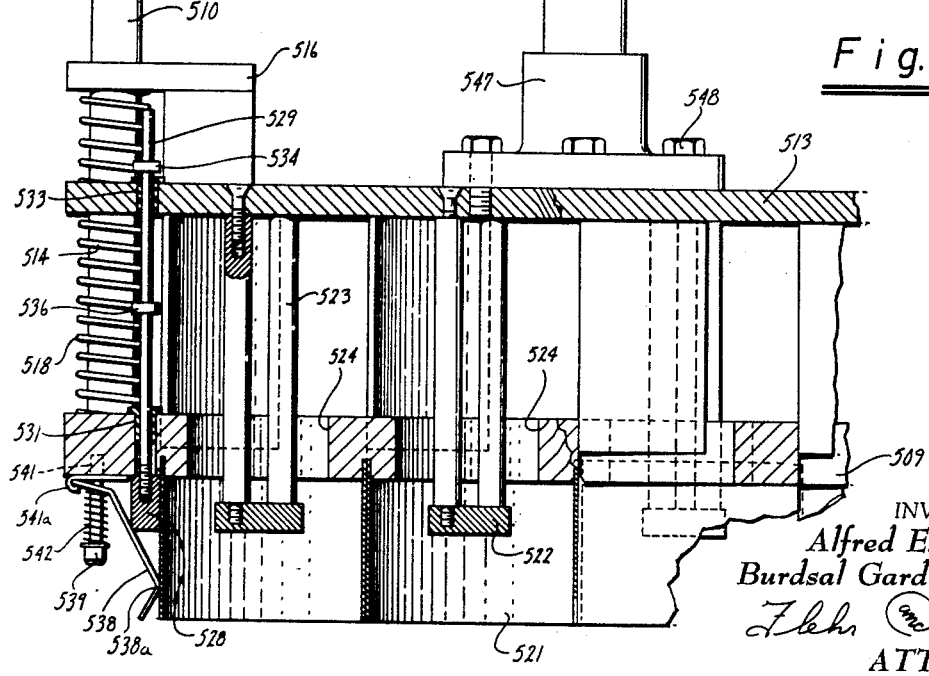
FIGURE 20 is an enlarged fragmentary cross-sectional view taken along the line 20—20 of FIGURE 18.

A product push-out member 522 is disposed in each of the die cutting members 521 and is formed of a suitable material such as Delrin. As can be seen, the product push-out members 522 are also semicircular in shape but have a size which is substantially less than the cross sectional area of the die cutting members 521. Means is provided for mounting the product push-out members 522 so that they move with the upper plate 513 and consists of three vertical posts 523 which are secured to the members 522 and to the upper plate 513 as shown in FIGURE 20. The posts 523 extend through openings 524 provided in the lower plate 509.

Trim push-out means is also carried by the upper plate 513 and consists of a plurality of blocks 526 of a suitable material such as plastic which have inner cured surfaces 526a and inner flat surfaces 526b which conform to the outer surfaces of the die cutting members 521 and which take up the space between the die cutting members 521 to push out the remaining trim from the die cutting assembly 504 as hereinafter described.

Additional trim push-out means is provided and consists of blocks 528 which are disposed on the outer sides of the die cutting members 521 below the lower surface of the lower plate 509. The blocks 528 are supported by rods 529 (FIGURE 20) which are threaded into the blocks and are slidably mounted in bushings 531 and 532 provided in the lower plate 509 and the upper plate 513. The rods 529 are also mounted in the upper plate 513. Upper and lower collars 534 and 536 are provided on each of the rods with the upper collar 534 being disposed above the upper plate 513 and the lower collar 536 being disposed below the plate 513 as shown in FIGURE 20.

Trim retaining means is also mounted on each of the die cutting assemblies 504 and consists of a plurality of spaced spring-like fingers 538 which are loosely mounted on cap screws 539 threaded into the lower plate 509. The upper extremities of the fingers 538 are received by inturned U-shaped portions 541a of members 541 secured to the lower plate 509. A spring 542 is axially mounted on each of the cap screws 539 and serves to urge a curved portion 538a of each of the fingers 538 yieldably into engagement with the die cutting members 521 as shown particularly in FIGURE 20.

A vertically extending actuating rod or stub shaft 546 is mounted in a flanged collar 547 which is secured to the upper plate 513 by suitable means such as cap screws 548. The actuating shaft 546 is slidably mounted in the framework 506 of the die cutting assembly 504.

Figure 3A:
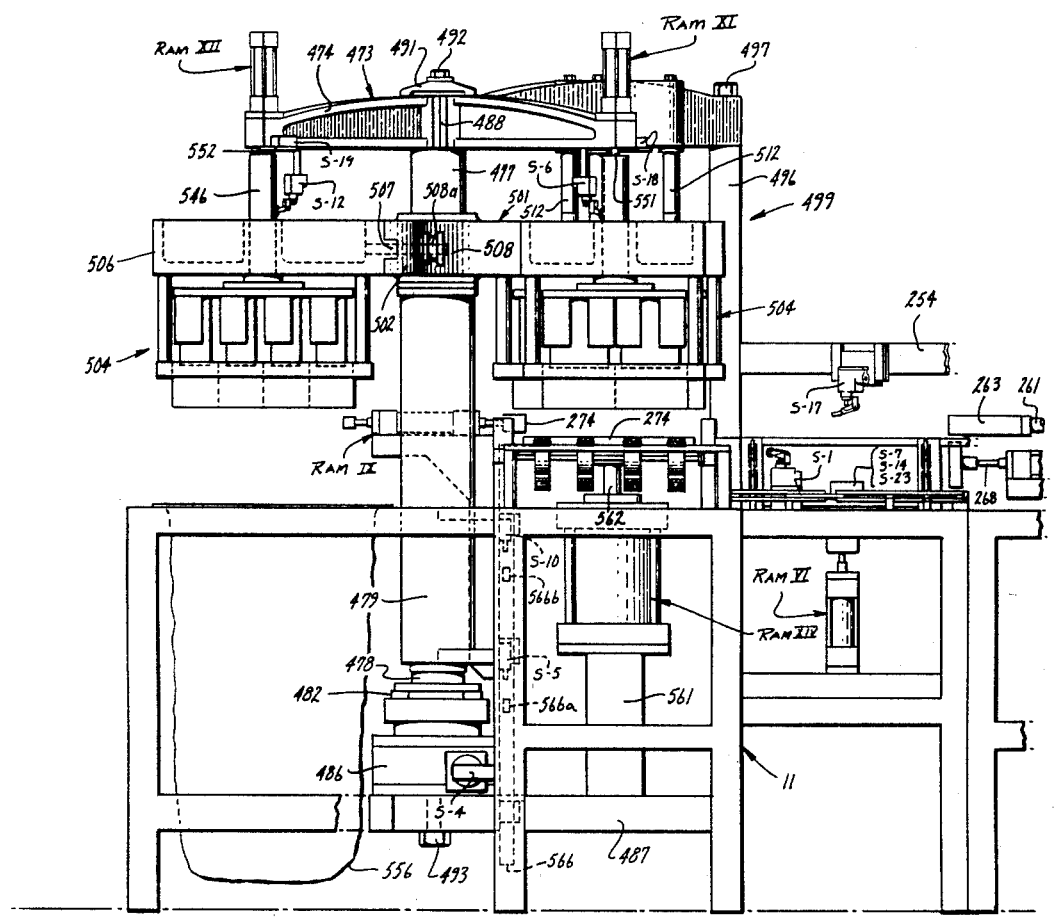
FIGURE 3A is a side elevational view similar to FIGURE 3 looking along the line 3A—3A of FIGURE 1A.

Means is provided for engaging the actuating shaft 546 to cause operation of the product push-out means and consists of a product push-out cylinder XI which is mounted on the arm 474 overlying the first delivery conveyor 341. The product push-out cylinder XI is provided with a plunger 551 which is adapted to engage the actuating shaft 546 as shown in FIGURE 3A. A switch S–6 is mounted on the same arm 474 and is adapted to be operated when the plunger 551 of the product push cylinder XI is fully advanced. A switch S–18 is also mounted on the same arm 474 and is operated when the plunger 551 is first advanced.

Means is provided for engaging the actuating shaft 546 to cause operation of the trim push means consisting of blocks 526 and the additional trim push means comprising the blocks 528 and consists of a cylinder XII mounted on another of the arms 474 overlying the framework 11. The trim push cylinder XII is provided with a plunger 552 which is adapted to engage the actuating shaft 546 to cause operation of the trim push means as hereinafter described. A switch S–12 is mounted on the arm 474 and is adapted to be operated when the plunger 552 of the trim push cylinder XII is fully advanced. A switch S–19 is also mounted on the same arm 474 and is operated as soon as the plunger is advanced.

Means is mounted on the frame for receiving the trim ejected when the trim push means is operated by the trim push cylinder XII and consists of a large bag 556 which is removably mounted on the frame 11.

Figure 4:
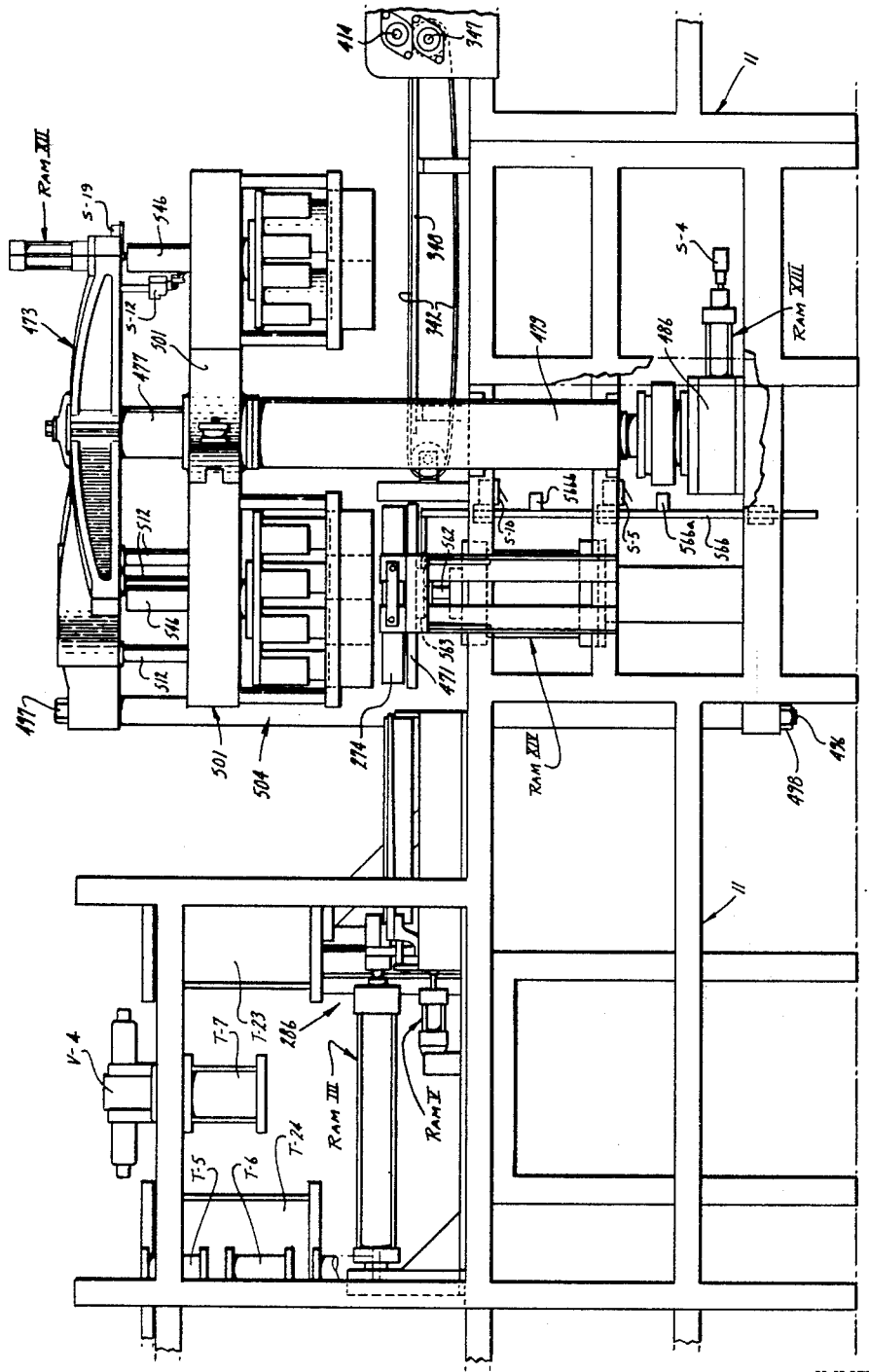
FIGURE 4 is a rear elevational view of the apparatus shown in FIGURE 1 looking along the line 4—4 of FIGURE 1.

Means is provided for operating the indexing table 486 and consists of a hydraulic cylinder XIII (see FIGURE 4). A switch S–4 is mounted on the frame 11 and is adapted to be operated by the cylinder 13 when the indexing table 486 is to be cocked.

*Die cut ram XIV*

Means is provided for raising and lowering the platform 471 to move a slice deposited upon the platform 471 by ram II into engagement with the die cutting members 521 and consists of a die cut ram XIV which is mounted upon a post 561 mounted in the framework 11. The ram XIV is provided with a plunger 562 which is secured to a flanged collar 563 which is secured to the platform 471 mounted within the framework 11.

Switches S–5 and S–10 are mounted on the frame 11 as shown in FIGURE 3A. Means is provided for operating switches S–5 and S–10 and consists of an operating member 566 which is slidably mounted in a framework 11 and is attached to the collar 563 (FIGURE 4) to move with the platform 471. The member is provided with a portion 566a which is adapted to engage and operate switch S–5 and a portion 566b which is adapted to engage and operate switch S–10. The positioning of the portions 566a and 566b is such that the switch S–5 is operated before switch S–10.

The actuating cylinder XIII causes the index table to cause the sleeve 478 and the cross-shaped member 501 to be advanced in 90° steps each time the actuator 13 is operated as hereinafter described.

Figure 28A:
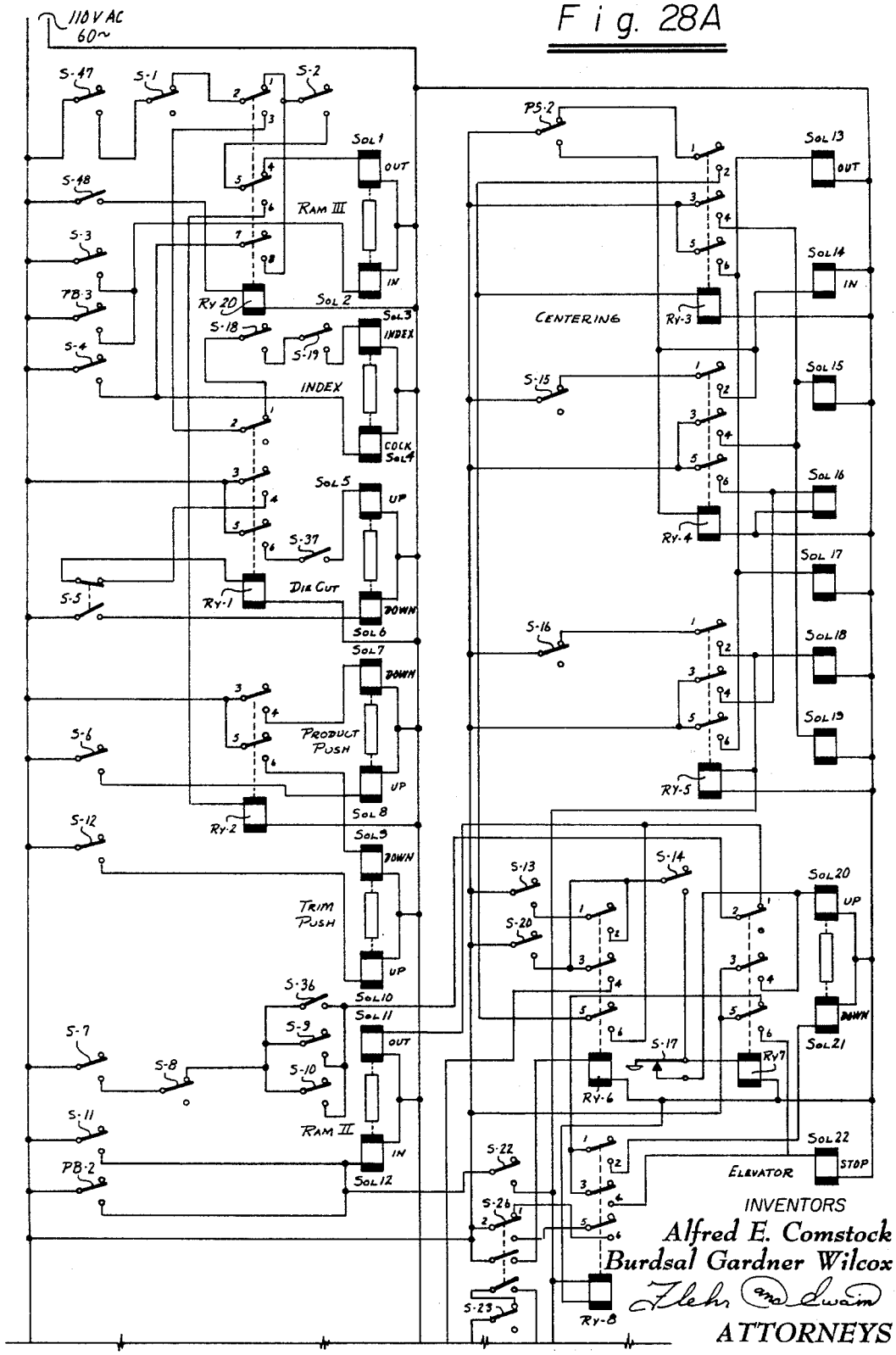
FIGURES 28A, 28B and 28C are circuit diagrams for the apparatus with certain of the parts being schematically illustrated.
Figure 28B:
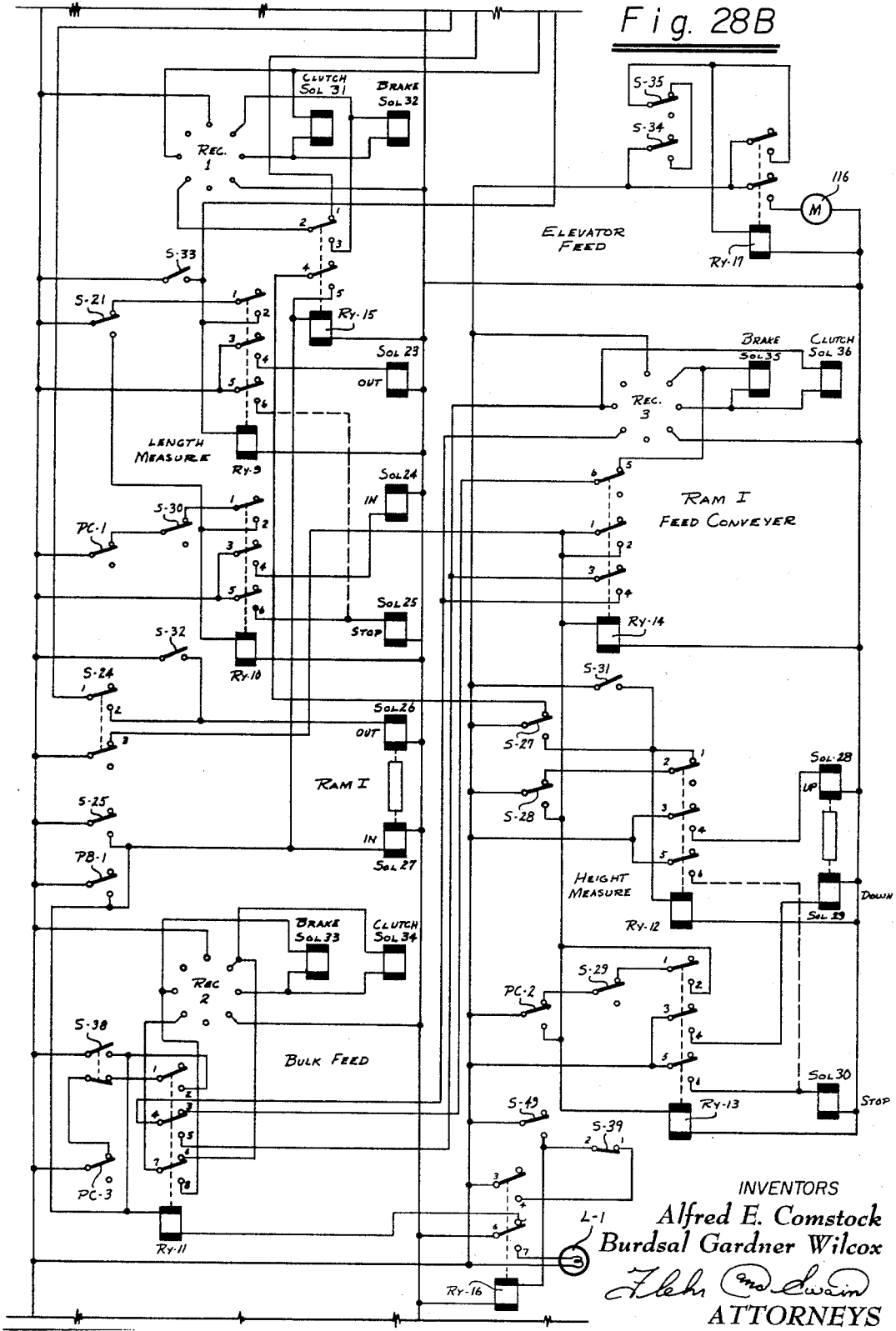
Figure 28C:
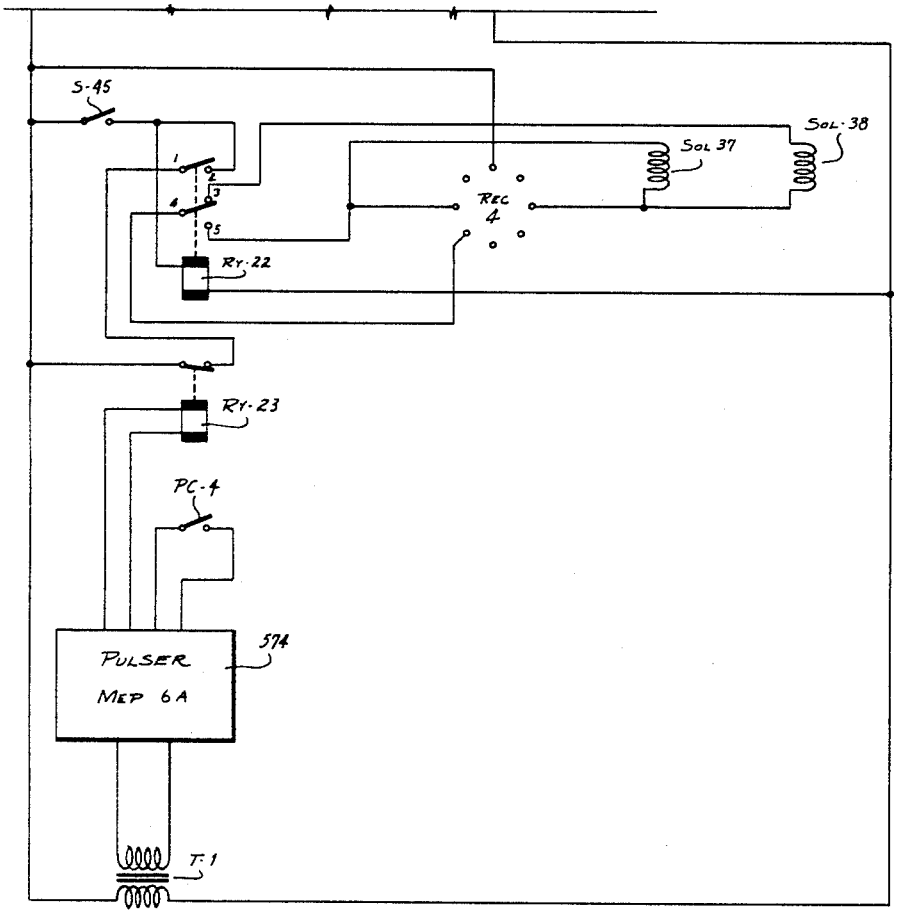

The apparatus also includes electrical circuitry as shown in FIGURES 28A, 28B and 28C. This circuitry includes a number of electrical components such as switches, many of which have already been identified, solenoids, relays, etc., which are set forth in the lists below. The apparatus also includes hydraulic piping as shown in FIGURES 26 and 26A.

SWITCHES

| Switch | Junction | Location |
|---|---|---|
| S-1 | N.C. interlock to prevent interference with ram III. | Extension of ram II (last 1½" of travel). |
| S-2 | N.O. cheese in position for Ram III. | Ram III stop plate 274 (Fig. 14). |
| S-3 | N.O. return switch | Extension of ram III (Fig. 15). |
| S-4 | N.O. cocking switch | Index table (Fig. 3A). |
| S-5 | N.C., N.O. down switch | Upper extension of die cut ram (Fig. 30). |
| S-6 | N.O. return switch | Extension of product push (Fig. 3A). |
| S-7 | N.O. cheese in position feed roller circuit. | Ram II stop plate (Fig. 9). |
| S-8 | N.C. No cheese at ram III in elevator up circuit. | Ram III stop plate (Fig. 14). |
| S-9 | N.O. closed when ram III is back. | Ram III back (Fig. 15). |
| S-10 | N.O. same as above | Die cut index 60° (Fig. 3A). |
| S-11 | N.O. ram II return switch | Ram III stop plate (Fig. 14). |
| S-12 | N.O. return switch | Extension of trim push (Fig. 3A). |
| S-13 | N.O. interlock to prevent elevator from rising too soon. | Ram II back (last 1½ of travel) (Fig. 12). |
| S-14 | N.O. cheese on elevator | Ram II stop plate (Fig. 9). |
| S-15 | N.C. back limit switch | Back of push cylinder (Fig. 3). |
| S-16 | N.C. stop cylinder back | Back of stop cylinders (Fig. 16). |
| S-17 | N.C. elevator up—Ram II ready to push off cheese. | Top of block on elevator (Figs. 12 and 14). |
| S-18 | N.O. ready to index die cut | Product cyl. up (Fig. 3A). |
| S-19 | do | Trim cyl. (Fig. 3A). |
| S-20 | N.O. pulse Sw. to start elev. and Ram I. | Back of ram II (Fig. 3). |
| S-21 | N.C. return switch | Extension of length measure (Fig. 8). |
| S-22 | N.O. down elevator | Top of elevator stroke (Fig. 9). |
| S-23 | N.C. start elevator feed rollers. | Ram II stop plate 171 (Fig. 9). |
| S-24 | 1 N.C. stop infeed rollers, 1 N.O. start ram I. | Ram I stop plate 19 (Fig. 8). |
| S-25 | N.O. return switch | Extension of ram I (Fig. 8). |
| S-26 | 2 N.O., 1 N.C. start new new cycle. | Bottom of elevator stroke (Fig. 9). |
| S-27 | 1 N.C. start feed rollers, 1 N.O. start height measure. | Back of ram I (Fig. 2). |
| S-28 | 1 N.C. hold rly. 12 for up, 1 N.O. return switch. | Extension of height measure (Fig. 8). |
| S-29 | N.C. start measure cycle | Back limit of height measure (Fig. 8). |
| S-30 | do | Back limit of length measure (Fig. 8). |
| S-31 | Manual start N.O | Panel 571. |
| S-32 | do | Do. |
| S-33 | do | Do. |
| S-34 | do | Do. |
| S-35 | Manual stop N.C | Do. |
| S-36 | Manual start N.O | Do. |
| S-37 | Manual safety toggle | Do. |
| S-38 | Bulk feed manual stop N.C., bulk feed manual start N.O. | Do. |
| S-39 | Reset switch N.C | Metal detector 41. |
| S-45 | N.O. cheese block feed | Chain feed conveyor (Fig. 22). |
| S-46 | N.O. supply pulses to pulser | Wrapping machine (Fig. 24). |
| S-47 | N.O. closed on predetermined count of pulser. | Pulser 246 (Fig. 28A). |
| S-48 | N.O. Slicing, closed die cutting. | Do. |
| S-49 | Stop bulk feed conveyor | Metal detector 41. |

RELAYS

| Relay (RY): | Function |
|---|---|
| 1 | Ram III and die cut relay. |
| 2 | Product and trim push relay. |
| 3 | Centering relay—push. |
| 4 | Centering relay—hold and return. |
| 5 | Centering relay—return. |
| 6 | Elevator and centering relay—control. |
| 7 | Elevator relay—up. |
| 8 | Elevator relay—down. |
| 9 | Length measure relay—out. |
| 10 | Length measure relay—in. |
| 11 | Bulk feed relay. |
| 12 | Height measure relay—up. |
| 13 | Height measure relay—down. |
| 14 | Ram I feed rollers relay. |
| 15 | Ram I receive relay. |
| 16 | Metal detector reset relay. |
| 17 | Elevator feed relay. |
| 19 | Die cut relay. |
| 20 | Selector relay. |

PANIC BUTTONS

| Pushbutton (PB): | Function |
|---|---|
| 1 | Ram I emergency return. |
| 2 | Ram II emergency return. |
| 3 | Ram III emergency return. |

PRESSURE SWITCHES

| Switch (PS): | Function |
|---|---|
| 1 | Below 100 p.s.i. pressure in line 107. |
| 2 | Centering. |

PHOTOCELLS

| Photocell (PC): | Function |
|---|---|
| 1 | Length measure. |
| 2 | Height measure. |
| 3 | Initial stop. |
| 4 | Delivery conveyor stop. |

SOLENOIDS

| Solenoid (SOL) | Function | Solenoid (SOL) | Function |
|---|---|---|---|
| 1 | Ram III out. | 21 | Elevator down. |
| 2 | Ram III in. | 22 | Elevator stop. |
| 3 | Index. | 23 | Length measure. |
| 4 | Cock. | 24 | Do. |
| 5 | Die cut up limit. | 25 | Do. |
| 6 | Die cut down. | 26 | Ram I out. |
| 7 | Product push down. | 27 | Ram I in. |
| 8 | Product push up. | 28 | Height measure up. |
| 9 | Trim push down. | 29 | Height measure down. |
| 10 | Trim push up. | 30 | Height measure stop. |
| 11 | Ram II out. | 31 | Clutch elevator feed. |
| 12 | Ram II in. | 32 | Brake elevator feed. |
| 13 | Push. | 33 | Brake bulk feed. |
| 14 | Return. | 34 | Clutch bulk feed. |
| 15 | Push stop valve. | 35 | Brake ram I feed. |
| 16 | Return stop valve. | 36 | Clutch ram I feed. |
| 17 | Stop cylinder stop valve. | 37 | Clutch delivery conveyor. |
| 18 | Stop cylinder return. | 38 | Brake delivery conveyor. |
| 19 | Stop cylinder vent. | 39 | Product stop valve. |
| 20 | Elevator up. | | |

The circuitry also includes a pulser 574 which can be of any suitable type such as type No. MEP6A manufactured by Tensor Corp. of Monterey, Calif. This pulser is supplied with power from the conventional source through a transformer T-1 which, for example, can reduce the voltage from 110 volts to 24 volts.

The operation of the apparatus in performing our method for cutting large blocks into small rectangular blocks or into small die cut blocks is set forth below.

*Operation of the apparatus for cutting large blocks into small rectangular blocks*

In describing the operation of our apparatus for forming small blocks in accordance with our method, let it be assumed that the articles to be handled and cut are large plastic blocks such as large approximately forty pound rindless blocks of cheese which are approximately 11 inches wide, 14 inches long and 7 inches high. When such is the case, the bulk feed conveyor 31 with the associated metal detector 44 can be located in the cooling room for the cheese and can extend out of the cooling room through an opening provided in the wall of the cooling room (not shown). The operator of the apparatus in the cooling room will set the pulse accumulator 456 for the type of blocks which he is placing on the bulk feed conveyor 31.

By way of example, let it be assumed that it is desired to cut the cheese blocks in such a manner that eight small blocks are formed from each slice of the large block. Thus, the operator in the cooling room sets the accumulator 456 so that it will produce a switch closure after eight small blocks or parts have been delivered to the conveyor 423 of the wrapping machine 421 and wrapped by the wrapping machine. The operator in the cooling room, after setting the pulse accumulator 456, merely places the large block of cheese on the bulk feed conveyor 31 so that they are positioned one behind the other with a substantial spacing between the same. The belt is marked at two foot intervals and the blocks are placed on the belt so that the leading edges of the blocks are in line with the marks. The remaining operation of the apparatus is completely automatic as hereinafter described and is controlled by the wrapping machine 421.

Now examining the circuit diagram which is shown in FIGURES 28A and 28B, the switch closure which is produced by the pulse accumulator 456 is represented by the switch S–47 which is in a normally open position and which is moved to a closed position after a predetermined number of pulses have been received from the switch S–46.

Let it be assumed that the pulse accumulator has been set to accumulate 8 pulses from the pulse accumulator 456 driven by the wrapping machine and that the switch S–48 forming a part of the pulse accumulator is in an open position so that the relay RY–20 is not energized. When the relay RY–20 is not energized, the circuitry is in a condition for cutting small rectangular consumer blocks rather than die cut consumer blocks.

Let it also be assumed that the apparatus has been in operation and that eight blocks have been wrapped by the wrapping machine and that it is necessary to deliver another slice cut from the block and cut into eight separate parts or rectangular consumer-sized blocks onto the first delivery conveyor 341.

*Ram III and ram III conveyor assembly operation*

Thus, when the eight pulses have been received by the pulse accumulator 456, the switch S–47 is closed to energize the solenoid SOL–1 to cause the ram III to be advanced. This circuit for the solenoid SOL–1 is completed through switch S–1 which is normally closed but which is held open by the last few inches of forward travel of ram II. Switch S–1 is, therefore, a safety switch and prevents ram III from operating when ram II is in the forward position and, therefore, prevents ram III from colliding with ram II. The circuit for energizing solenoid SOL–1 is also completed through switch S–2 which is located behind ram III stop plate 274. This switch is normally open and is closed when a slice of cheese is in position ready for ram III to operate. Thus, ram III operates when ram II is sufficiently withdrawn and cheese is in position when switch S–47 is closed.

Upon examining the piping diagram shown in FIGURE 26, it can be seen that energization of the solenoid SOL–1 permits air to be supplied from piping 107 to the tank T–1 which urges hydraulic fluid from the tank T–1 into the rear of the ram III to cause the plunger 322 of ram III to be advanced. At the same time fluid is supplied to the rear of ram III, fluid is also supplied to the rear of cylinder X to also cause its plunger 317 to be advanced. The simultaneous advance of the plungers 322 and 317 of the ram III and cylinder X, respectively, causes the rods 309 to be raised to thereby raise the carriages 304 carrying the blades 301 to raise the entire slice of cheese above the upper surface of the rollers 288 at the same time that the block 302 is advanced by the plunger 322 to carry the spaced blades 301 with the slice thereon through the additional vertical cutting means 331. The slice which is carried thereon has already been cut into four separate parts by the first named vertical cutting means 201 as hereinafter described and is now advanced through the additional vertical cutting means 331 to be cut into eight parts as shown in FIGURES 29A and 30E and to place them upon the delivery conveyor 341.

At the extreme forward stroke of the plunger 322 of ram III, the normally open switch S–3 is operated by the operating member 326 which causes energization of the solenoid SOL–2. It can be seen that many of the solenoids are mechanically interlocked and that only one of each pair of interlocked solenoids can be operated at a time. Energization of the solenoid SOL–2, therefore, stops the flow of fluid through the tank T–1 and causes fluid to be supplied by valve V–1 from the piping 107 to the tank T–2. Fluid from the tank T–2 is supplied to the front end of the ram III and into the front end of the cylinder X to cause both to be returned to their home positions. Fluid is returned to the tank T–1 and air is exhausted through the exhaust member 109.

*Ram II operation*

As the plunger 322 of ram III returns to its home position, a pulse switch S–9 is operated by the member 326. This will cause energization of the solenoid SOL–11 if switch S–7 is closed indicating that there is cheese on the elevator assembly 241 engaging the stop plate 171 to operate the switch S–7 and there is no cheese still remaining in front of ram III which would hold the normally closed switch S–8 behind the stop plate 274 in an open position. The solenoid SOL–11 is energized through the normally closed contacts 1 and 2 of relay RY–7. Energization of solenoid SOL–11 causes air to be supplied to the tank T–3 which urges fluid from the tank T–3 to the rear of the ram II to cause the plunger 261 to be advanced. Advancement of the plunger causes the block 263 to engage the next slice of cheese carried on the elevator 241 and to cause the same to be advanced through the first vertical cutting means 201 to cut the slice into a plurality (four for this example) of elongate blocks and to deposit the same upon the rollers 288 of ram III conveyor assembly 286.

As pointed out previously at the forward portion of the stroke for the plunger 261 of ram II, the switch S–1 is operated. After the slice of cheese has been advanced through the first vertical cuting means 201, the slice is deposited upon the rollers 288; the stop plate 274 is again engaged by the cheese to cause operation of switch S–11. Switch S–11 causes energization of the solenoid SOL–12. Energization of solenoid SOL–12 causes air to be supplied to the tank T–4 which supplies fluid to the forward portion of ram II to cause the plunger 261 to be retracted. Fluid is returned to tank T–3 and excess air is exhausted through the exhaust member 109.

*Elevator assembly 241—operation*

When the ram II is returned to its home position, both switches 13 and 20 are operated. Now assuming that the elevator is not in its lowermost position, switch S–13 is ineffective because switch S–26 is not operated. Now assuming that there is cheese still on the elevator, switch S–14 will be in a closed position so that closing of switch S–20 is effective to cause energization of relay RY–7. Energization of relay RY–7 closes its contacts 3 and 4 to cause energization of up solenoid SOL–20 and closing of its contacts 6 and 7 causes energization of stop solenoid SOL–22. Holding circuits for relay RY–7 are established through switch S–17 and through contacts 3 and 4 of relay RY–7.

Energization of the stop solenoid SOL–22 opens the valve V–13. Energization of the solenoid SOL–20 causes air to flow from the piping 107 into tank T–9 to cause fluid to be supplied from tank T–9 to the bottom of cylinder VI to cause the plunger 247 to be raised and to thereby raise the elevator assembly 241. Raising of the elevator assembly 241 continues until the top of the cheese on the elevator assembly engages the switch S–17 to operate the switch S–17 to open the holding circuit for the relay RY–7. Deenergization of the relay RY–7 opens its contacts 3 and 4, and 6 and 7 to deenergize the solenoids SOL–20 and SOL–22 to halt any further upward movement of the elevator assembly 241.

In this manner, another slice of the block of cheese which heretofore has been positioned on the elevator assembly is moved upwardly so that it is in a position to be engaged by the ram II and to be advanced through the first vertical cutting means 201 as required by the wrapping machine 421. Thus, it can be seen that each time a slice is moved by ram III through the second or supplemental vertical cutting means 331, a new slice is advanced through the first vertical cutting means 201 by ram II. As soon as a new slice is required to be advanced by ram II, the elevator assembly 241 is raised by operation of the switch 20 a sufficient distance so that a new slice can be engaged by the ram II. This procedure continues until all of the slices of a block have been advanced by the ram II through the first vertical cutting means 201.

After the last piece of cheese has been advanced off of the elevator assembly 241, the elevator assembly is again initiated by the operation of switch 20 and raises still further until the switch S-22 is operated by the operating member 251 (see FIGURE 9). Closing of the switch S-22 causes energization of relay RY-8. The circuit for energizing relay RY-8 is established through a normally open switch S-11 which is closed because ram II is in its home position. This switch prevents the elevator from being moved if ram II is not in its home position. Energization of relay RY-8 causes its contacts 1 and 2 to close to establish a circuit for energizing the down solenoid SOL-21 through the normally closed contacts 5 and 6 of relay RY-7. The stop solenoid SOL-22 is energized through the closed contacts 3 and 4 of relay RY-8 and through the normally closed contacts 5 and 6 of relay RY-7. Energization of the solenoid SOL-21 causes air to be supplied to the tank T-8 and fluid to be supplied from the tank T-8 to the upper side of cylinder VI to cause the cylinder VI and the elevator assembly 241 mounted thereon to be lowered. Operation of the stop solenoid SOL-22 opens the valve V-13 to permit fluid to flow from the other side of the cylinder VI to the tank T-8. A holding circuit is completed for relay RY-8 through contacts 5 and 6 of relay RY-8 and contacts 3 and 4 of switch S-26.

Downward movement of the elevator assembly is halted when the operating member 251 operates the switch S-26 to break the holding circuit for the relay RY-8. This deenergizes the solenoids SOL-21 and SOL-22.

The elevator assembly 241, after it has returned to its lowermost position, requires another block of cheese which is delievered to it as hereinafter described. When a new block of cheese is delivered to the elevator assembly 241, it moves on the rollers 244 of the elevator assembly and continues its movement until it engages the stop plate 171 and operates the switches S-7, S-14, and S-23. As pointed out previously, the rollers 244 are provided with one-way clutch means 246 which prevents the block from bouncing away from the stop plate 171.

When the elevator assembly 241 is in its lowermost position, upward movement of the elevator assembly is initiated by operation of the switch S-13 which is also operated when ram II is in its back or home position in the same manner as switch 20 is operated. However, in this event, switch 20 is ineffective to cause raising of the elevator because switch S-26 is operated. Switch S-13 completes the circuit for energizing the relay RY-7 through switch S-14 which causes energization of the solenoids SOL-20 and SOL-22 as hereinbefore described. This causes the elevator assembly 241 to be raised until the switch S-17 is operated to deenergize the holding circuit for relay RY-7. Deenergization of relay RY-7 deenergizes the solenoids SOL-20 and SOL-22. Thereafter, the raising of the elevator is under the control of the switch S-20 because as soon as the elevator is raised from the lowermost position, the switch S-13 is rendered ineffective by the opening of the switch S-26.

*Operation of centering means 267 before ram III*

The centering device or means 267 is operated at the same time as the ram II out solenoid SOL-11 is energized. Now let it be assumed that the elevator assembly 241 is in its lowermost position (top slice push-off position) and is not in motion. When this is the case, relay RY-6 is energized through normally open contacts 3 and 4 of switch S-26 which is operated when the elevator assembly 241 is down. Energization of relay RY-26 causes energization of relay RY-3. The circuit for energizing relay RY-3 is completed through contacts 5 and 6 of relay RY-6 and through the normally closed contacts 1 and 2 of relay RY-7 through switch S-9 and switches S-8 and S-7. A holding circuit for relay RY-3 is completed through its contacts 1 and 2 and pressure switch PS-2.

Energization of relay RY-3 causes energization of solenoids SOL-13, SOL-15, SOL-17 and SOL-19. Energization of solenoid SOL-13 causes air to be supplied from the piping 107 to the tank T-5 which causes fluid to be supplied to the rear end of the push cylinder VII since solenoid SOL-15 has opened valve V-5. Solenoid SOL-17 causes opening of valve V-7 so that fluid discharged from the push cylinder VII will be supplied to the rear sides of stop cylinders VIII and IX. As explained previously, since the cylinder VII and the cylinders VIII and IX are all the same diameter, the advance of the cylinders VIII and IX will be one-half the advance of the cylinder VII. The push cylinder VII continues its advance until the sensing plate 267 engages the cheese on the elevator assembly 241 and holds it against the framework of the first vertical cutting means 201.

As the pressure builds up on the push cylinder VII, a pressure switch PS-2 is actuated at a predetermined pressure to cause energization of the relay RY-4 and to break the holding circuit for relay RY-3. Energization of the relay RY-4 causes energization of solenoids SOL-14, SOL-15 and SOL-16, and deenergization of solenoids SOL-13, SOL-17 and SOL-19. Energization of relay RY-4 establishes a holding circuit through its contacts 1 and 2 and the normally closed contacts of switch S-15.

Deenergization of solenoid SOL-17 locks the stop cylinders VIII and IX in the position to which they had been advanced by the fluid from the push cylinder VII so that they will be in a position to center the cheese in front of the ram III for the cutting operation in the additional vertical cutting means 331. Energization of the solenoid SOL-14 causes valve V-3 to supply air to the tank T-6 which supplies fluid to the front of the push cylinder VII since solenoid SOL-16 has been energized to open valve V-6 to permit the push cylinder VII to be returned to its home position and out of the way of the cheese on the elevator and out of the way of the elevator assembly 241. Operation of the solenoid SOL-15 opens the valve V-5 to permit the fluid from the other side of the push cylinder VII to be returned to the tank T-5. Switch S-15 is operated when the push cylinder VII returns to its home position to open the holding circuit for relay RY-4 to deenergize the same and solenoids SOL-14, SOL-15 and SOL-16.

The push cylinder VII is not operated again after it has once sensed the size of the block which has been positioned on the elevator assembly 241. The stop cylinders VIII and IX are locked in position until all of the slices have been pushed off of the elevator assembly 241 by the ram II.

The stop cylinders VIII and IX are returned to their home or back positions after the last slice of the block on the elevator assembly has been pushed through the first vertical cutting means 201. The stop cylinders VIII and IX are returned to their home positions by energization of relay RY-5 which energizes solenoids SOL-8, SOL-13, SOL-16, SOL-17 and SOL-18. Relay RY-5 is energized when switch S-22 is operated when the elevator reaches its uppermost position. This circuit is completed through the normally open contacts of switch S-11 and the normally open contacts of switch S-22. Energization of relay RY-5 also establishes a holding circuit for the same through contacts 1 and 2 of relay RY-5 and normally closed contacts of switch S-16.

Energization of the solenoid SOL-18 causes valve V-4 to supply air from the piping 107 to the tank T-7 which supplies fluid to the front ends of the cylinders VIII and IX to cause the fluid to be discharged therefrom through valve V-7 which has been opened by the solenoid SOL-17 through the valve V-6 which has been opened by the solenoid SOL-16 to return to tank T-6.

When the stop cylinders are returned to the home position, the normally closed contacts of switch S-16 are opened to break the holding circuit on relay RY-5 and to deenergize the solenoids which were previously energized by the relay RY-5. This completes a cycle and the centering means 267 is again adapted to be operated as soon as a new block of cheese has been positioned on the elevator assembly 241 in the same manner as hereinbefore described.

*Operation of elevator feed conveyor 111*

When the elevator assembly 241 is in its lowermost position, switch S-26 is operated. Switch S-23 is also operated when there is no cheese in engagement with the ram II stop plate 171 and, therefore, a circuit is completed through the normally open contacts 1 and 2 of relay RY-15 to the rectifier REC-1 to cause the clutch solenoid SOL-31 to be energized and the brake solenoid SOL-32 to be deenergized to cause the elevator feed conveyor 111 to be advanced.

Advance of conveyor 111 continues until cheese strikes the stop plate 171 and opens the switch S-23 to deenergize the clutch solenoid SOL-31 and energize the brake solenoid SOL-32. The motor 116 used for driving the brake-clutch mechanism 123, which is utilized for driving the elevator feed conveyor 111, is started in operation by manually operating the switch S-34 which energizes the relay RY-17 to establish a circuit for energizing the motor 116. A holding circuit for the relay RY-17 is established through the switch S-35. When it is desired to stop the motor 116, switch S-35 is opened.

*Operation of the length sensing means 131*

Before the block of cheese is advanced onto the elevator assembly 241 by the elevator feed conveyor 111, the length of the block of cheese is sensed by the length sensing means 131. At the same time that the elevator assembly 241 is signalled to return to its lowermost position by the operation of the switch S-11 by the ram II advancing the last slice of cheese through the vertical cutting means 201, relay RY-8 is energized through the switch S-22 which has been closed by the elevator assembly moving to its uppermost position.

At the same time, relay RY-9 is energized through switches S-11 and S-22. Energization of relay RY-9 closes its contacts 3 and 4 to energize out solenoid SOL-23 and stop solenoid SOL-25 of the length measuring means. Energization of the solenoid SOL-23 causes valve V-8 to supply air from piping 107 to the tank T-10 which causes fluid to be supplied to the rear side of the cylinder V. Energization of solenoid SOL-25 permits fluid to return from the front side of the cylinder V to tank T-11. The plunger of cylinder V continues to move out to the end of its stroke until it operates the limit switch S-21 which opens the holding circuit which had been established for the relay RY-9 through contacts 1 and 2 of relay RY-9.

At the same time that relay RY-9 is deenergized, relay RY-10 is energized through switch S-21. Energization of relay RY-10 closes its contacts 3 and 4 to energize solenoid SOL-24 and closes its contacts 5 and 6 to energize solenoid SOL-25. Operation of solenoid SOL-24 causes air to be supplied from the piping 107 to the tank T-11 which supplies fluid to the front side of the cylinder V since the solenoid SOL-25 has opened the valve V-9. The cylinder V returns until the block of cheese casts a shadow on the photosensitive switch or cell PC-1 to open the holding circuit for the relay RY-10 which previously had been completed through contacts 1 and 2 of relay RY-10, switch S-30 and PC-1.

As pointed out previously, the cutting elements or wires 206 are adjusted by the movement of the cylinder V so that when the block of cheese is moved onto the elevator assembly 241 in front of the ram II, the cutting wires 206 are positioned in such a manner that the slices will be cut into elongate blocks having a width which is proportional to the length of the block which has been measured by the length sensing means so that there is no waste when the block is cut by the vertical cutting means 201. Thus, each block will be cut into the same number of elongate blocks with no waste even though the large blocks from which the elongate blocks are cut vary substantially in length.

It is possible for the length sensing means 131 to sense the length of the block in this manner because the position of the other end of the block is known, that is, it is at the position to which it was advanced by the ram I.

After the cutting wires or elements have been moved to the desired positions, the deenergization of the relay RY-10 by operation of the switch PC-1 causes the cutting wires to be locked in this position because the stop valve V-9 blocks the flow of any further fluid from the ram V because of deenergization of solenoid SOL-25.

In the event there is not a block of cheese on the elevator feed conveyor 111, the rearward travel of the plunger of the cylinder V is limited by the limit switch S-30.

*Operation of ram I*

The block of cheese is placed on the elevator feed conveyor 111 so that its length can be measured by operation of ram I. The operation of ram I is initiated when relay RY-6 is energized at the time that switch S-26 is operated when the elevator assembly 241 returns to its lowermost position. Energization of relay RY-6 causes energization of the out solenoid SOL-26 when switch S-24 is closed indicating that there is cheese against the ram I stop plate 91 and through normally open contacts 3 and 4 and normally open contacts 1 and 2 of relay RY-6 through switch S-13. Energization of the solenoid SOL-26 causes the valve V-10 to supply air from the piping 107 to the tank T-12 which supplies fluid to the rear side of ram I to cause the plunger 93 to be advanced. The plunger 93 advances the block of cheese before the ram I stop plate 91 through the horizontal cutting means 56 to cut the block into a plurality of superposed slices and to position those slices upon the elevator feed conveyor 111.

The plunger 93 of ram I continues to advance until switch S-25 is operated. Operation of switch S-25 causes energization of the solenoid SOL-27. Energization of solenoid SOL-27 causes air from piping 107 to be supplied to the tank T-13 and causes fluid to be supplied from the tank T-13 to the front side of ram I to cause plunger 93 to be returned to its home position.

*Operation of bulk feed conveyor 31*

At the time that the switch S-25 is operated by the advance of the plunger 93 of ram I, the relay RY-11 is also energized through the switch S-25 through the normally closed contacts 5 and 6 of relay RY-16. A holding circuit for relay RY-11 is completed through its contacts 1 and 2 and the normally closed contacts of switch S-38 and the normally closed contacts provided by photocell PC-3. Energization of the relay RY-11 closes its contacts 6 and 7 to cause rectifier REC-2 to cause energization of the clutch solenoid SOL-34 and deenergization of the brake solenoid SOL-33 of the clutch brake unit 39 to cause the bulk feed conveyor 31 to be advanced. Conveyor 31 advances until the block of cheese carried thereby casts a shadow upon the photocell PC-3 to cause it to open the holding circuit for the relay RY-11. Relay RY-11 is, therefore, deenergized which causes deenergization of the clutch solenoid SOL-34 and energization of the brake solenoid SOL-33.

The relay RY-11 can also be deenergized by energization of relay RY-16. Relay RY-16 is energized when switch S-49 which forms a part of the metal detector 41 is operated. Energization of relay RY–16 opens contacts 5 and 6 which form a part of the circuit for energization of the relay RY–11. Energization of the relay RY–16 causes closing of its contacts 6 and 7 which energizes the light L–1 to indicate that the metal detector has detected a metal object in the block of cheese. When it is desired to reset the metal detector, the relay RY–16 can be deenergized by operation of the reset switch S–39 to open the holding circuit for relay RY–16.

The ram I feed conveyor 13 is driven when the bulk feed conveyor 31 is driven. This is accomplished by operating the brake clutch mechanisms 21 and 39 in parallel, that is, by connecting the clutch solenoids of both in parallel and the brake solenoids of both in parallel. Thus, both conveyors 13 and 31 are under control of relay RY–11.

*Operation of height measuring means 48*

The height measuring means operates in a manner very similar to the length sensing or measuring means 131 hereinbefore described. The operation of the height sensing means is initiated by the switch S–27 which is operated on the return of ram I to its home position. Operation of the switch S–27 causes energization of relay RY–12. Energization of relay RY–12 causes closing of its contacts 3 and 4 to cause energization of solenoid SOL–28 and closing of its contacts 5 and 6 to cause energization of the stop solenoid SOL–30. Energization of the solenoid SOL–28 causes the valve V–11 to cause air to be supplied from the piping 107 to the tank T–14 to cause fluid to be supplied to the lower side of the cylinder IV. Valve V–12 is opened by energization of solenoid SOL–30 to permit fluid to return from the upper side of the cylinder IV and causes the plunger of cylinder IV to be raised. Raising of the plunger of the cylinder IV continues until the limit switch S–28 is operated to open the holding circuit for relay RY–12 which had been completed through the switch S–28 in its uppermost position as shown in FIGURE 28B. Deenergization of the relay RY–12 deenergizes the up solenoid SOL–28 and the stop solenoid SOL–30.

Operation of the switch S–28 causes energization of the relay RY–13. A holding circuit for relay RY–13 is completed through switch S–29 and through the photocell switch PC–2 and contacts 1 and 2 of relay RY–13. Energization of relay RY–13 through its contacts 3 and 4, and 5 and 6 causes energization of the down solenoid SOL–29 and the stop solenoid SOL–30. Energization of the solenoid SOL–29 causes the valve V–11 to supply air from the piping 107 to the tank T–15, and the tank T–15 supplies fluid through the valve V–2 which is open because of energization of solenoid SOL–30 to the upper side of the ram of cylinder IV to cause the plunger of cylinder IV to move downwardly. Downward movement of the plunger of ram IV continues until the shadow from the block of cheese, the height of which is being measured, strikes the photocell PC–2 to cause opening of the holding circuit for the relay RY–13 to stop the downward movement of the cylinder IV. The cylinder IV is locked in this position because the down solenoid SOL–29 is deenergized as is the solenoid SOL–30 to prevent any further flow of fluid from the cylinder IV.

In the event that the block of cheese is shorter than the limits set or there is no block of cheese on the ram I feed conveyor 13, downward movement of the plunger ram IV will continue until the switch S–29 is operated which will also cause breaking of the holding circuit for the relay RY–13 to again stop further downward movement of the cylinder IV.

As hereinbefore described, the horizontal cutting means 56 is directly connected to the plunger of the cylinder IV so that the cutting elements or wires 61 are proportionally positioned within the frame of the horizontal cutting means so as to cut the block into the same number of slices each time with each having substantially the same height without any waste. The distance between the cutting elements is directly proportional to height measured.

*Operation of ram I feed conveyor*

After the height measurement of the block of cheese has been completed by operation of the height measuring means 48, the operation of the photocell PC–2 completes a circuit for energization of the relay RY–14. A holding circuit for relay RY–14 is completed through its contacts 1 and 2 and through switch S–24. Energization of relay RY–14 causes the rectifier REC–3 to energize the clutch solenoid SOL–36 and deenergize the brake solenoid SOL–35 of the clutch brake assembly 18 to drive the ram I feed conveyor. Operation of the ram I feed conveyor continues and advances the block of cheese until it strikes the ram I stop plate 91 to cause operation of the switch S–24 and to break the holding circuit for relay RY–14 to stop the driving of the ram I feed conveyor.

From the operation thus far described, it can be seen that the operation is completely controlled from the wrapping machine 421 and operates in a timed relationship with the wrapping machine 421 so that consumer sized blocks of cheese to be wrapped are delivered in a timed relationship to the wrapping machine. It can be seen that the bulk feed conveyor 31 and the ram I feed conveyor 13 advance the blocks one by one in succession. The horizontal cutting means 56 forms a first cutting means which has a plurality of cutting elements disposed in spaced parallel planes. Ram I serves as means for advancing the block through the cutting means to cause the block to be cut into a plurality of superposed slices. The elevator feed conveyor 111 serves as means for advancing the slices onto the elevator assembly 241. The vertical cutting means 201 serves as additional cutting means and includes vertical cutting elements. The ram II serves as means for advancing the superposed slices one by one through the additional cutting means to cause each of the slices to be cut into a plurality of elongate blocks. The ram III conveyor assembly 286 receives the elongate blocks from ram II. Supplemental cutting means is formed by the additional vertical cutting means 331. The ram III serves as means for advancing the elongate blocks through the supplemental cutting means to cause each of the elongate blocks to be cut into separate parts and causes the same to be deposited upon a delivery conveyor 341.

*Operation of delivery conveyor 341 and additional delivery conveyor 351*

After the consumer-sized blocks have been deposited in juxtaposed positions upon the first delivery conveyor 341, the blocks are advanced under the control of the wrapping machine. However, in this case, movement is controlled by switch S–45. Each time that one additional row of consumer-sized blocks is delivered to the wrapping machine, which in the present example is assumed to consist of two consumer-sized blocks which advance abreast. Upon closing of switch S–45, relay RY–22 is energized which causes the rectifier REC–4 to cause energization of the clutch solenoid SOL–36 and deenergization of the brake solenoid SOL–37 of the brake-clutch unit 397 to advance the delivery conveyor 341.

Advance of the delivery conveyor 341 continues until the blocks which are carried thereon cast a shadow on the photocell PC–4. As soon as this occurs, the photocell causes operation of the pulser 574 which causes operation of the relay RY–3 to open its contacts 1 and 2 and thereby open the holding circuit for the relay RY–22 which was completed through its contacts 1 and 2. Opening of the holding circuit for relay RY–22 stops the advance of the delivery conveyor 341 by causing energization of the brake solenoid SOL–37 and deenergization of the clutch solenoid SOL–36.

Figure 27B:
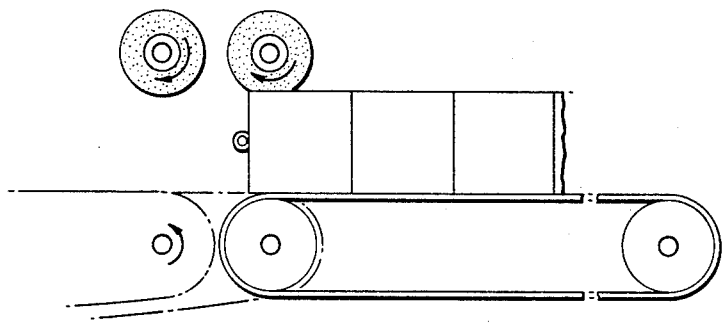
Figure 27C:
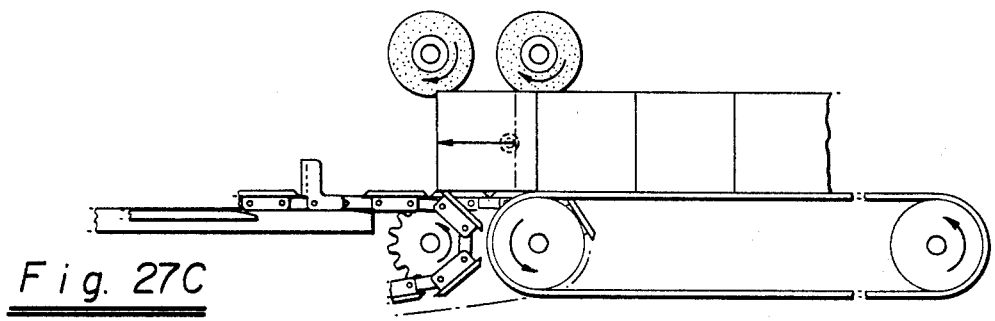
Figure 27D:
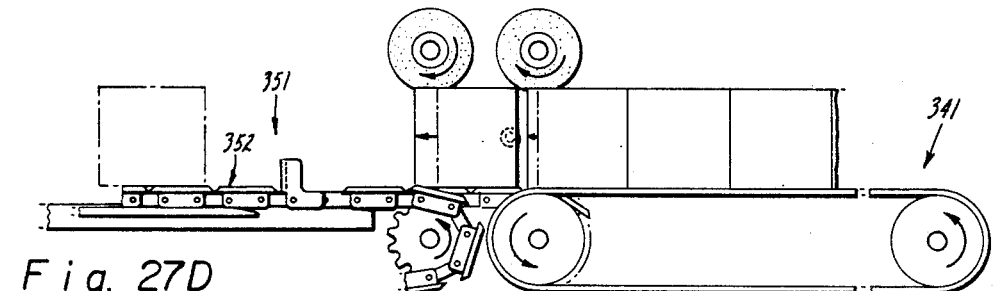
Figure 27E:
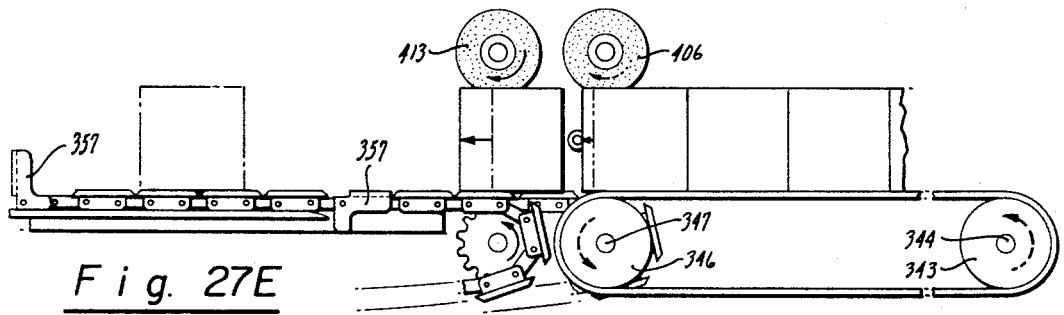
Figure 27F:
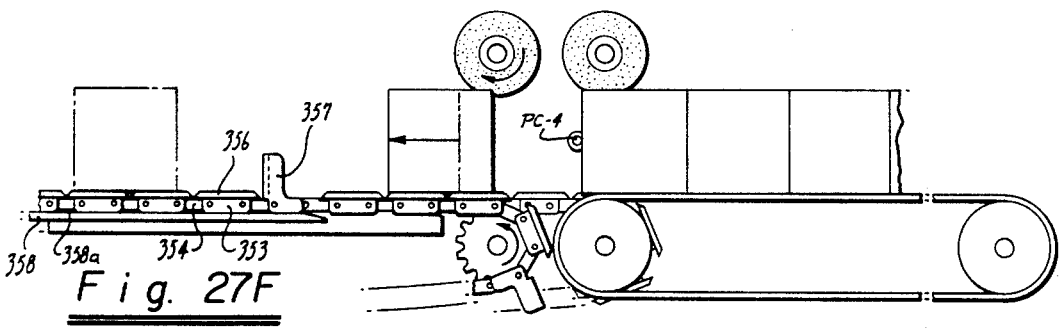
Figure 27G:
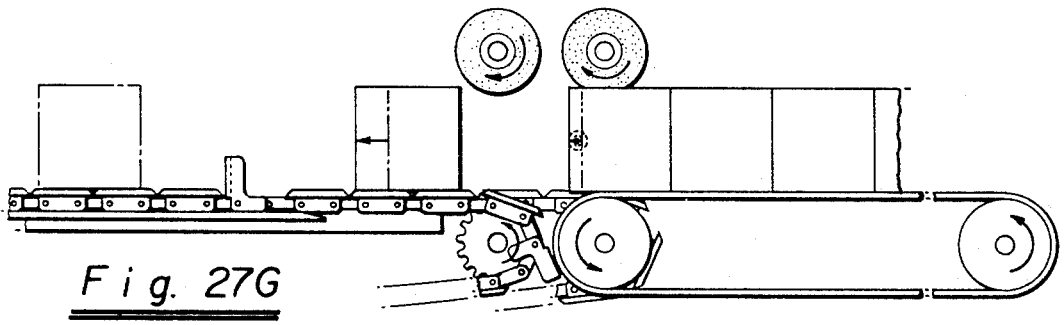

Upon the next closing of the switch S–45, the relay RY–22 is again energized to again cause energization of the clutch solenoid SOL–36 and deenergization of the brake solenoid SOL–37 to again start the blocks of cheese moving. It will be noted, as can be seen from FIGURE 27A, that the photocell PC–4 is positioned very near the end of the first delivery conveyor 341 so that the blocks also underlie the rollers 406, as shown in FIGURE 27B. After the first delivery conveyor 341 is again started, the blocks are advanced so that they come into engagement with the rollers 413 associated with the additional delivery conveyor 351 and are carried onto the chain belts 352 of the additional delivery conveyor. In view of the fact that the additional delivery conveyor 351 with the associated rollers 413 are advancing more rapidly than the conveyor 341 and its associated rollers 406, the leading juxtaposed blocks are separated from the succeeding blocks as shown in FIGURE 27D to provide increasing space so that light can again shine on the photocell PC–4 as shown in FIGURE 27E.

As soon as the next succeeding row of blocks begins to cast a shadow upon the photocell PC–4, the relay RY–23 is again operated to break the holding circuit for RY–22 to stop the first delivery conveyor 341.

The blocks which are advanced onto the additional delivery conveyor 351 are advanced by the delivery conveyor 351 in a timed relationship because the conveyor 351 is driven directly by the wrapping machine. At the forward end of the conveyor, the blocks travel onto the channel-shaped members 360 and are raised slightly above the tops 356 of the chain belt and permit the chain belt to advance under the same until the upstanding lugs 357 engage the trailing edges of the blocks. The lugs 357 thereafter advance the blocks into the conveyor of the wrapping machine. Since the lugs are positioned on the conveyor chain, it can be seen that the blocks are advanced in a precision manner into the conveyor of the wrapping machine with the desired spacing.

With the first delivery conveyor 341 and the additional conveyor 351, it can be seen that a plurality of blocks can be taken which are immediately adjacent to each other and separated into separate rows so that they can be advanced row by row into the wrapping machine.

In the foregoing description, it will be recalled that it was assumed that each slice which was cut from the block was cut into eight consumer-sized blocks such as shown in FIGURES 29A and 30E. It should be appreciated that the present apparatus and method can be utilized for cutting a block into any desired number of consumer-sized blocks. For example, alternative cutting arrangements are shown in FIGURES 30A, 30B, 30C and 30F. In the arrangement shown in FIGURE 30A, it can be seen that it is only necessary to provide the additional vertical cutting means 331 with an additional vertical cutting element to provide two cuts instead of one cut as in FIGURE 30E. For FIGURE 30B, it can be seen that it is only necessary to provide the first vertical cutting means 201 with four vertical cutting elements instead of three vertical cutting elements as in FIGURE 30E. For FIGURE 30C, it can be seen that it is merely necessary to provide the first vertical cutting means 201 with six vertical cutting elements rather than three vertical cutting elements as required for the cutting and slicing arrangement shown in FIGURE 30E. For the arrangement shown in FIGURE 30F, it is merely necessary to provide the first vertical cutting means 201 with six vertical cutting elements and the second or additional vertical cutting means 331 with two vertical cutting elements. Thus, it can be seen that in the arrangement shown in FIGURE 30E, each slice cut from the block is cut into eight consumer-sized blocks. In FIGURE 30A, each slice is cut into 12 consumer-sized blocks; in FIGURE 30B, each slice is cut into 10 consumer-sized blocks; in FIGURE 30C, each slice is cut into 14 consumer-sized blocks; and each slice in FIGURE 30F is cut into 21 consumer-sized blocks.

Any of the cutting arrangements shown above can be readily accomplished with the apparatus merely by utilizing vertical cutting means 201 and 331 with the required number of cutting elements. As hereinbefore explained, the vertical cutting means 201 and the additional vertical cutting means 331 can be readily removed from the apparatus and other vertical cutting means substituted having the required number of vertical cutting elements to perform the cutting or slicing operations desired.

The additional delivery conveyor 351 can be readily adjusted to accommodate rows having either two or three blocks in a row merely by operating the lever arm 371 as hereinbefore described and to deliver them in a timed relationship to the wrapping machine 421.

The pulse accumulator 456 is set in accordance with the number of consumer-sized blocks to be cut from each slice.

*Operation of the apparatus for die cutting*

As hereinbefore explained, the apparatus is provided with means whereby each slice cut from a large block can be cut with dies to form a plurality of die-cut consumer-sized blocks as shown in FIGURES 29B and 30D.

Before the die cutting operation is commenced, the ram III conveyor assembly 286 is moved to an out-of-the-way position as shown in FIGURE 1A and the platform 471 is put in place on the frame 11. The frame 234 replaces the vertical cutting means 201 and the additional vertical cutting means 331 is removed.

After the above steps have been completed, the switch S–48 in the pulse accumulator 456 is operated to energize the relay RY–20 to thereby place the apparatus in condition for die cutting. Next let it be assumed that the wrapping machine 421 has just completed the wrapping of eight of the die-cut consumer-sized blocks and that it is necessary to cause the apparatus to place eight additional consumer-sized blocks on the delivery conveyor 341. Thus, when the pulse accumulator 456 has counted eight pulses from the switch S–46 operated by the wrapping machine 421, the switch S–47 is closed by the pulse accumulator 456 assuming that the pulse accumulator has been set for eight pulses which is the case when the apparatus is being used for die cutting.

Closing of the switch S–47 by the pulser causes energization of the indexing solenoid SOL–3. This is accomplished through S–47, through normally closed switch S–1, through normally open contacts 2 and 3 of relay RY–20, through normally closed contacts 1 and 2 of relay RY–11, through normally open switches S–18 and S–19 which are closed because the product push-out cylinder XI and the trim push-out cylinder XII are in the up positions. From examining FIGURE 26A, it can be seen that energization of the solenoid SOL–3 causes the valve 16 to supply air from the piping 107 to the tank T–21. The tank T–21 supplies fluid to the indexing cylinder XIII to cause the index table to be operated to cause the sleeve 478, which serves as a vertical standard, and the cross-shaped member 501 with the die cutting assemblies 504 secured thereto to be rotated through or stepped 90°.

Operation of the index cylinder 13 also causes operation of normally closed switch S–4 which causes energization of the cocking solenoid SOL–4. Energization of the solenoid SOL–4 causes valve V–15 to be operated to supply fluid from the piping 107 to the tank T–22. Fluid is then supplied to the cylinder XIII to return the cylinder XIII into its home position. Return of the cylinder XIII to its home position also causes cocking of the ratchet mechanism provided as a part of the index table so that the index table will be in a position to be indexed or advanced the next 90° step upon a new work stroke by the indexing cylinder XIII. The indexing table is also provided with internal mechanism (not shown) which is conventional which prevents the sleeve 478 from rotating after it has been indexed until another signal is received to cause the index cylinder XIII to operate again.

At the same time that switch S–4 is operated, relay

RY-2 is energized. This circuit is completed through normally open switch S-4 through contacts 7 and 8 of selector relay RY-20, through the normally open contacts of switch S-2 (switch S-2 will be closed because cheese is in positioin in front of the stop plate 274), and through normally open contacts 5 and 6 of relay RY-20 to the coil of relay RY-2. Relay RY-1 is energized at the same time that relay RY-2 is energized. A holding circuit for relay RY-1 is established through the normally closed contacts of switch S-5 and through contacts 3 and 4 of relay RY-1.

Energization of the relay RY-1 causes closing of its contacts 5 and 6 to cause energization of the up solenoid SOL-5 through manual switch S-37 which is closed. Energization of the up solenoid SOL-5 causes the valve V-17 to be operated to supply fluid from piping 107 to tank T-23. Fluid is supplied from tank T-23 to the lower portion of the die-cut ram XIV to cause the plunger to be raised and to engage the platform or table 471 to move the table 471 with the slice of cheese carried thereon upwardly. Movement of the table continues and urges the slice of cheese into engagement with the die cutting members 521 to cause a plurality of consumer-sized blocks to be cut from the slice of cheese as, for example, eight semi-cylindrical blocks as shown in FIGURE 30D. It will be appreciated that substantial pressures are exerted against the die cut members 521. However, the die cut members 521 are held in a stationary position by the support rods 511 which are rigidly secured to the lower plate 509 and the framework 506. The framework 506 is supported against deformation by the support members 512 which are carried by the cross-shaped member 473.

Upward travel of the die cut ram XIV is limited by switch S-5. Switch S-5 is momentarily operated by the operating member 566 carried by the platform 471 and opens the holding circuit for the relay RY-1 and deenergizes relay RY-1. At the same time, it closes its normally open contact to energize the down solenoid SOL-6. Energization of the down solenoid SOL-6 causes the valve X-17 to be operated to supply air from the piping 107 to the tank T-24 which supplies fluid to the upper side of the die cut ram XIV to cause it to be lowered.

At the same time that relay RY-2 is energized to start movement of the die cutting ram XIV, the product push-out mechanism is operated by energization of the solenoid SOL-7 through the contacts 3 and 4 of relay RY-2. Energization of the solenoid SOL-7 causes the valve V-18 to be operated to supply air from the piping 107 to the tank T-26 which causes fluid to be supplied to the upper part of the product push-out cylinder 11. Operation of the product push-out cylinder 11 causes movement downward of the plunger 551. The plunger 551 engages the shaft 546 which causes the plate 513 to be moved downwardly carrying with it the posts 523 and the product push-out members 522 to move the product push-out members 522 downwardly in the die cut members 521 to push the product out of the die cut members and to cause it to drop onto the delivery cnveyor 341. The product push-out cylinder 11 has a stroke which is only sufficient to cause the product push-out members 522 to be moved to the bottom portions of the die cut members 521.

When the product push-out members 522 have been moved downwardly sufficiently far enough to push the consumer-sized die cut blocks from the die cut members 521, the return switch S-6 is operated to close its normally open contacts to cause energization of the up solenoid SOL-8. Energization of the up solenoid SOL-8 causes the valve V-18 to be operated to supply air from piping 107 to the tank T-25 which supplies fluid to the lower part of the product push cylinder 11 to cause the plunger 551 to return to its home position. The springs 518 cause the upper plate 513 and the product push-out members 522 carried thereon to be moved upwardly into their normal positions as shown in FIGURE 20.

Energization of relay RY-2 also causes energization of the trim push-out means by energization of the down solenoid SOL-9 through contacts 5 and 6 of relay RY-2. Energization of the down solenoid SOL-19 causes operation of valve V-19 to supply air from the piping 107 to the tank T-27 which causes fluid to be supplied to the upper part of the trim cylinder 12 to cause the plunger 552 to be moved downwardly to engage the shaft 546. Movement of shaft 546 causes the plate 513 to be moved downwardly against the force of the springs 518 and to carry with it trim push-out members 526 and to move the same downwardly to force out from between the die cut members the portions of the slice of cheese remaining. In addition, the plate 513 engages the collars 536 on the rods 529 to move the trim push-out blocks 528 downwardly to cause any pieces of cheese retained by the fingers 538 to also be pushed downwardly and out away from the die cut members 521. The trim which is pushed out by the members 526 and 528 is dropped downwardly into a bag 556 carried on the main frame 11.

It should be pointed out that the fingers 538 yieldably engage any pieces of cheese around the outer portions of the die cut assembly formed by the die cut members 521 so that they will not drop away from the die cut members 521 during the time that the product is being pushed out.

Downward travel of the plunger 522 is limited when the switch S-12 is operated to close its normally closed contacts to energize the solenoid SOL-10. Energization of solenoid SOL-10 causes air to be supplied in the piping 107 to the tank T-28 which causes fluid to be supplied to the lower portion of the trim cylinder 12 to cause it to be raised.

It will be noted that when the product push-out cylinder 11 and the trim push-out cylinders 12 are operated, the switches S-18 and S-19 are operated. This prevents operation of the indexing circuit as hereinbefore described to prevent indexing of the die cut assemblies during the time that the die cutting, product push-out and trim push-out operations are taking place.

The operation of the remaining portion of the apparatus is substantially identical to that hereinbefore described in cutting rectangular consumer-sized blocks. Thus, each time a slice is raised by the platform 471 by the ram XIV and the ram lowered to return the platform 471 to its home position, the switch S-10 is operated to cause operation of ram II in the manner hereinbefore described. Switch S-10 is not effective on the up-stroke of ram XIV. The only difference in this case is that the ram II does not advance the slice through the vertical cutting means 301. The elevator assembly 241 is operated in the same manner as is the elevator feed conveyor 111 and the ram I feed conveyor 13 and the bulk feed conveyor 31.

As pointed out previously, there is one additional step, however, which takes place when the block cut into superposed slices is advanced onto the elevator assembly 241. In this case, the centering means 175 before ram II is connected in the manner shown in FIGURES 10 and 11 and positions the stop plate 171 so that its position is proportional to the length of the block measured by the length sensing means 131. In this manner, the slices of cheese which are advanced off of the block by ram II are centered for placement upon the platform 471 so that they will be centered with respect to the die cutting elements 521 forming a part of the die cutting mechanism 472.

It will be noted that each of the die cutting assemblies 504 of the die cutting mechanism 472 are each movable step by step through 90° increments into four different sectors. The first sector is when the die cutting assembly 504 overlies the platform 471 and is in a die cutting position. The next is 90° removed therefrom and can be identified as a product pushout sector in which the die cutting assembly 504 overlies the delivery conveyor 341. The next sector can be called a trim pushout sector which is removed 90° from the product pushout sector and which overlies the bag 556. The other remaining sector is unused in the present embodiment of the invention. The cheese is advanced in the manner shown in FIGURE 29B.

The conveyors 341 and 351 operate in the same manner as when they are used for advancing rectangular sized consumer blocks.

It is apparent from the foregoing that we have provided a new and improved apparatus and method for the cutting and handling of articles and more in particular consumer-sized blocks which can be readily fed to automatic machinery such as automatic wrapping machines. As will be pointed out from the foregoing, the apparatus and method is particularly adapted for use in cutting large blocks into smaller consumer-sized blocks and feeding them automatically into the wrapping machine. Although the operation of the apparatus has been described primarily in conjunction with cheese, it is readily apparent that the principles of the present invention can be utilized for other cutting and handling operations. The apparatus is particularly advantageous in that it eliminates the use of practically all manual labor and makes it possible to automate heretofore largely manual operations.

We claim:

1. In apparatus for cutting articles of random sizes and having at least one exterior dimension which differs from article to article, cutting means comprising a plurality of spaced cutting elements for cutting the article into a number of separate parts greater than two, means independent of the cutting means for measuring one exterior dimension of the article to be cut, means controlled by the dimension measuring means for adjusting the spacing between the cutting elements of the cutting means in accordance with the dimension measured, and means for causing relative movement between the cutting means and the article to be cut to cause the article to be cut into separate parts with at least certain of said parts having an exterior dimension proportional to the dimension measured.

2. Apparatus as in claim 1 wherein said means for causing relative movement between the cutting means and the article to be cut includes means for moving the article through the cutting means while the cutting means remains in a stationary position.

3. In apparatus for cutting articles having at least one exterior dimension which differs from article to article, means for measuring one exterior dimension of an article to be cut, means for cutting the article into a number of separate parts greater than two, means controlled by the dimension measuring means for adjusting the cutting means in accordance with the dimension measured, means for causing relative movement between the cutting means and the article to be cut to cause the article to be cut into separate parts with at least certain of said separate parts having an exterior dimension proportional to the dimension measured, means for measuring another exterior dimension of the article, additional means for cutting the article into additional separate parts, means controlled by the means for measuring another dimension for adjusting the additional cutting means in accordance with said another dimension and means for causing relative movement between the additional cutting means and the article to be cut to cause the article to be cut into additional separate parts with at least certain of the additional separate parts having an exterior dimension proportional to said another dimension.

4. In apparatus for cutting and handling articles, conveyor means for advancing articles, means for stopping the conveyor means when an article has been advanced to a predetermined point, means for measuring one exterior dimension of the article on the conveyor means, means for cutting an article into a plurality of separate parts, means controlled by the dimension measuring means for adjusting the cutting means in accordance with the dimension measured, means for causing relative movement between the cutting means and the article to be cut to cause the article to be cut into separate parts additional dimension measuring means for measuring another exterior dimension of the article, additional cutting means, means controlled by the additional dimension measuring means for adjusting the additional cutting means in accordance with the additional dimension measured, and means for causing relative movement between the additional cutting means and the article to cause the article to be cut into additional separate parts with at least certain of said separate parts having an exterior dimension proportional to the additional dimension measured.

5. Apparatus as in claim 4 wherein said first named cutting means cuts the articles into separate parts by relative movement between the cutting means and the article in one direction and wherein the article is cut into additional separate parts by relative movement of the additional cutting means and the article to be cut in a direction substantially at right angles to the first named direction.

6. In apparatus for cutting and handling articles, conveyor means for advancing the articles one by one in succession, cutting means having spaced parallel cutting elements for cutting each of the articles into a plurality of separate parts, means for causing each article to be advanced through the cutting means so that the cutting means passes through the article to cut the article into a plurality of separate slices, additional cutting means having spaced parallel cutting elements, means for advancing each of the slices through the additional cutting means in a direction substantially at right angles to the direction the article was advanced through the first named cutting means so that the additional cutting means cuts the slices into a plurality of separate parts, supplemental cutting means having at least one cutting element, means for advancing the parts cut from the slices through the supplemental cutting means in a direction at right angles to the direction in which the slices were advanced through the additional cutting means so that said supplemental cutting means cuts the separate parts into additional parts, means for measuring one exterior dimension of the article and means controlled by the dimension measuring means for adjusting the positions of the cutting elements of the first named cutting means in accordance with the dimension measured.

7. Apparatus as in claim 6 together with means for measuring an additional dimension of the article, and means controlled by the last named dimension measuring means for adjusting the positions of the cutting elements of the additional cutting means in accordance with the additional dimension measured.

8. In apparatus for cutting and handling block-like articles, conveyor means for advancing the block-like articles one by one in succession, cutting means having a plurality of cutting elements disposed in spaced parallel planes, means for advancing the block through the cutting means to cause the block to be cut into a plurality of slices, means for advancing the slices, means for cutting the slices into a plurality of separate parts, means for measuring one exterior dimension of the article, and means controlled by the dimension measuring means for adjusting the cutting elements of the cutting means in accordance with the dimension measured so that the slices will have a dimension which is proportional to the dimension measured.

9. Apparatus as in claim 8 together with elevator means, means for advancing the article which has been cut into slices onto the elevator means, wherein said means for cutting the slices consists of additional cutting means having cutting elements disposed in parallel planes at right angles to the planes in which the cutting elements of the first named cutting means are disposed, and wherein in the means for advancing the slices consists of means for advancing each of the slices through the cutting elements of the additional cutting means to cause the slices to be cut into a plurality of separate parts, and means for raising the elevator as each slice is removed from the article.

10. In apparatus for cutting and handling articles, conveyor means for advancing the articles one by one in succession, cutting means having cutting elements disposed in spaced parallel planes, means for advancing the article to be cut to the cutting means to cause the article to be cut into a plurality of juxtaposed slices, additional cutting means having cutting elements disposed in spaced parallel vertical planes, means for advancing one slice of the article at a time through the additional cutting means to cause the slice to be cut into a plurality of separate parts, means for stopping the conveyor means when an article has been advanced to a predetermined point, means for measuring one external dimension of the article, and means controlled by the dimension measuring means for adjusting the spacing between the cutting elements of the first named cutting means in accordance with the dimension measured so that at least certain of the slices have an external dimension which is proportional to the dimension measured.

11. Apparatus as in claim 10 together with means for measuring another external dimension of the article, and means controlled by the means for measuring another external dimension of the article for adjusting the spacing between the cutting elements of the additional cutting means in accordance with said another external dimension so that at least certain of the parts have an external dimension which is proportional to said another external dimension.

12. In apparatus for cutting and handling block-like articles, conveyor means having at least one portion lying in a plane for advancing the block-like articles one by one in succession, cutting means having cutting elements disposed in spaced parallel planes and parallel to said one portion of the conveyor lying in a plane, means for advancing each article through the cutting means to cause the article to be cut into a plurality of juxtaposed slices, elevator means, means for advancing said juxtaposed slices onto the elevator means, additional cutting means having spaced parallel cutting elements disposed in the vicinity of said elevator means, pushing means for removing the juxtaposed slices from the elevator means one by one to separate the slices and to advance the slices in a common plane and into the additional cutting means to cause the slices to be cut into a plurality of separate parts, means for raising the elevator means upon removal of each slice, and means for causing the elevator means to be lowered after the last slice of the article has been removed from the elevator means.

13. Apparatus as in claim 12 together with supplemental cutting means having at least one cutting element, means for advancing the slice which has been cut into parts through the supplemental cutting means in a direction which is at right angles to the direction in which the slice was advanced through the additional cutting means to thereby cut each of the parts into still smaller parts, and means for advancing the parts away from the supplemental cutting means.

14. In apparatus for cutting and handling block-like articles, conveyor means having at least one portion lying in a plane for advancing the block-like articles one by one in succession, cutting means having cutting elements disposed in spaced parallel planes and parallel to said one portion of the conveyor lying in a plane, means for advancing each article through the cutting means to cause the article to be cut into a plurality of juxtaposed slices, elevator means, means for advancing said juxtaposed slices onto the elevator means, means for separating the slices one by one and advancing the same in a common plane, means for raising the elevator as each slice is removed, means for causing the elevator means to be lowered after the last slice of the article has been removed, and means for cutting each of said slices into a plurality of parts having predetermined shapes, said last named means consisting of a framework having a plurality of dies, means for causing relative movement of the framework and dies with respect to a slice to cause the dies to cut parts having predetermined shapes from the slice, additional conveyor means, and means for causing the parts cut by the dies to be ejected from the dies onto the additional conveyor means.

15. Apparatus as in claim 14 together with means for stripping the trim from the outside of the dies.

16. Apparatus as in claim 14 together with means for centering the slices before they are advanced into the dies.

17. In apparatus for cutting and handling block-like articles, conveyor means having at least one portion lying in a plane for advancing the block-like articles one by one in succession, cutting means having cutting elements disposed in spaced parallel planes and parallel to said one portion of the conveyor lying in a plane, means for advancing each article through the cutting means to cause the article to be cut into a plurality of juxtaposed slices, elevator means, means for advancing said juxtaposed slices onto the elevator means, means for separating the slices one by one and advancing the same in a common plane, means for raising the elevator as each slice is removed, means for causing the elevator means to be lowered after the last slice of the article has been removed, means for cutting said slices into parts having predetermined shapes consisting of a standard, a frame having die cutting members mounted on said standard, means for causing rotation of the frame with the dies on the standard, means for causing relative movement between the slice and the frame to cause the dies to cut parts having predetermined shapes from each slice, means for causing rotation of the frame through a predetermined angle after parts have been cut from a slice, conveyor means, means for ejecting the parts which have been cut from the slice from the dies onto the conveyor means, means for causing additional rotation of the frame after the parts have been ejected from the dies, and means for causing the remaining parts of the slice to be ejected from the frame.

18. In an apparatus for cutting and handling articles, conveyor means for advancing the articles one by one in succession, means for stopping the advance of the conveyor means when the article has been advanced to a predetermined line, means for measuring the height of the article, first cutting means having a plurality of spaced parallel horizontal cutting elements lying in a plane parallel to the plane of the conveyor means, a first ram disposed in front of the first cutting means, means connecting the height measuring means to the first cutting means so that the cutting elements are spaced in accordance with the height of the article measured, means for advancing the article in front of the first ram, means for causing actuation of the first ram to cause the ram to advance the article through the first cutting means to cut the article into a plurality of superposed slices each of which has a dimension proportional to the measured height of the article, elevator means, means for advancing the article cut into superposed slices onto the elevator as a unit, a second ram adjacent one side of the elevator and adapted to advance one slice at a time from the article, means for causing raising of the elevator each time a slice is advanced by the second ram, means for receiving the slices, and means for cutting the slices into a plurality of parts.

19. Apparatus as in claim 18 wherein said means for cutting the slices into a plurality of parts consists of second cutting means having a plurality of spaced parallel vertical cutting elements, said second cutting means being disposed on one side of said elevator means opposite said second ram, said second ram serving to cause said slices to be advanced through said second cutting means to cut each of the slices into a plurality of separate parts and third cutting means having at least one vertical cutting element, third ram means opposite said third cutting means, and means for causing operation of said third ram means to advance said parts through said third cutting means to cut said parts into additional parts.

20. Apparatus as in claim 18 together with means for centering the article with respect to the means for cutting the slices before the slices are advanced by the second ram.

21. Apparatus as in claim 20 together with means for centering the slices in front of the third cutting means before the slices are advanced by the third ram.

22. Apparatus as in claim 19 wherein said means for receiving the slices includes a plurality of rollers lying in a common plane and wherein said third ram means includes a plurality of fork-like members disposed between the rollers and normally lying below the top surface of the rollers, and means for raising the fork-like members above the surface of the rollers to raise the parts above the surface of the rollers as the parts are advanced through the vertical cutting means by the third ram means.

23. In apparatus for cutting and handling articles, conveyor means for advancing the articles one by one in succession, means for stopping the advance of the conveyor means when the article has been advanced to a predetermined line, means for measuring the height of the article, cutting means having a plurality of spaced parallel horizontal cutting elements lying in a plane parallel to the plane of the conveyor means, a first ram disposed in front of the first cutting means, means connecting the height measuring means to the first cutting means so that the cutting elements are spaced in accordance with the height of the article measured, means for advancing the article in front of the first ram, means for causing actuation of the first ram to cause the ram to advance the article through the first cutting means to cut the article into a plurality of superposed slices, elevator means, means for advancing the article cut into superposed slices onto the elevator means as a unit, a second ram adjacent one side of the elevator and adapted to advance one slice at a time from the cut article, means for causing raising of the elevator each time a slice is advanced by the second ram, means for receiving the slices, and means for cutting the slices into a plurality of parts, said means for cutting the slices into a plurality of parts consisting of second cutting means having a plurality of spaced parallel vertical cutting elements, said second cutting means being disposed on one side of said elevator means opposite said second ram, said second ram serving to cause said slices to be advanced through said second cutting means to cut each of the slices into a plurality of separate parts and third cutting means having at least one vertical cutting element, third ram means opposite said third cutting means, means for causing operation of said third ram means to advance said parts through said third cutting means to cut said parts into additional parts, and means for centering the slices in front of the third cutting means before the slices are advanced by the third ram, said centering means including a fluid actuator having a plunger, a sensing plate carried by the plunger and adapted to engage one surface of the article while it is at one position, a stop plate, a pair of actuators each having a plunger connected to the stop plate, each of said actuators having the same volumetric size, and means interconnecting the first named pair of actuators so that the stop plate carried by the pair of actuators is advanced one-half the distance that the sensing plate is advanced to thereby center the slice with respect to the third cutting means.

24. In apparatus for cutting and handling articles, cutting means, means for causing relative movement between the articles to be cut and the cutting means to cut the article into a plurality of parts, means for causing relative movement between the article to be cut and the cutting means so that the article and the cutting means are centered with respect to each other, said last named means including a fluid actuator having a plunger, a sensing plate carried by the plunger adapted to engage one surface of the article, a stop plate, a pair of actuators each having a plunger connected to the stop plate, each of the actuators having the same volumetric size, and means interconnecting said first named actuator to said pair of actuators so that the stop plate carried by the pair of actuators is advanced one-half the distance that the sensing plate is advanced to thereby center the article with respect to the cutting means.

25. In apparatus for cutting and handling articles, first and second cutting means, means for measuring first and second exterior dimensions of the article to be cut, means controlled by the dimension measuring means for adjusting the first cutting means in accordance with one of the dimensions measured and for adjusting the second cutting means in accordance with the second dimension measured, and means for causing relative movement between the cutting means and the article to be cut to cause the article to be cut into separate parts in which each part has first and second exterior dimensions which are proportional to the first and second measured dimensions of the article.

References Cited

UNITED STATES PATENTS

| | | | |
|---|---|---|---|
| 2,630,043 | 3/1953 | Kolisch. | |
| 2,714,585 | 6/1955 | Bush et al. | 31—30 |
| 2,760,248 | 8/1956 | Hensgen et al. | 31—22 X |
| 2,877,816 | 3/1959 | Kibler et al. | 146—78 X |
| 3,133,571 | 5/1964 | Hensgen et al. | 146—95 |
| 3,142,905 | 8/1964 | Strasbaugh | 31—26 X |
| 3,158,074 | 11/1964 | Brigham | 83—72 X |
| 3,217,768 | 11/1965 | Lamb | 146—78 X |

W. GRAYDON ABERCROMBIE, *Primary Examiner.*

U.S. Cl. X.R.

146—169; 31—23